US010291824B2

(12) United States Patent
Yamamoto et al.

(10) Patent No.: US 10,291,824 B2
(45) Date of Patent: May 14, 2019

(54) IMAGE PROCESSING DEVICE AND METHOD FOR CONDUCTING IMAGE FORMATION OF A MASKED READ IMAGE

(71) Applicants: Kohji Yamamoto, Kanagawa (JP); Yoshihiko Sakawaki, Kanagawa (JP)

(72) Inventors: Kohji Yamamoto, Kanagawa (JP); Yoshihiko Sakawaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/917,900

(22) Filed: Mar. 12, 2018

(65) Prior Publication Data

US 2018/0270395 A1 Sep. 20, 2018

(30) Foreign Application Priority Data

Mar. 17, 2017 (JP) ................................ 2017-052640
Jul. 14, 2017 (JP) ................................ 2017-138237
Dec. 28, 2017 (JP) ................................ 2017-254504

(51) Int. Cl.
*H04N 1/00* (2006.01)
*H04N 1/60* (2006.01)
*H04N 1/44* (2006.01)

(52) U.S. Cl.
CPC ......... *H04N 1/603* (2013.01); *H04N 1/00015* (2013.01); *H04N 1/00037* (2013.01); *H04N 1/0044* (2013.01); *H04N 1/00082* (2013.01); *H04N 1/00411* (2013.01); *H04N 1/4413* (2013.01)

(58) Field of Classification Search
None
See application file for complete search history.

(56) References Cited

U.S. PATENT DOCUMENTS

2007/0279672 A1 12/2007 Harada
2008/0239365 A1* 10/2008 Salgado ................ G06F 17/212 358/1.15
2009/0174892 A1 7/2009 Yamamoto
2011/0058215 A1 3/2011 Yoshizumi et al.
2011/0063665 A1 3/2011 Hirakawa et al.
2012/0069391 A1 3/2012 Yonezawa et al.
2012/0229852 A1 9/2012 Kubo et al.
(Continued)

FOREIGN PATENT DOCUMENTS

JP 06-178021 6/1994
JP 2000-155504 6/2000
(Continued)

*Primary Examiner* — Andrew H Lam
(74) *Attorney, Agent, or Firm* — Oblon, McClelland, Maier & Neustadt, L.L.P.

(57) ABSTRACT

According to an embodiment, an image processing device includes a document read unit, a display unit, input receiving unit, an image processing unit, and image forming unit. The document read unit reads a document. The display unit displays a read image that is read by the document read unit. The input receiving unit receives user's input of information at any position on the read image that is displayed on the display unit. The image processing unit masks at least part of the read image based on the information received by the input receiving unit. The image forming unit conducts image formation of the read image that is masked by the image processing unit.

19 Claims, 53 Drawing Sheets

(56) References Cited

U.S. PATENT DOCUMENTS

| | | | |
|---|---|---|---|
| 2013/0219261 | A1 | 8/2013 | Han et al. |
| 2014/0281914 | A1 | 9/2014 | Sakawaki et al. |
| 2016/0062627 | A1 | 3/2016 | Katoh et al. |
| 2017/0127278 | A1 | 5/2017 | Yamamoto et al. |

FOREIGN PATENT DOCUMENTS

| | | |
|---|---|---|
| JP | 2007-325128 | 12/2007 |
| JP | 2009-218836 | 9/2009 |

* cited by examiner

FIG.6

| TYPE OF WEB API | FUNCTION EXECUTED BY MAIN BODY (SERVICE PROVIDED BY MAIN BODY) | URL | METHOD |
|---|---|---|---|
| FIRST API | SCAN EXECUTION | /ricoh/scan/job | POST |
| SECOND API | SCAN-IMAGE ACQUISITION | /ricoh/scan/job/{JOB ID}/file | GET |
| THIRD API | IMAGE FORMATION EXECUTION | /ricoh/print/job | POST |
| FOURTH API | FILE (MASKING PATTERN) REGISTRATION | /ricoh/storage/file | POST |
| FIFTH API | FILE (MASKING PATTERN) INVOKING | /ricoh/storage/file/{DOCUMENT ID}/image | GET |

FIG.7A

| URL | METHOD |
|---|---|
| /ricoh/scan/job | POST |

FIG.7B

| URL | METHOD |
|---|---|
| /ricoh/scan/job/{JOB ID}/file | GET |

FIG.7C

| URL | METHOD |
|---|---|
| /ricoh/print/job | POST |

FIG.7D

| URL | METHOD |
|---|---|
| /ricoh/storage/file | POST |

FIG.7E

| URL | METHOD |
|---|---|
| /ricoh/storage/file/{DOCUMENT ID}/image | GET |

| FILE NAME OF MASKING PATTERN | DOCUMENT ID | TEMPLATE NAME | MASKING NUMBER | … |
|---|---|---|---|---|
| mask1.tif | 1 | TEMPLATE 1 | 1 | … |
| mask2.tif | 2 | TEMPLATE 2 | 2 | … |
| mask3.tif | 3 | TEMPLATE 3 | 2 | … |
| ⋮ | ⋮ | ⋮ | ⋮ | ⋮ |

| FILE NAME OF MASKING PATTERN (t1) | DOCUMENT ID (t2-1) | TEMPLATE NAME (t2-2) | MASKING NUMBER (t2-3) | USER ID (t2-4) | ··· |
|---|---|---|---|---|---|
| mask1.tif | 1 | LICENSE BLACKED-OUT PATTERN | 1 | RICOH | ··· |
| mask2.tif | 2 | PASSPORT BLACKED-OUT PATTERN | 2 | TARO | ··· |
| mask3.tif | 3 | LICENSE BLACKED-OUT PATTERN | 2 | HANAKO | ··· |
| ⋮ | ⋮ | ⋮ | ⋮ | ⋮ | ⋮ |

IMAGE PROCESSING DEVICE AND METHOD FOR CONDUCTING IMAGE FORMATION OF A MASKED READ IMAGE

CROSS-REFERENCE TO RELATED APPLICATIONS

The present application claims priority under 35 U.S.C. § 119 to Japanese Patent Application No. 2017-052640, filed on Mar. 17, 2017, Japanese Patent Application No. 2017-138237, filed on Jul. 14, 2017 and Japanese Patent Application No. 2017-254504, filed on Dec. 28, 2017. The contents of which are incorporated herein by reference in their entirety.

BACKGROUND OF THE INVENTION

1. Field of the Invention

The present invention relates to an image processing device, a method, and a computer-readable recording medium.

2. Description of the Related Art

There is a technology for masking printing with which, for copying, image processing devices conduct printing by changing the color of part of the image to be output.

According to the literature that discloses a masking technology, a character string of a document is previously colored by a line marker, or the like, and the color of masking is set through the operation panel. Then, when a copy of the document is output, the colored part is masked with the color that is set through the operation panel and then a print is output (see Japanese Unexamined Patent Application Publication No. 2009-218836).

However, conventional masking printing has the problem of inconvenient operation that, for example, reading is conducted after a character string of a document is previously colored by a line marker, or the like.

In view of the conventional problem, there is a need to provide an image processing device, a method, and a computer-readable recording medium having a program for enabling masking on areas intended by operators in a more simple and accurate manner.

SUMMARY OF THE INVENTION

According to an embodiment, an image processing device includes a document read unit, a display unit, input receiving unit, an image processing unit, and image forming unit. The document read unit is configured to read a document. The display unit is configured to display a read image that is read by the document read unit. The input receiving unit is configured to receive user's input of information at any position on the read image that is displayed on the display unit. The image processing unit is configured to mask at least part of the read image based on the information received by the input receiving unit. The image forming unit is configured to conduct image formation of the read image that is masked by the image processing unit.

BRIEF DESCRIPTION OF THE DRAWINGS

FIG. 6 is a diagram that illustrates an example of the specification of each API;

FIGS. 7A to 7E are diagrams that illustrate examples of the configuration of request data that is transmitted to the main body by a Web-API communication unit;

FIG. 18 is a diagram that illustrates an example of a correspondence table;

FIG. 23 is a diagram that illustrates an example of a correspondence table according to a second modification of the first embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
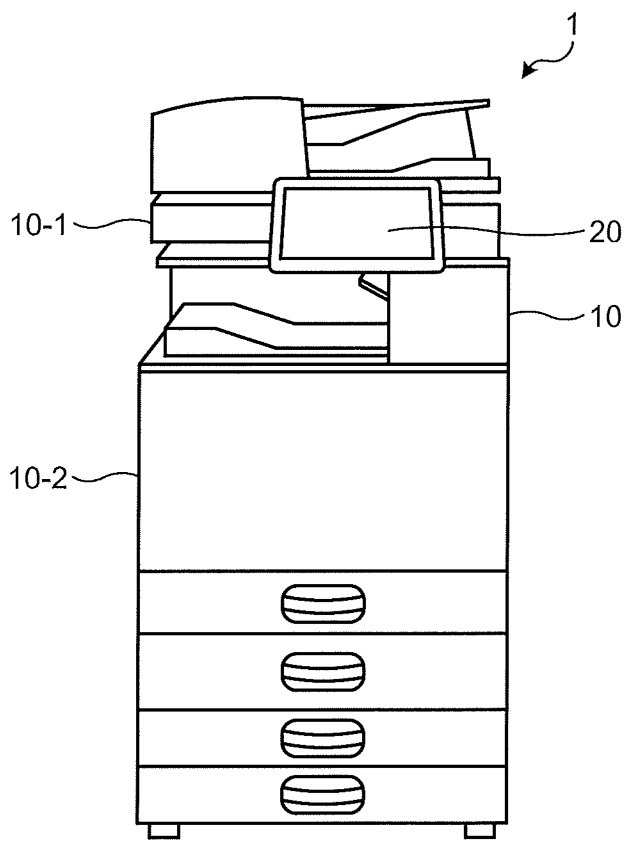
FIG. 1 is a diagram that illustrates an external configuration of an MFP that is illustrated as an example of "an image processing device" according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

With reference to the attached drawings, a detailed explanation is given below of embodiments of an image processing device, a method, and a computer-readable recording medium having a program according to the present invention.

The image processing device according to the embodiment includes a document read unit, a display unit, an input receiving unit, an image processing unit, and an image forming unit.

The document read unit includes a read unit such as a read scanner to read document images from documents (i.e., conduct scanning). The display unit includes a display unit, such as an LCD (liquid crystal display) or an organic EL (electro luminescence), to display read images that are read by the document read unit (also referred to as scanning images or scan images having pixel data). The input receiving unit includes an input unit such as a touch panel to receive input of information at any position designated by users on the read image that is presented on the display unit. The information is masking information (masking pattern) that includes at least one of positional information, such as coordinate information (x,y), with regard to a read image, and color information, such as RGB values, with regard to the designated coordinates (position). A generating unit generates masking information. As described later, as for the masking information (masking pattern), the information may be stored and brought up as a file separately from scan images. Furthermore, the color information also includes the information for changing colors other than the color at a designated position (e.g., the information for changing yellowing to white to remove it) or the information for changing the color at a designated position to white or a color that is close to the surrounding or the background (e.g., removal of pencil writing). The image processing unit conducts image processing to mask a read image at the position received by the input receiving unit on the basis of masking information. The image forming unit includes a plotter, or the like, to conduct image formation (e.g., printing) of the read image that is masked by the image processing unit.

For example, the image processing unit performs a masking process to change RGB values of a scan image, acquired in for example an RGB format, on the area targeted for masking on the basis of the masking information that indicates that a pixel (referred to as "reference pixel") at the position designated by a user and corresponding pixels on the read image being displayed are targeted for masking or are not targeted for masking. Specific methods for masking areas that are targeted for masking include, for example, a method for prompting a user to trace a masking pattern on the read image being displayed so as to combine the masking pattern with the read image, a method for replacing a read image's pixel that has a pixel value equal to a pixel value at the position designated by a user on the read image being displayed or a pixel value within an approximation range, and their modifications.

Here, a pixel is the minimum unit that has color information (color tone or gradation) for the computer to handle images. A pixel value is a concept that includes an RGB value, luminance information, or color information.

A detailed explanation is given below of embodiments for individual methods. Furthermore, embodiments and their modifications described below may be combined as appropriate.

First Embodiment

FIG. 1 is a diagram that illustrates an external configuration of an MFP (multifunction peripheral) that is illustrated as an example of "the image processing device" according to a first embodiment. The MFP is a device that has at least a scanning function and an image forming function.

The MFP 1 illustrated in FIG. 1 includes a main body (main body unit) 10 and an operation panel 20 that is an "operating device". The main body 10 includes a scanner unit 10-1 that scans (also referred to as "read") documents, an image formation unit 10-2 that forms images on recording media such as sheets, or the like.

The operation panel 20 is a user interface for users to give a command to the main body 10 so as to conduct copying or to perform operation to edit images for copy output. The main body 10 and the operation panel 20 are communicatively connected wired or wirelessly to transmit and receive operating signals, data, or the like, through a communication path 30 (see FIG. 2).

The first embodiment illustrates an example of the case where an API (application programming interface) provided in the main body 10 is used to perform user's operation to give a command to the main body 10 so as to conduct copying, conduct image editing of images for copy output, or the like, through the operation panel 20. Furthermore, as the "user's operation to edit images", the masking operation for masking part of images is described.

Furthermore, in the described case, for example, a Web API is used as the "API". Hereinafter, if not otherwise specified, the "API" is a "Web API (principally, a REST Web API)". With the REST (Representational State Transfer) Web API, a request (also referred to as requested data) using methods of GET (acquire), POST (register), PUT (update), DELETE (remove) and the URL (Uniform Resource Locator) for identifying a resource is transmitted to a Web (World Wide Web) server and a response (also referred to as "response data") is received from the Web server in JSON (JavaScript (registered trademark) Object Notation), XML (Extensible Markup Language), or the like.

Hardware Configuration

Figure 2:
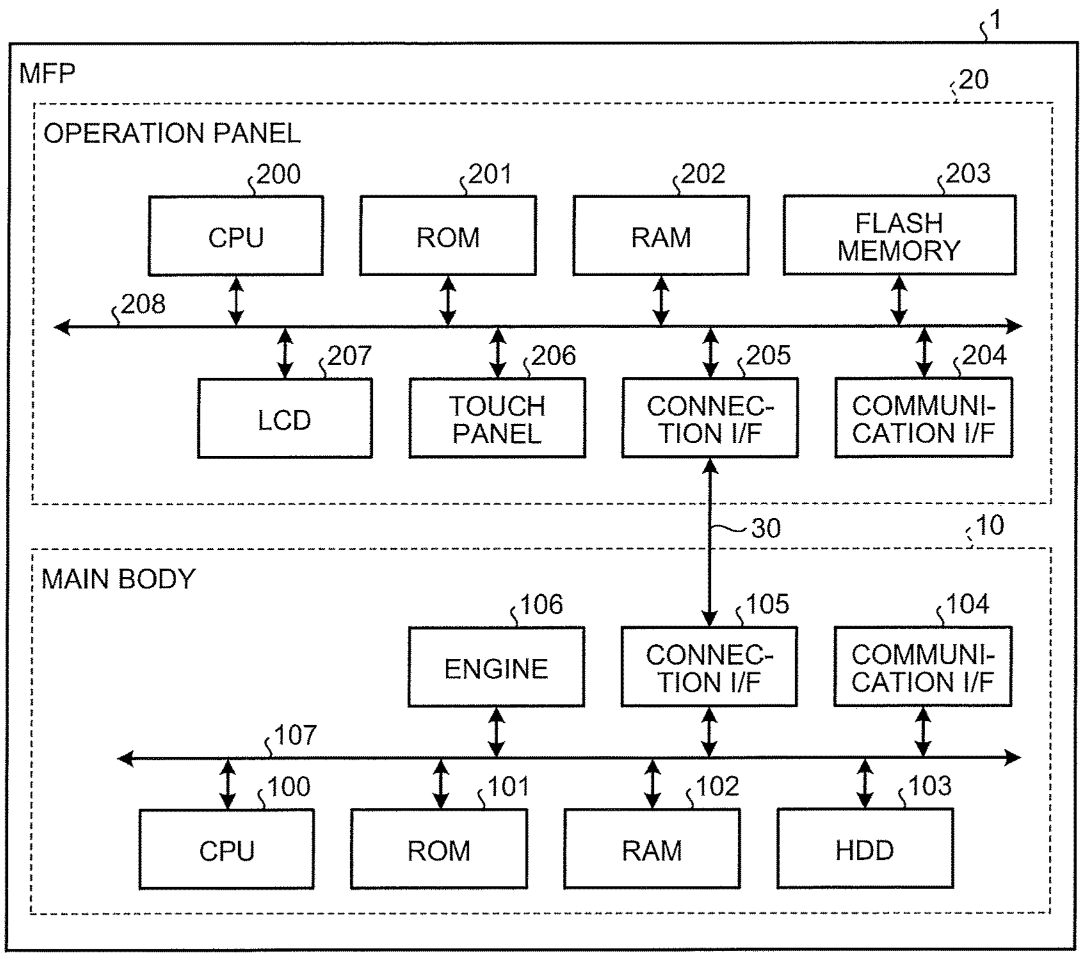
FIG. 2 is a diagram that illustrates an example of the hardware configuration of the MFP.

FIG. 2 is a diagram that illustrates an example of the hardware configuration of the MFP 1. As illustrated in FIG. 2, the main body 10 includes a CPU (central processing unit) 100 that is a first CPU; a ROM (read only memory) 101; a RAM (random access memory) 102; an HDD (hard disk drive) 103; a communication I/F 104; a connection I/F 105; and an engine 106. The units are connected to one another via a system bus 107.

The CPU 100 is a central processing unit that performs arithmetic processes and control processes. The CPU 100 reads various programs, stored in the ROM 101, the HDD 103, and the like, into the RAM 102 to perform arithmetic processes and control processes, thereby integrally controlling the main body 10.

The ROM 101 is a nonvolatile memory that stores fixed programs (e.g., BIOS (Basic Input/Output System)). The RAM 102 is a volatile memory that is used by the CPU 100 as a work area, or the like, during various processes. The HDD 103 is an auxiliary storage device that stores various types of programs, data, and the like. Various programs include a first OS (operating system), Web server software, Web API, database management software, and the like.

The communication I/F 104 is an interface (e.g., Ethernet (registered trademark) board) for the main body 10 to connect to a communication network, such as a LAN (local area network) or a VPN (virtual private network).

The connection I/F 105 is an interface of the USB (universal serial bus) standard, or the like, for communication connection with the operation panel 20 through the communication path 30. Furthermore, connection with the operation panel 20 is not limited to the USB. Moreover, the communication path 30 may be not only wired but also wireless.

The engine 106 is a read scanner that scans documents, a plotter that forms images on recording media such as sheets, or the like. The above-described read scanner is provided in the scanner unit 10-1 (see FIG. 1) to output scanning data with RGB (red, green, blue) values by scanning. Furthermore, the above-described plotter is provided in the image formation unit 10-2 (see FIG. 1).

The operation panel 20 illustrated in FIG. 2 includes a CPU 200 that is a second CPU provided separately from the main body 10; a ROM 201; a RAM 202; a flash memory 203; a communication I/F 204; a connection I/F 205; a touch panel 206; and an LCD 207. The units are connected to one another via a system bus 208.

The CPU 200 is a central processing unit that performs arithmetic processes and control processes. The CPU 200 reads out various programs, that are stored in the ROM 201, the flash memory 203, and the like, into the RAM 202 to perform arithmetic processes and control processes, thereby integrally controlling the entire operation panel 20.

The ROM 201 is a nonvolatile memory that stores fixed programs (e.g., BIOS). The RAM 202 is a volatile memory that is used by the CPU 200 as a work area, or the like, during various processes. The flash memory 203 is an auxiliary storage device that stores a second OS (Android (registered trademark) OS, or the like) that is separate from the main body 10, apps (Android apps, or the like) that are operated by the CPU 200 in the "second OS", and the like. The OS of the operation panel 20 operates separately from the OS of the main body 10. The copy-output editing app described later is stored in the flash memory 203 as an app that operates in the OS of the operation panel 20. Furthermore, in this specification, an "app" represents an "application".

The communication I/F 204 is an interface for the operation panel 20 to connect to a communication network, such as a LAN or a VPN.

The connection I/F 205 is an interface for communication connection with the main body 10 through the communication path 30.

The touch panel 206 is a touch sensor that detects operator's touch positions on the screen of the LCD 207 and notifies the information (positional information) on the touch positions to the CPU 200. Furthermore, in addition to the touch panel 206, hardware keys or the like may be provided to notify input values, commands, and the like, to the CPU 200.

The LCD 207 is an example of the display unit. The LCD 207 includes a liquid-crystal display screen to display the display screen information output from the CPU 200 on the liquid-crystal display screen. Furthermore, the display unit may be the one that uses other display systems, such as organic EL, other than liquid crystal.

Functional Configuration

According to the first embodiment, the main body 10 and the operation panel 20 in the MFP 1 operate independently with different operating systems (the first OS and the second OS, respectively). In the operating system of the operation panel 20, the copy-output editing app of the operation panel 20 operates the main body 10 by using the Web API of the main body 10.

The main body 10 performs various types of functions when the CPU 100 reads out programs that are stored in the ROM 101, the HDD 103, or the like, into the RAM 102 and sequentially executes them. Furthermore, the operation panel 20 performs various types of functions when the CPU 200 reads out programs that are stored in the ROM 201, the flash memory 203, or the like, into the RAM 202 and sequentially executes them.

Figure 3:
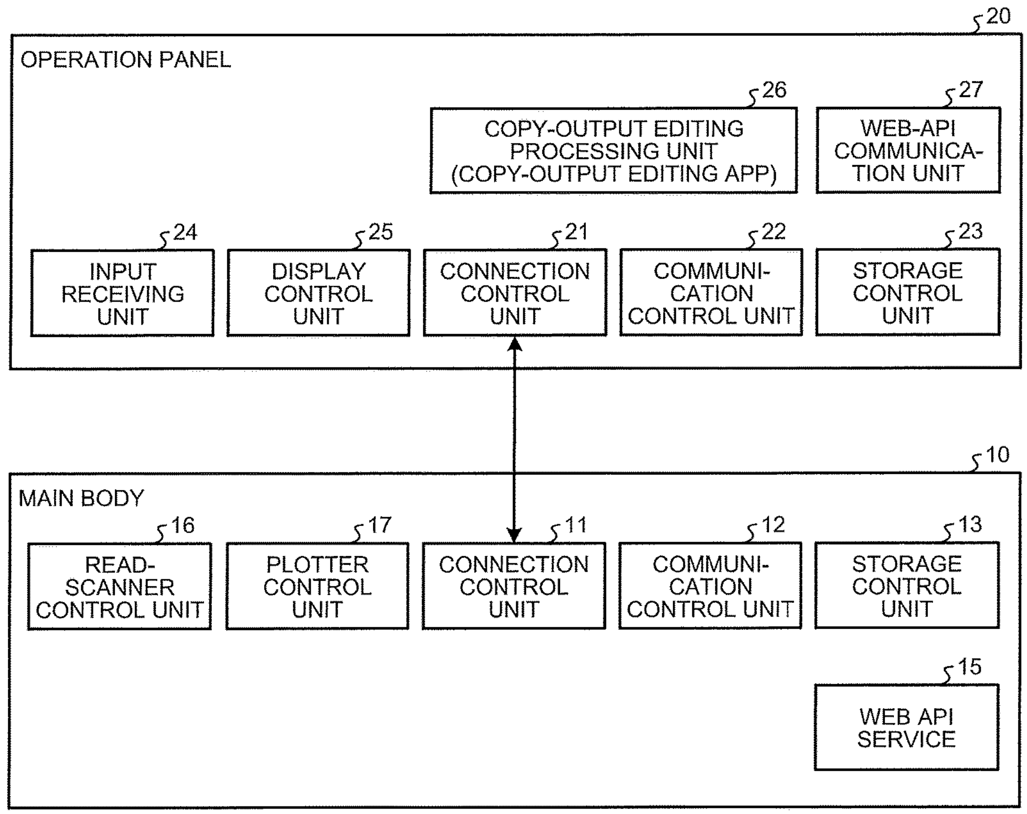
FIG. 3 is a diagram that illustrates an example of the function performed by each of a main body and an operation panel.

FIG. 3 is a diagram that illustrates an example of the function performed by each of the main body 10 and the operation panel 20. FIG. 3 principally illustrates the function for the operation panel 20 to give a command to the main body 10 so as to conduct the function for copying and the function for enabling a masking operation.

As illustrated in FIG. 3, the main body 10 provides functions, such as a connection control unit 11, a communication control unit 12, a storage control unit 13, a Web API service 15, a read-scanner control unit (scanner control unit) 16, and a plotter control unit 17.

The connection control unit 11 controls the connection I/F 105 to establish communication with the operation panel 20 and transmit and receive data to and from the operation panel 20.

The communication control unit 12 controls the communication I/F 104 to establish communication with a communication destination and transmit and receive data to and from the communication destination.

The storage control unit 13 accesses a memory area, such as the ROM 101, the RAM 102, or the HDD 103, to read out data, write data, or the like. A first temporary memory area for temporarily storing scanning image (read image) is acquired in part of the memory area of the RAM 102. Here, "scanning image" is the scanning data output from the read scanner by being stored in an image format, such as TIFF (Tagged Image File Format) or JPEG.

The Web API service 15 provides various types of APIs. They include the one for receiving commands to execute copying from the operation panel 20, the one for providing the operation panel 20 with a masking operation on images for copy output, or the like. Furthermore, the Web API service 15 is implemented as a Web server that is provided on the side of the main body 10 in the MFP 1.

The Web server conducts HTTP (Hypertext Transfer Protocol) communication with the operation panel 20 and external devices. During the communication, the Web server processes request data included in received data and performs a process to return a processing result to the requester.

The read-scanner control unit 16 controls the read scanner in the engine 106 according to the settings designated by a user. The plotter control unit 17 controls the plotter in the engine 106 according to the settings designated by a user.

The operation panel 20 provides functions such as a connection control unit 21, a communication control unit 22, a storage control unit 23, an input receiving unit 24, a display control unit 25, a copy-output editing processing unit (copy-output editing app, masking app) 26, or a Web-API communication unit 27.

The connection control unit 21 controls the connection I/F 205 to establish communication with the main body 10 and transmit and receive data to and from the main body 10. For example, the connection control unit 21 transmits, to the connection control unit 11 of the main body 10, an operation signal to make a command to conduct copying. Furthermore, the connection control unit 21 transmits and receives information for masking to and from the connection control unit 11 of the main body 10.

The communication control unit 22 controls the communication I/F 204 to establish communication with a communication destination and transmit and receive data to and from the communication destination.

The storage control unit 23 accesses a memory area, such as the ROM 201, the RAM 202, or the flash memory 203, to read data, write data, or the like. A second temporary memory area for temporarily storing scanning image and a third temporary memory area for temporarily storing masking patterns are acquired in part of the memory area of the RAM 202.

The input receiving unit 24 receives information on a touch position from the touch panel 206, thereby receiving input of operation commands.

The display control unit 25 outputs display screen information to the LCD 207.

The copy-output editing processing unit 26 performs an editing process for copy output with an operator of the operation panel 20 in an interactive manner. For copy output, the copy-output editing processing unit 26 gives a command to the display control unit 25 so as to update the display of screen information, receive operator's input information from the input receiving unit 24, give a command to the Web-API communication unit 27 so as to transmit request data to the main body 10, or receive response data from the main body 10 through the Web-API communication unit 27.

The Web-API communication unit 27 conducts HTTP communications with the main body 10. Specifically, the Web-API communication unit 27 uses an HTTP client to transmit a request based on user's input, received by the copy-output editing processing unit 26 through the UI (user interface) of the operation panel 20, to the Web server of the main body 10. At that point, the Web-API communication unit 27 transmits the information for calling the API (function) to the Web API service 15 of the main body 10 so as to give an execution command of an execution commanding unit 261, which is described later, to the main body 10. During the HTTP communication, the Web-API communication unit 27 optionally designates an API of the Web API service 15 and receives an execution processing result of the API.

Figure 4:
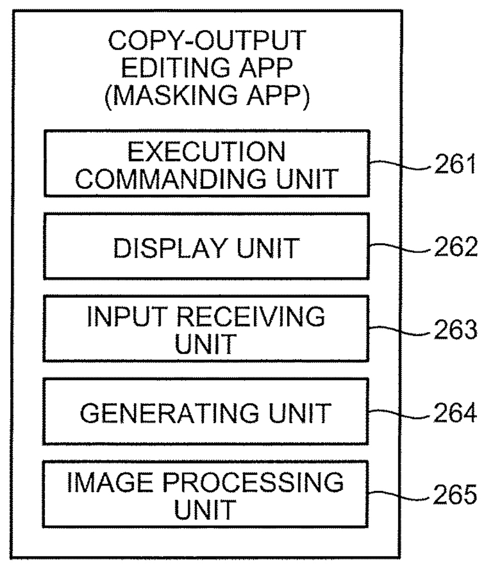
FIG. 4 is a diagram that illustrates an example of the configuration of a copy-output editing app.

FIG. 4 is a diagram that illustrates an example of the configuration of a copy-output editing app. As illustrated in FIG. 4, the copy-output editing app includes the execution commanding unit 261, a display unit 262, an input receiving unit 263, a generating unit 264, and an image processing unit 265.

The execution commanding unit 261 gives a command to the main body 10 through the Web-API communication unit 27 so as to conduct scanning, printing, transmission, storage, and the like. Furthermore, for scanning, a command is given to perform a process to acquire read images in a RGB format on the operation panel 20.

The display unit 262 previews read images.

The input receiving unit 263 receives input of information from users. The information includes positions (coordinates), color (RGB values), and the like.

The generating unit 264 generates masking information on the basis of the information received by the input receiving unit 263.

The image processing unit 265 performs synthesis to mask a read image by changing RGB values of the read image on the basis of masking information.

Furthermore, the Web-API communication unit 27 may be provided as a copy-output editing app rather than as a separate app such as a system app included in a service layer of the operation panel 20.

With the functional configuration according to the first embodiment, the read-scanner control unit 16 is equivalent to "a document read unit". The plotter control unit 17 is equivalent to "an image forming unit". The input receiving unit 24 and the input receiving unit 263 are equivalent to "an input receiving unit". The display control unit 25 and the display unit 262 are equivalent to "a display unit". The image processing unit 265 of the copy-output editing processing unit 26 is equivalent to "an image processing unit". The generating unit 264 is equivalent to "a generating unit". The Web API service 15 and the Web-API communication unit 27 are equivalent to "a read-API communication unit", "an image-formation API communication unit", "an image-read API communication unit", "an image-acquisition API communication unit", "a storage-API communication unit", "an acquisition-API communication unit", and the like, which are "an API communication unit".

Figure 5:
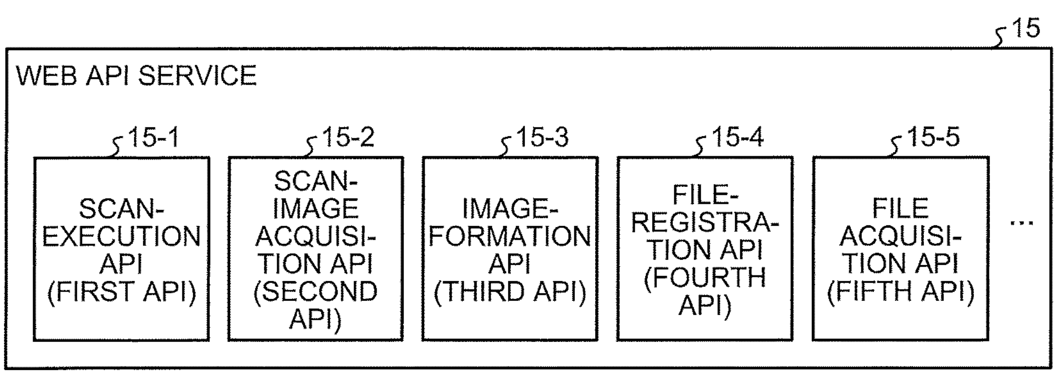
FIG. 5 is a diagram that illustrates an example of APIs that are provided by a Web API service for different types of operation.

FIG. 5 is a diagram that illustrates an example of APIs that are provided by the Web API service 15 for different types of operation. As illustrated in FIG. 5, the Web API service 15 provides a scan-execution API 15-1 (which is equivalent to "the image-read API communication unit" and "a first API"), a scan-image acquisition API 15-2 (which is equivalent to "the image-acquisition API communication unit" and "a second API"), an image-formation API 15-3 (which is equivalent to "the image-formation API communication unit" and "a third API"), a file-registration API 15-4 (which is equivalent to "the storage-API communication unit" and "a fourth API"), a file acquisition API 15-5 (which is equivalent to "the acquisition-API communication unit" and "a fifth API"), and the like.

FIG. 6 is a diagram that illustrates an example of the specification of each API. FIG. 6 illustrates a service provided by the main body 10, a designated path (URL) of an API, and a method for each type of API. For example, with regard to the first API 15-1, as a request designating the POST method and the path "/ricoh/scan/job" is transmitted from the operation panel 20 to the main body 10, the main body 10 conducts scanning of a document.

Configuration of Request Data

Next, FIGS. 7A to 7E illustrate the configurations of request data that is transmitted to the main body 10 by the Web-API communication unit 27. Furthermore, a response from the main body 10 for the request is data in a JSON (JavaScript (registered trademark) Object Notation) format, or the like.

FIG. 7A is a diagram that illustrates an example of the configuration of request data when the Web-API communication unit 27 gives a command to the main body 10 so as to execute scanning. As illustrated in FIG. 7A, the URL of the first API 15-1 (see FIG. 5) is designated to make a POST request.

FIG. 7B is a diagram that illustrates an example of the configuration of request data when the Web-API communication unit 27 gives a command to the main body 10 so as to acquire scanning image. As illustrated in FIG. 7B, the URL of the second API 15-2 (see FIG. 5) is designated to make a GET request.

FIG. 7C is a diagram that illustrates an example of the configuration of request data when the Web-API communication unit 27 gives a command to the main body 10 so as to conduct image formation. As illustrated in FIG. 7C, the URL of the third API 15-3 (see FIG. 5) is designated to make a POST request.

FIG. 7D is a diagram that illustrates an example of the configuration of request data when the Web-API communication unit 27 registers a masking pattern in the main body 10. As illustrated in FIG. 7D, the URL of the fourth API 15-4 (see FIG. 5) is designated to make a POST request.

FIG. 7E is a diagram that illustrates an example of the configuration of request data when the Web-API communication unit 27 brings up a masking pattern from the main body 10. As illustrated in FIG. 7E, the URL of the fifth API 15-5 (see FIG. 5) is designated to make a GET request.

Screen configuration of the screen presented on the operation panel 20

Figure 8:
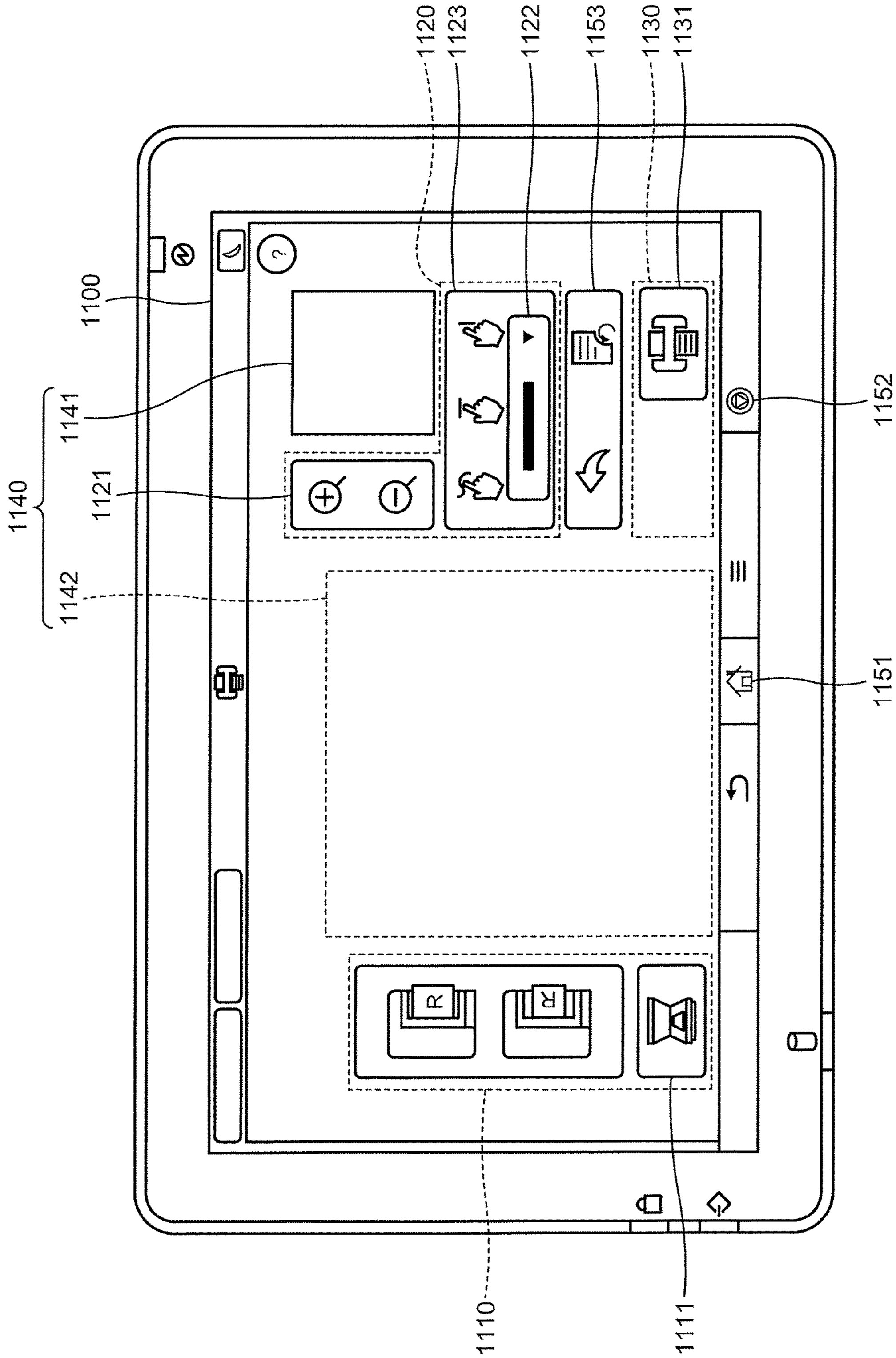
FIG. 8 is a diagram that illustrates an example of the display screen that is presented on the operation panel.

FIG. 8 is a diagram that illustrates an example of the display screen that is presented on the operation panel 20. FIG. 8 illustrates a copy-editing operation screen 1100. The copy-editing operation screen 1100 includes a scanning-operation button display area 1110, a masking-operation button display area 1120, an image-formation operation button display area 1130, an image display area 1140, and the like.

Various types of operation buttons are provided on the scanning-operation button display area 1110, the masking-operation button display area 1120, and the image-formation operation button display area 1130.

As the above-described operation button, a scanning execution button 1111 is included in the scanning-operation button display area 1110. The scanning execution button 1111 is a command button for giving a command to the main body 10 so as to execute scanning.

The masking-operation button display area 1120 includes a zoom button 1121, a drawing-object selection button 1122, a line correction button 1123, and the like. The zoom button 1121 is a command button for gradually enlarging or reducing scanning images (preview images) presented on the image display area 1140. The drawing-object selection button 1122 is a selection button for selecting a drawing object that designates the thickness of masking from multiple choices in a pull-down method. The line correction button 1123 is a handwriting assist button for correcting trajectories of a finger, or the like (may be a stylus, or the like) on the screen to be predetermined lines. As the above-described predetermined lines, for example, horizontal lines, vertical lines, or curved lines are provided in settings.

An image-formation execution button 1131 is included in the image-formation operation button display area 1130. The image-formation execution button 1131 is a command button for giving a command to the main body 10 so as to perform image formation. In addition, a setting button for setting an image formation condition may be included. The setting button causes a setting screen for an image formation condition to be displayed due to touch operation so that the setting of the image formation condition is received on the setting screen. The set condition is transmitted to the main body 10.

A home button 1151 for returning to the home screen, a stop button 1152 for terminating the screen, a clear button 1153 for deleting scanning images, and the like, are included in display areas of other operation buttons.

A full display area 1141 and an enlargement/reduction display area 1142 are provided in the image display area 1140. The full display area 1141 is an image display area for displaying the entire preview image after scanning. The enlargement/reduction display area 1142 is an image display area for displaying enlarged images or reduced images. Images are displayed on each of the areas by using image viewers, or the like.

Overall Schematic Flow

Next, the overall schematic flow of the MFP 1 is explained.

Figure 9:
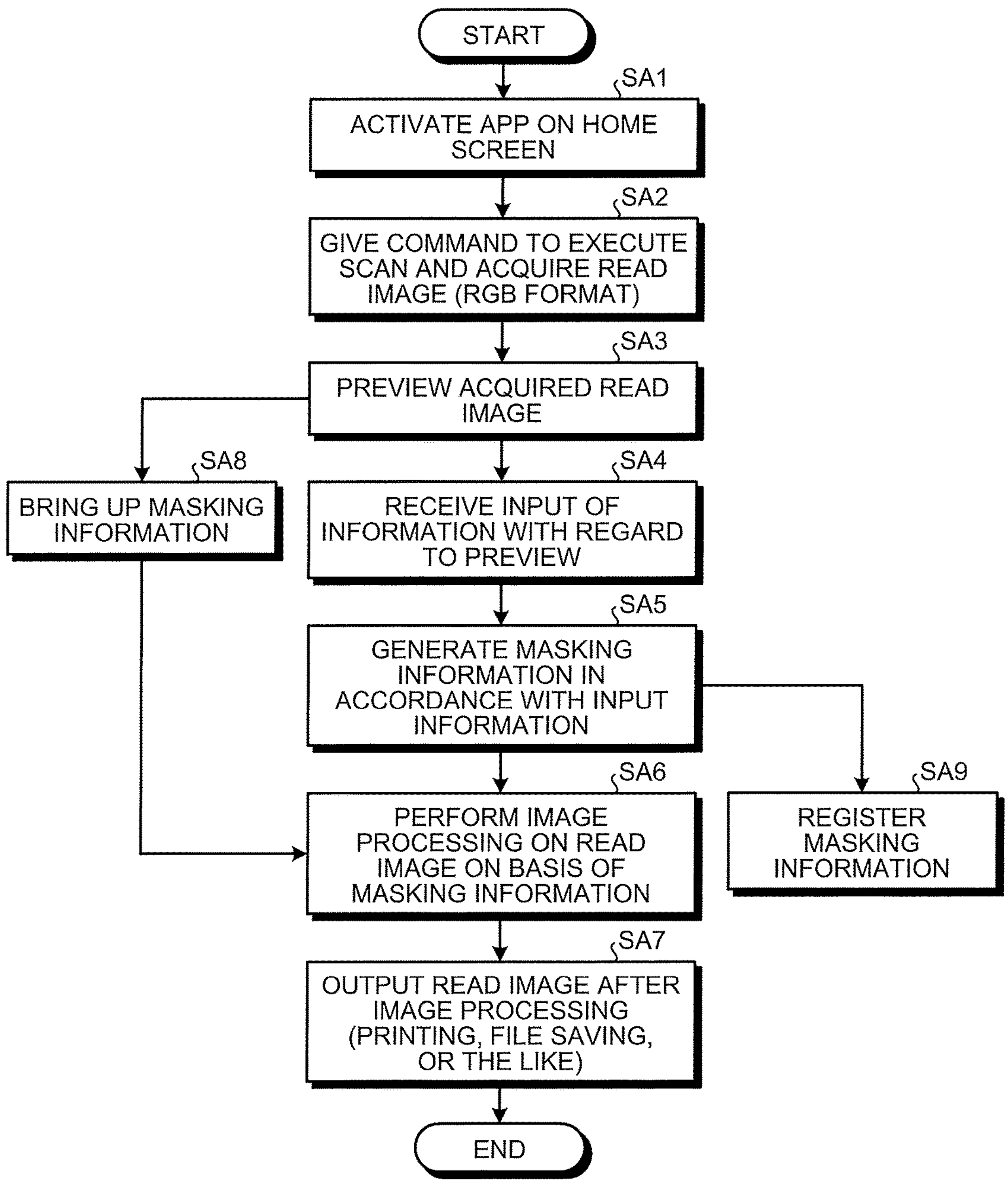
FIG. 9 is a diagram that illustrates an example of the overall schematic flow of the MFP.

FIG. 9 is a diagram that illustrates an example of the overall schematic flow of the MFP 1. First, the MFP 1 activates the copy-output editing app (masking app) on the home image of the operation panel 20 (Step SA1).

Then, the MFP 1 gives a command to execute scanning and acquires a read image in a RGB format (Step SA2).

Then, the MFP 1 previews the acquired read image (Step SA3).

Then, the MFP 1 receives input of information with regard to the preview (Step SA4) and generates masking information in accordance with the received information (Step SA5).

Then, the MFP 1 performs image processing on the read image on the basis of the masking information (Step SA6).

Then, the MFP 1 outputs the read image after image processing by printing, file saving, or the like (Step SA7).

Furthermore, the MFP 1 may also bring up masking information on the preview at Step SA3. If masking information is brought up (Step SA8), the MFP 1 skips Steps SA4 and SA5 and, at Step SA6, performs image processing on the read image on the basis of the masking information that is brought up at Step SA8.

Furthermore, the MFP 1 may also register the masking information generated at Step SA5. If registration is commanded at Step SA5, the MFP 1 performs a process (Step SA6) to conduct image processing on the read image on the basis of the generated masking information and performs a process (Step SA9) to register the masking information. The registered masking information may be used by being brought up again at Step SA8.

Detailed Flow

Next, an explanation is given of the detailed flow of the MFP 1 when a copying operation and a masking operation for the image that is copy output are performed on the operation panel 20. First, an explanation is given of a process of the operation panel 20 on the basis of the process flowchart illustrated in FIG. 10. Furthermore, in the explanation for this process, user's operation steps and screen flows of the operation panel 20 are explained with reference to FIGS. 11A to 11M as appropriate.

Operation of the Operation Panel 20

Figure 10:
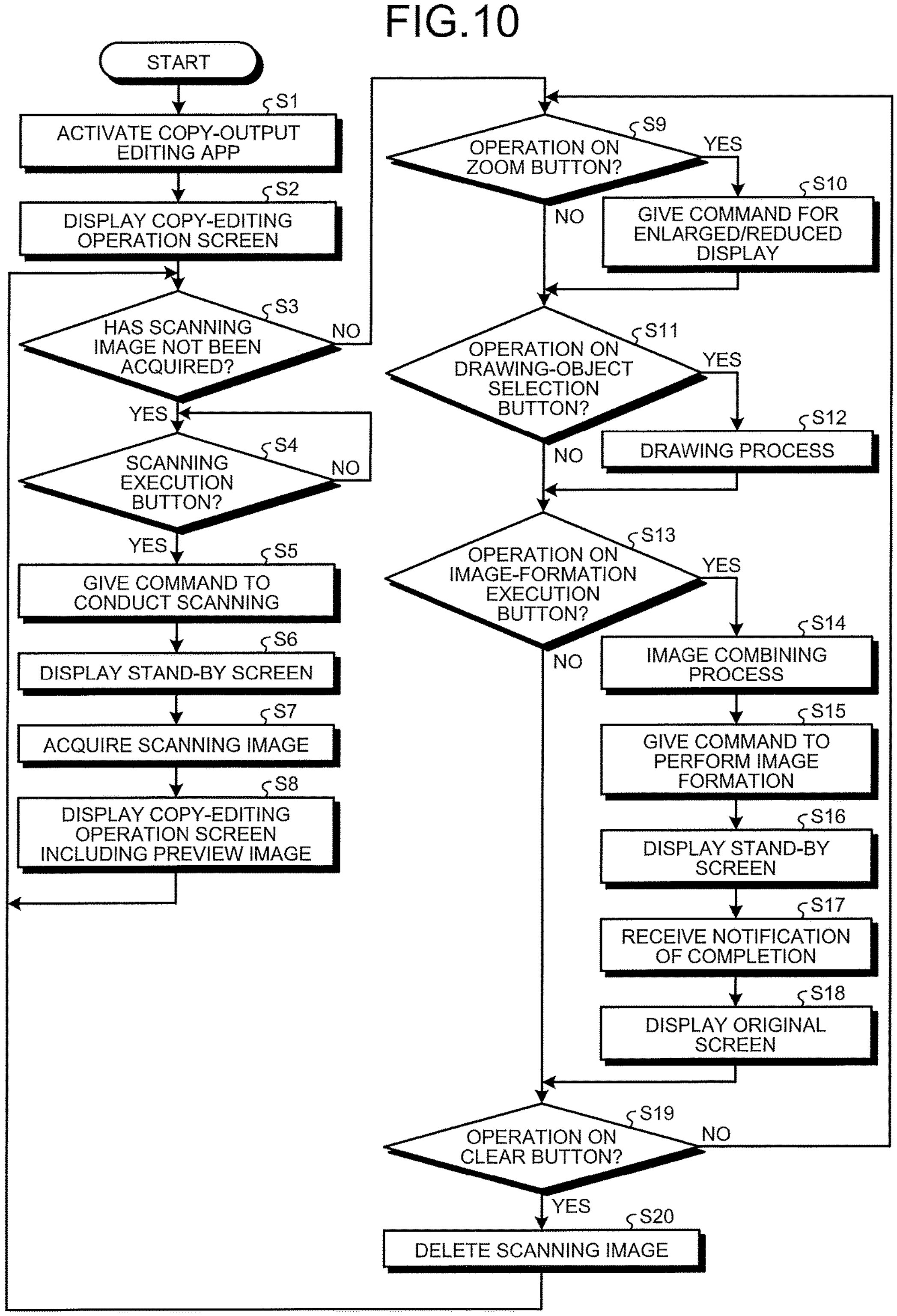
FIG. 10 is a diagram that illustrates an example of the process flow of the operation panel.

FIG. 10 is a diagram that illustrates an example of the process flow of the operation panel 20 from when the copy-output editing app is activated to when the document is output as copy in the main body 10. Here, it is assumed that the OS of the operation panel 20 has been activated and a communication connection between the operation panel 20 and the main body 10 through the communication path 30 has been completed.

First, when a touch operation is performed on an icon 1001 of the copy-output editing app on a home screen 1000 (see FIG. 11A), the copy-output editing processing unit 26 gets activated (Step S1). Specifically, a program is loaded into the RAM 202 so that the copy-output editing processing unit 26 gets activated. Although termination of the program is not illustrated in the flow, the program is securely terminated due to a touch operation on the stop button 1152 (see FIG. 8) when the touch operation is appropriately received.

After activation, the copy-output editing processing unit 26 gives a command to the display control unit 25 so as to display the copy-editing operation screen 1100 (see FIG. 8) and stands by while input from the input receiving unit 24 is receivable (Step S2). Furthermore, at this stage, on the copy-editing operation screen 1100, only the scanning-operation button display area 1110 is set to be on so that input is received for the buttons included in the area, and the others are set to be off so that input is not received for the buttons (see FIG. 11B).

Figure 11A:
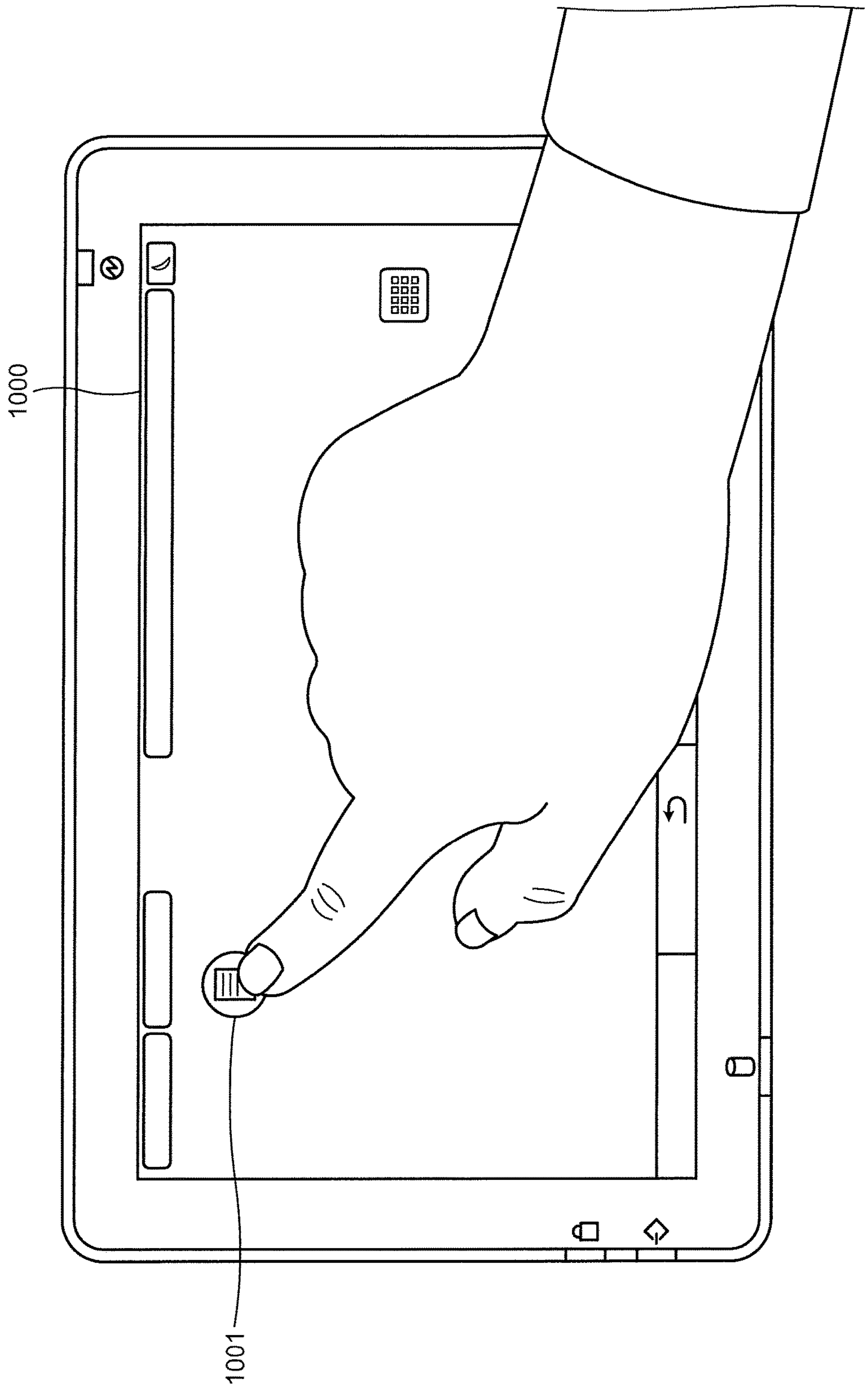
FIG. 11A is a diagram that illustrates a situation according to an example of user's operation.
Figure 11B:
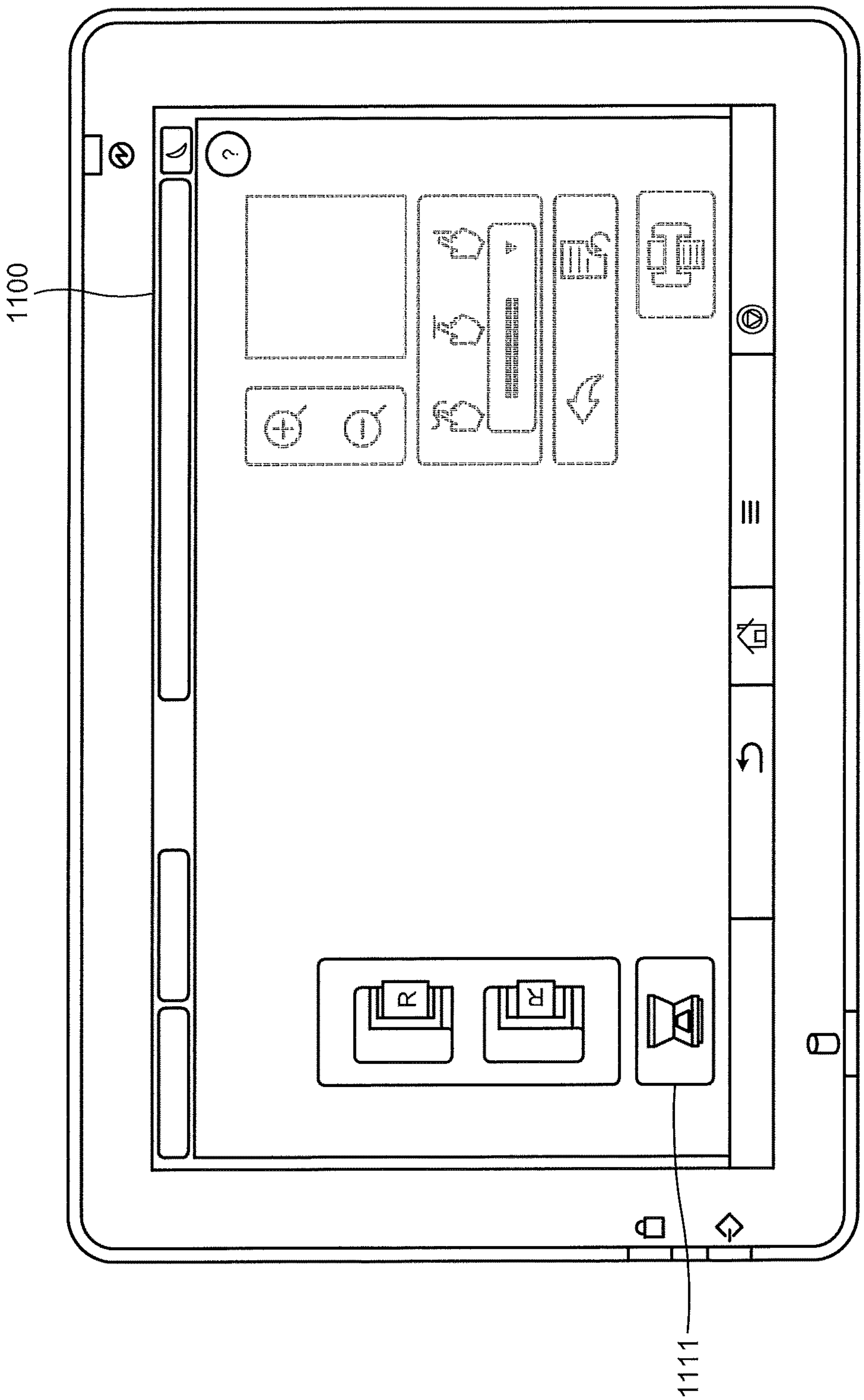
FIG. 11B is a diagram that illustrates a situation according to an example of user's operation.
Figure 11C:
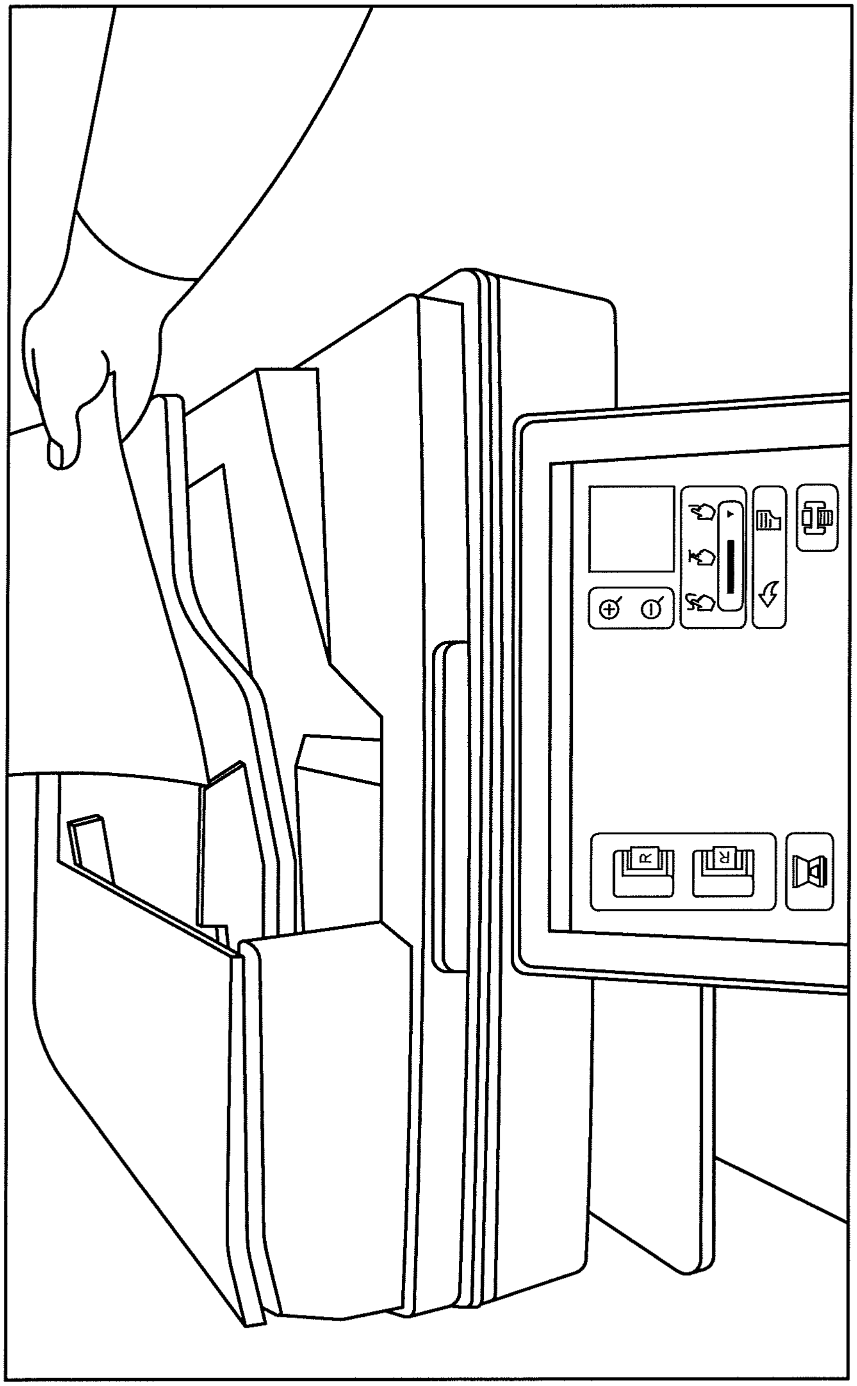
FIG. 11C is a diagram that illustrates a situation according to an example of user's operation.
Figure 11D:
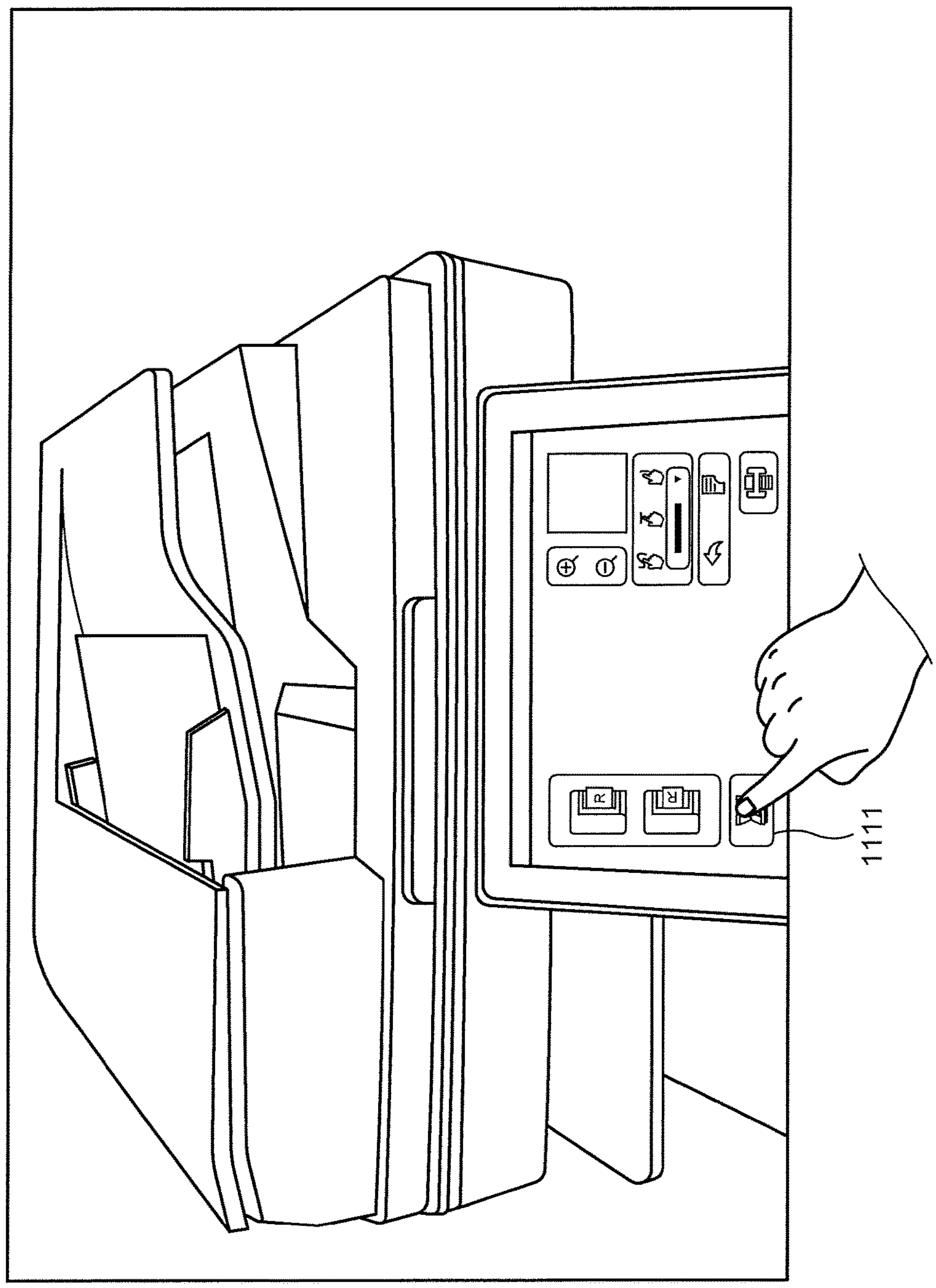
FIG. 11D is a diagram that illustrates a situation according to an example of user's operation.
Figure 11E:
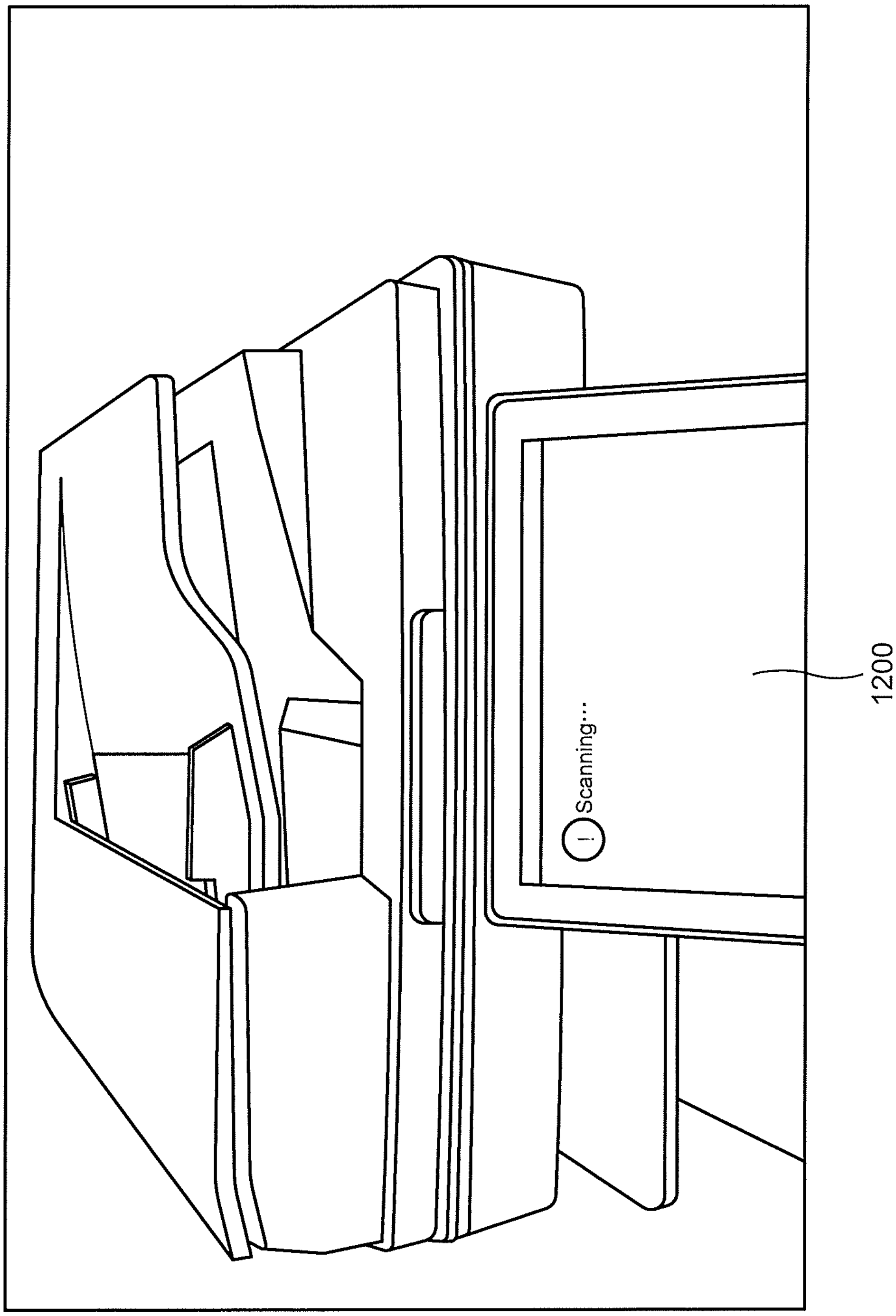
FIG. 11E is a diagram that illustrates a situation according to an example of user's operation.
Figure 11F:
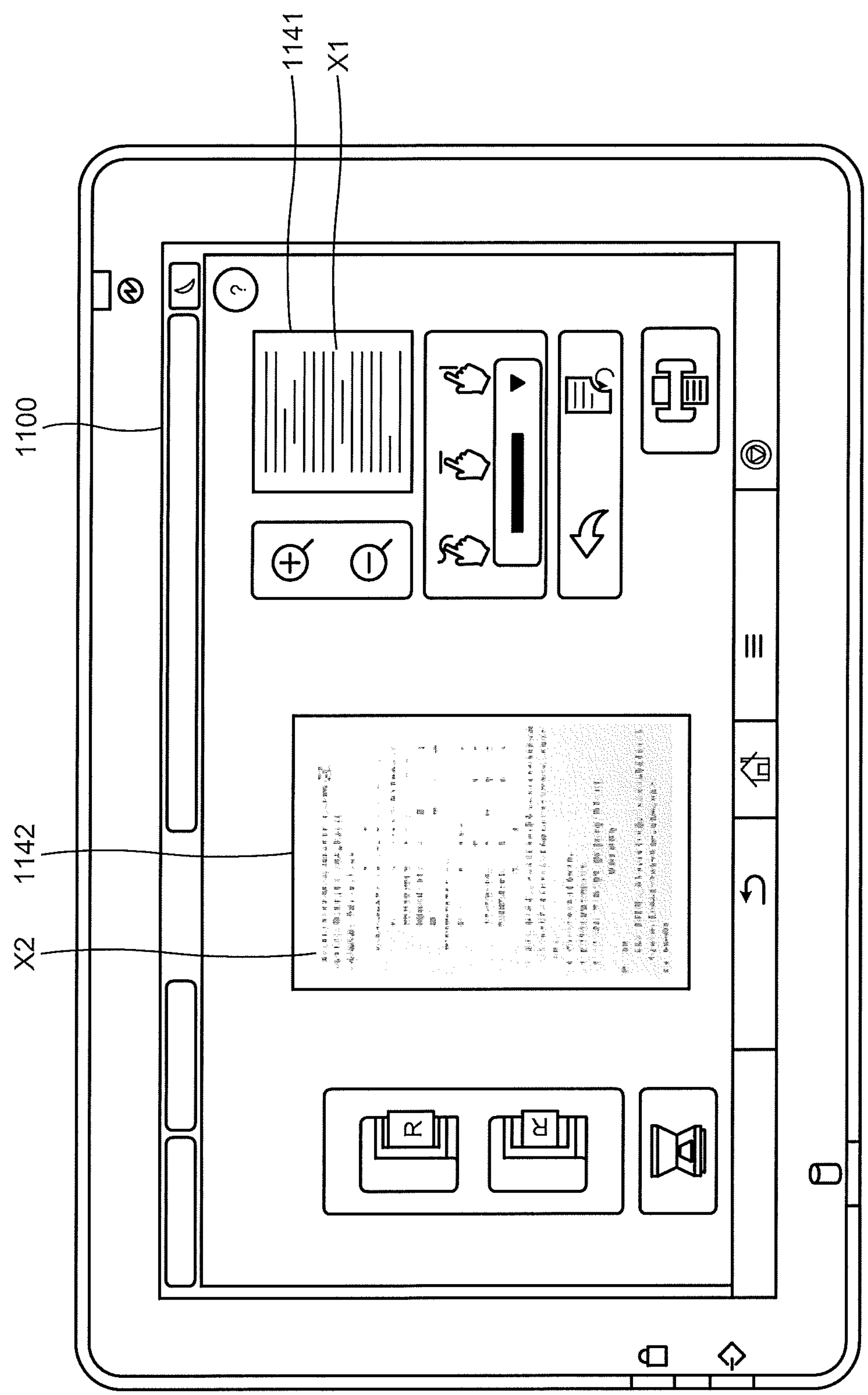
FIG. 11F is a diagram that illustrates a situation according to an example of user's operation.
Figure 11G:
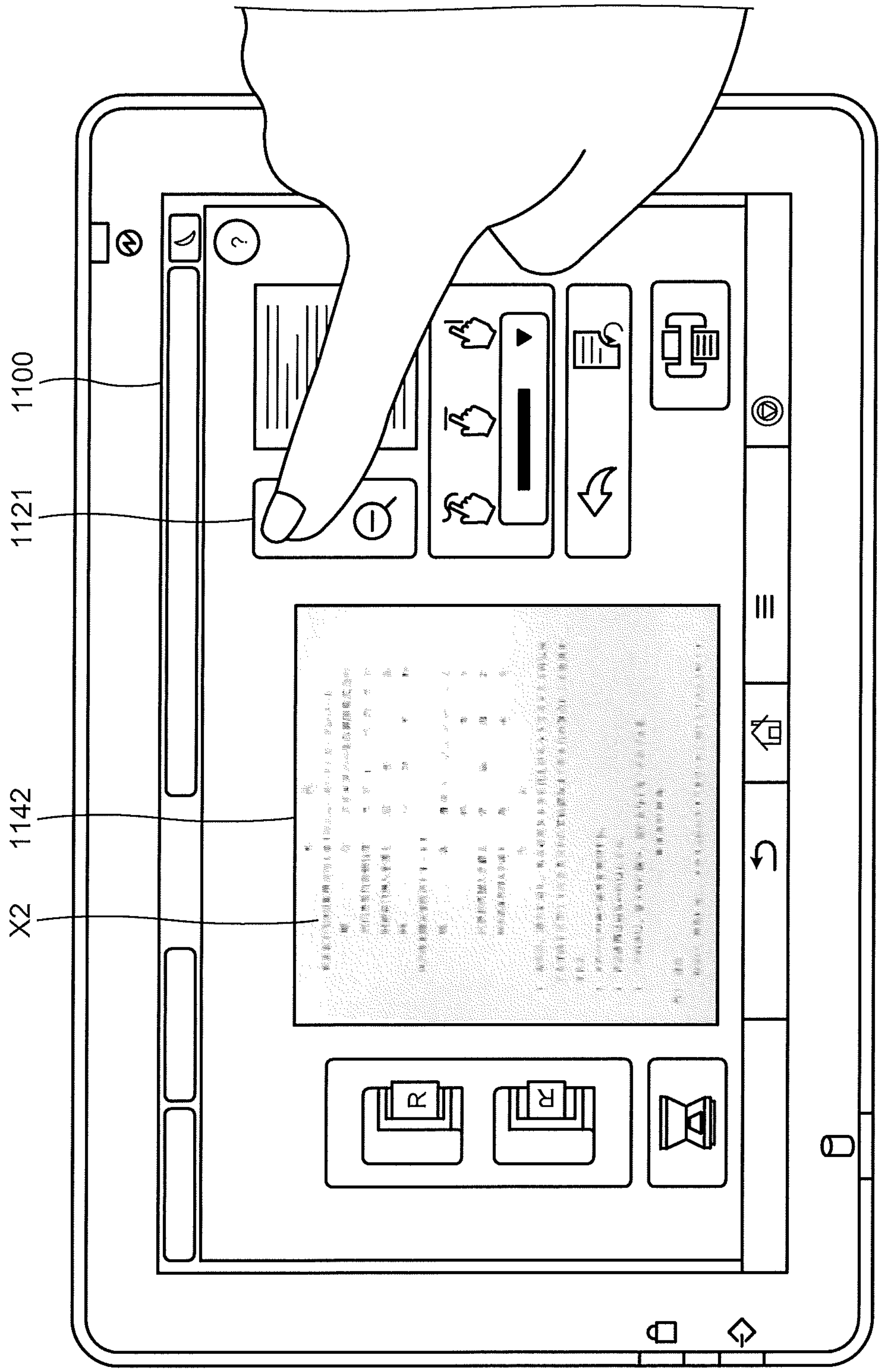
FIG. 11G is a diagram that illustrates a situation according to an example of user's operation.

A user places a document on the main body 10 (see FIG. 11C) and then performs a touch operation on the scanning execution button 1111 (see FIG. 11D).

After Step S2, the copy-output editing processing unit 26 determines whether a scanning image has not been acquired (Step S3). For example, the copy-output editing processing unit 26 sets a flag area in the RAM 202 and manages an acquired state and an unacquired state of a scanning image by using the flag area. If a scanning image has been acquired, "1" is set and, if it is cleared or by default, "0" is set. At the first time, a scanning image has not been acquired.

If a scanning image has not been acquired (Step S3: determined as Yes), the copy-output editing processing unit 26 determines whether the touched button is the scanning execution button 1111 on the basis of the input information received by the input receiving unit 24 (Step S4).

If it is not a touch operation on the scanning execution button 1111 (Step S4: determined as No), the copy-output editing processing unit 26 stands by until a touch operation is performed on the scanning execution button 1111.

If a touch operation is performed on the scanning execution button 1111 (Step S4: determined as Yes), the copy-output editing processing unit 26 gives a command to the main body 10 so as to conduct scanning (Step S5).

After execution is commanded, the copy-output editing processing unit 26 gives a command to the display control unit 25 so as to display a stand-by screen indicating that scanning is being conducted (Step S6). Thus, the screen of the operation panel 20 is a stand-by screen 1200 (see FIG. 11E) indicating that scanning is being conducted.

After Step S6, when a scanning image is transmitted as an execution result from the main body 10, the copy-output editing processing unit 26 acquires it (Step S7). The scanning image is temporarily stored in the second temporary memory area.

Then, the copy-output editing processing unit 26 gives a command to the display control unit 25 so as to display, on the copy-editing operation screen 1100 (see FIG. 8), the screen where presentation of the scanning image is set on and stands by while input from the input receiving unit 24 is receivable (Step S8).

Specifically, the copy-output editing processing unit 26 displays the acquired scanning image (preview image) on the full display area 1141 (see FIG. 8) and the enlargement/reduction display area 1142 (see FIG. 8) of the copy-editing operation screen 1100. Furthermore, at this stage, the others than the scanning-operation button display area 1110 are set on, and input is received for buttons in each area. Thus, the screen of the operation panel 20 returns to the copy-editing operation screen 1100 (see FIG. 11F), the acquired scanning image is displayed as a full image X1 on the full display area 1141, and the acquired scanning image is displayed as an enlarged/reduced image X2 on the enlargement/reduction display area 1142.

Figure 11H:
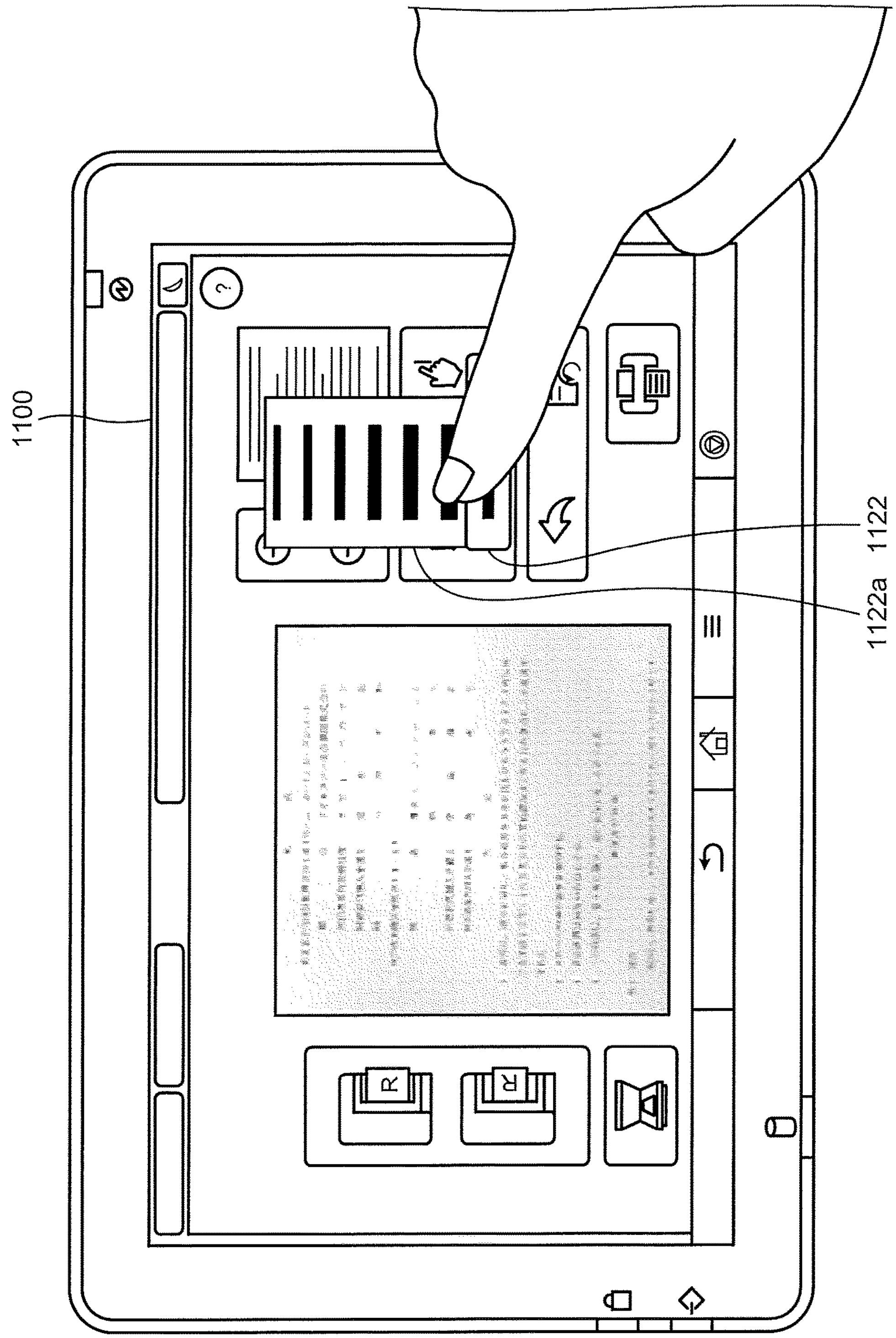
FIG. 11H is a diagram that illustrates a situation according to an example of user's operation.
Figure 11I:
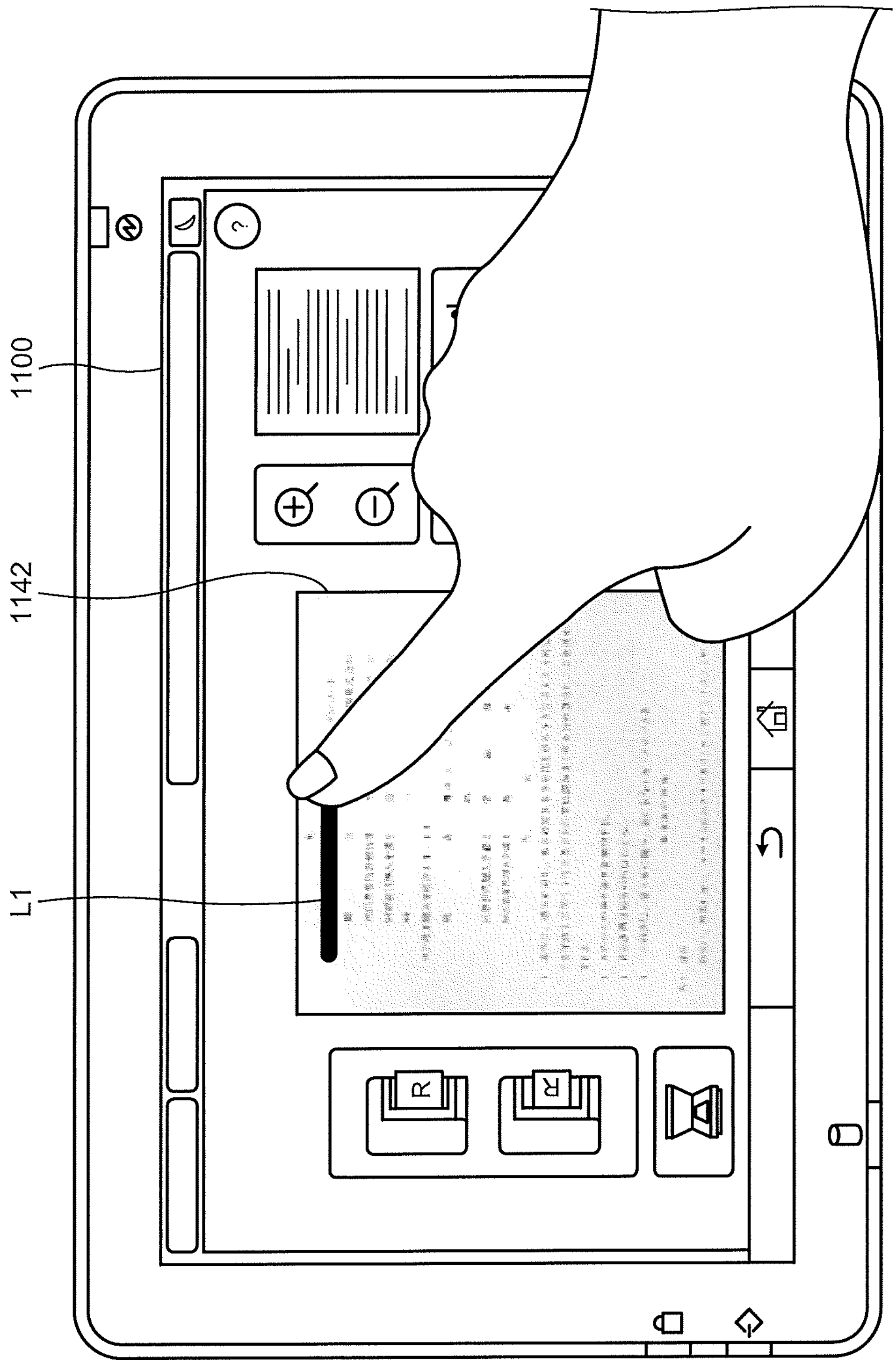
FIG. 11I is a diagram that illustrates a situation according to an example of user's operation.
Figure 11J:
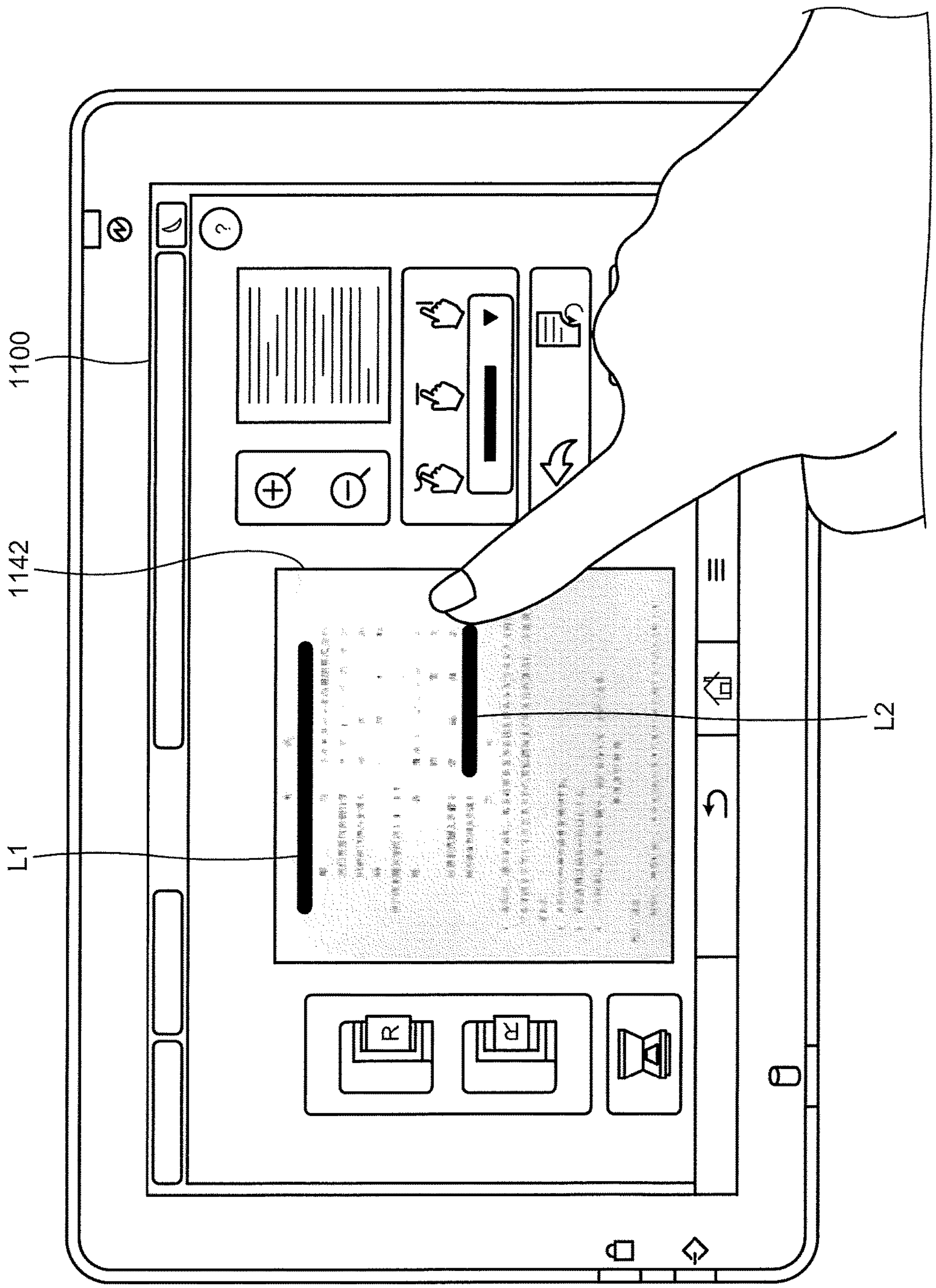
FIG. 11J is a diagram that illustrates a situation according to an example of user's operation.
Figure 11K:
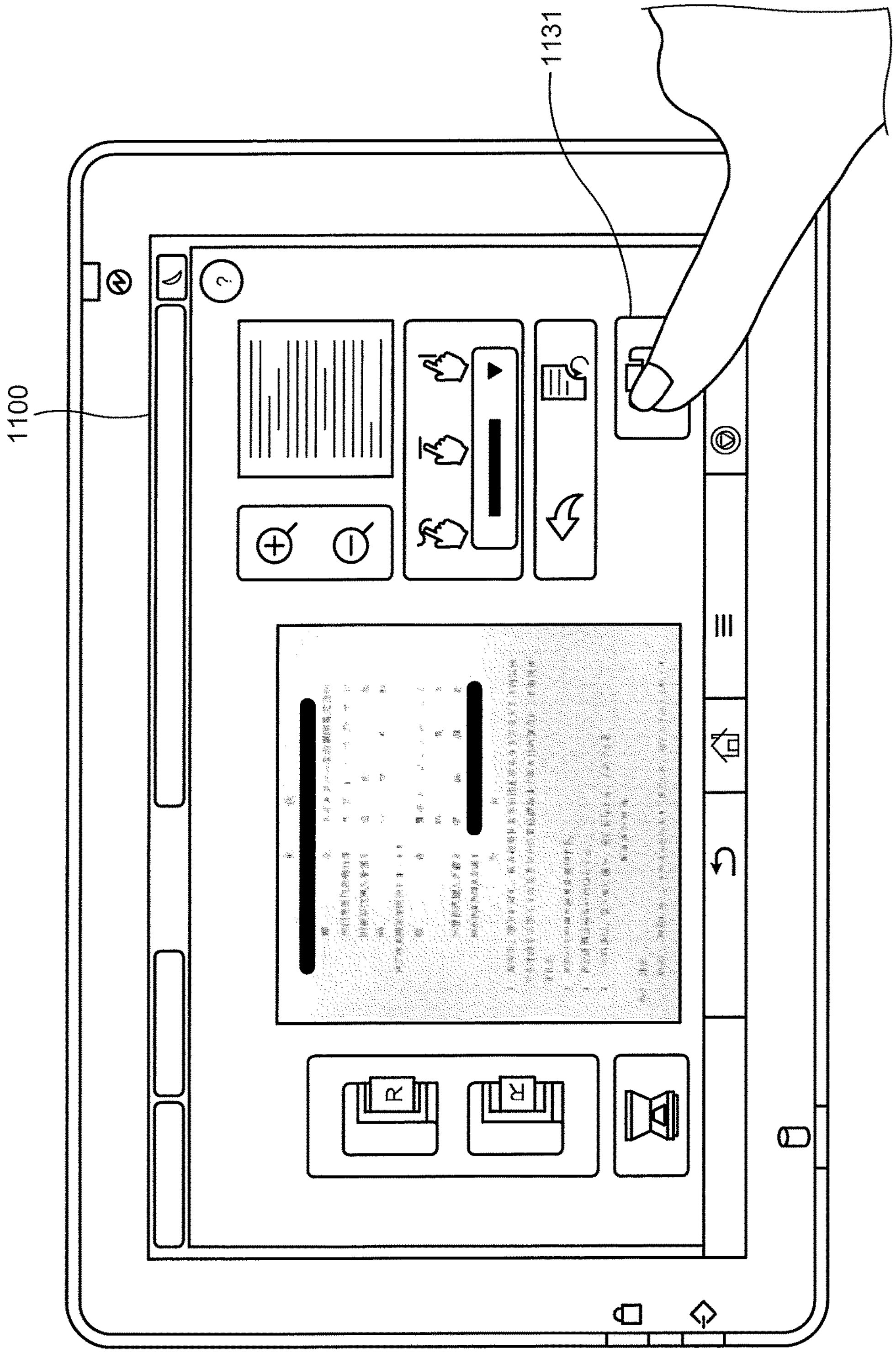
FIG. 11K is a diagram that illustrates a situation according to an example of user's operation.
Figure 11L:
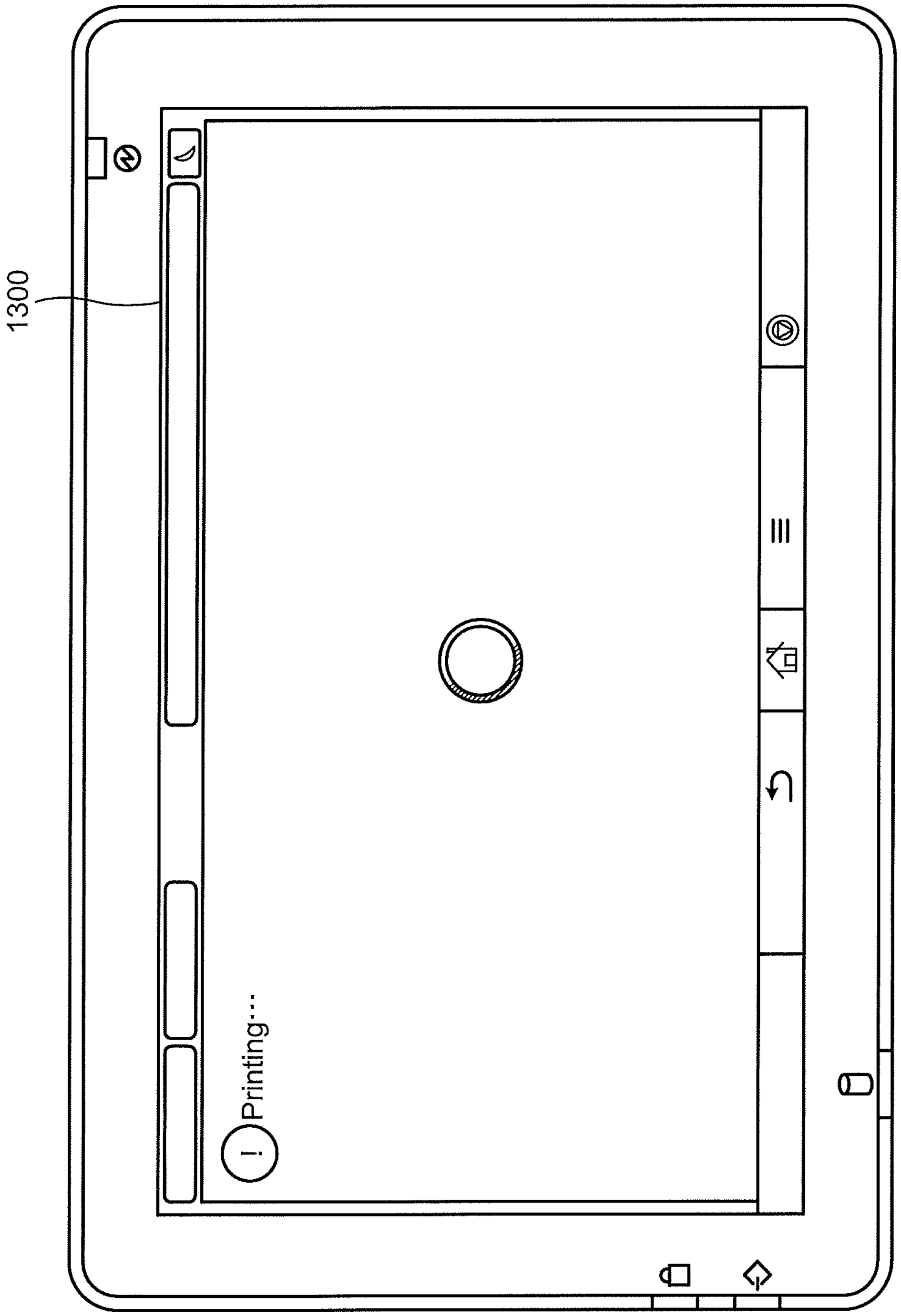
FIG. 11L is a diagram that illustrates a situation according to an example of user's operation.
Figure 11M:
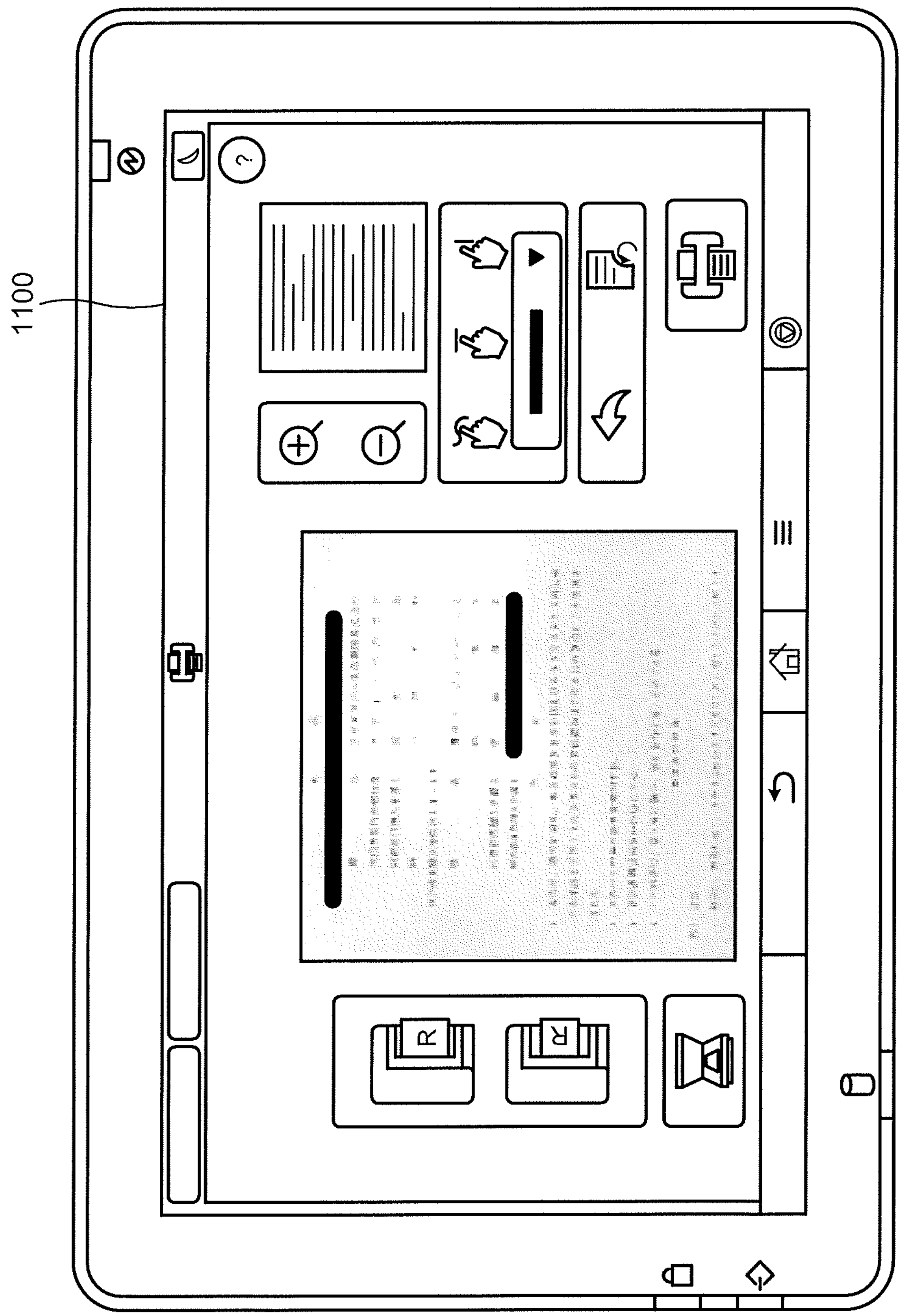
FIG. 11M is a diagram that illustrates a situation according to an example of user's operation.

A user performs an operation to enlarge the scanning image displayed on the enlargement/reduction display area 1142 by using the zoom button 1121 (see FIG. 11G) and performs an operation to mask personal information, or the like, included in the scanning image (see FIG. 11H, FIG. 11I, and FIG. 11J).

After Step S8, the copy-output editing processing unit 26 determines the button on which a touch operation has been performed on the copy-editing operation screen 1100 and performs an operation as described below in accordance with the button on which the touch operation has been performed.

When it is determined that a touch operation has been performed on the zoom button 1121 (Step S9: determined as Yes), the copy-output editing processing unit 26 gives a command to the display control unit 25 so as to gradually enlarge/reduce display of the scanning image on the enlargement/reduction display area 1142 in accordance with the type (enlargement or reduction) of the zoom button 1121 or the number of times a touch operation is performed (Step S10). Thus, a scanning image is enlarged or reduced for display on the enlargement/reduction display area 1142 of the operation panel 20 (see FIG. 11G).

After Step S10, the process of the copy-output editing processing unit 26 transitions to the process at Step S11.

Furthermore, when it is determined that a touch operation has been performed on the drawing-object selection button 1122 (Step S11: determined as Yes), the copy-output editing processing unit 26 receives drawing input operation for masking on the enlargement/reduction display area 1142 and performs a drawing process (Step S12).

Specifically, when one of drawing objects 1122*a* that are pulled down for display on the drawing-object selection button 1122 (see FIG. 11H) is selected due to a touch operation (for example, among the six levels in black color, the thickness "6" that is the sixth from the top is selected), a drawing function (an example of "the generating unit") is activated so that drawing input operation for masking are receivable on the enlargement/reduction display area 1142 (see FIG. 11I). Then, when a user traces a scanning image, which is enlarged/reduced for display on the enlargement/reduction display area 1142, with a finger, or the like, the coordinates (an example of "the positional information") at any position touched and the moving direction are detected and, in accordance with its trajectory, a line with the width of the selected drawing object (the thickness "6" in black) is written and stored in the third temporary memory area. Moreover, if the line correction button 1123 for horizontal lines, vertical lines, curved lines, or the like, is selected, the line corrected in accordance with the setting is stored.

If multiple areas are to be simultaneously masked on a single scanning image, each of the areas is traced with a finger, or the like, and the above-described information on each trajectory is written in the third temporary memory area. On the enlargement/reduction display area 1142, the trajectory of a finger, or the like, is subjected to a correction process so as to be a horizontal line, a vertical line, a curved line, or the like, as needed so that it is illustrated as a line (a line with the thickness "6" in black) L1 (see FIG. 11I). Furthermore, if another area is traced with a finger, or the like, the traced area is further illustrated as a line (a line with the thickness "6" in black) L2 (see FIG. 11J).

After Step S12, the process of the copy-output editing processing unit 26 transitions to the process at Step S13.

A user performs a touch operation on the image-formation execution button 1131 (see FIG. 11K), thereby giving a command for copy output of the masked document.

When it is determined that a touch operation has been performed on the image-formation execution button 1131 (Step S13: determined as Yes), the copy-output editing processing unit 26 performs a process to combine a masking pattern with the scanning image (Step S14) and gives a command to the main body 10 so as to perform image formation intended for the combined image (Step S15).

After execution is commanded, the copy-output editing processing unit 26 gives a command to the display control unit 25 so as to display the stand-by screen indicating that the image is being formed (Step S16). Thus, the screen of the operation panel 20 is a stand-by screen 1300 (see FIG. 11L) indicating that the image is being formed. In the main body 10, the image on which masking has been performed is formed on a recording medium, such as a sheet, and is printed out.

Then, after notification of image formation completion is received from the main body 10 (Step S17), the copy-output editing processing unit 26 gives a command to the display control unit 25 so as to return to the original display (Step S18). Thus, the screen of the operation panel 20 returns to the copy-editing operation screen 1100 (see FIG. 11M). After Step S18, the process of the copy-output editing processing unit 26 transitions to the process at Step S19.

Furthermore, when it is determined that a touch operation has been performed on the clear button 1153 (Step S19: determined as Yes), the copy-output editing processing unit 26 deletes the scanning image from the second temporary memory area, or the like, and repeatedly performs the process from Step S3 (Step S20). Here, the copy-output editing processing unit 26 sets the flag area of the RAM 202 to "0", resets presentation on the copy-editing operation screen 1100 to the default settings, or the like, and then repeatedly performs the process from Step S3.

Figure 12:
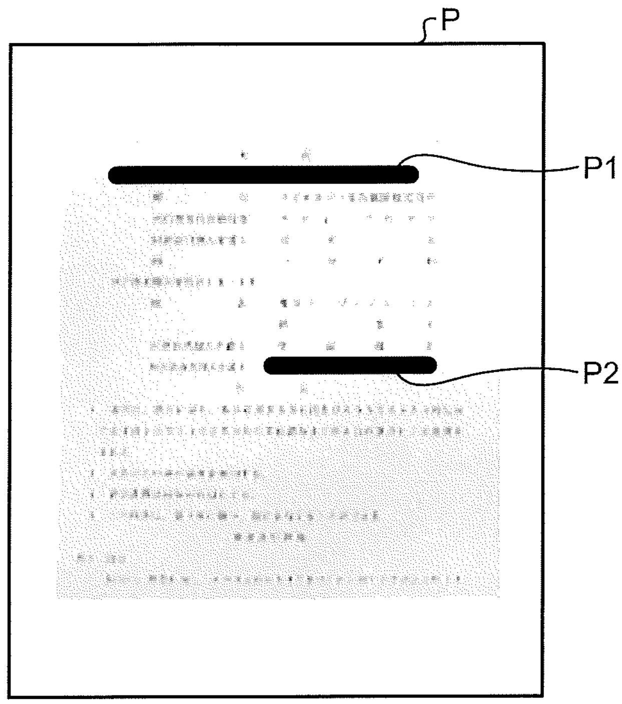
FIG. 12 is a diagram that illustrates an example of the output material that is printed out from the main body.

FIG. 12 is a diagram that illustrates an example of the output material that is printed out from the main body 10. As illustrated in FIG. 12, an output material P has masking P1 (which is equivalent to the line L1) and masking P2 (which is equivalent to the line L2) applied to the copy of the document.

Figure 13:
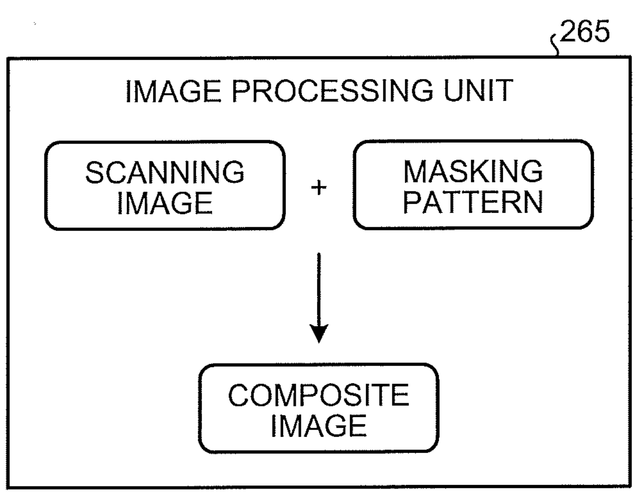
FIG. 13 is an explanatory diagram of image synthesis.

FIG. 13 is an explanatory diagram of image synthesis. When a touch operation has been performed on the image-formation execution button 1131, the copy-output editing processing unit 26 uses the image processing unit to combine the scanning image with the masking pattern.

As the image processing unit, for example the one provided by OpenCV (Open Source Computer Vision Library) is used. According to the first embodiment, scanning images are stored in the main body 10 in a color mode of an RGB format or with an image format of TIFF, JPEG, or the like, and scanning images are acquired by the operation panel 20 from the main body 10 in the mode or the image format. The image processing unit replaces a value (RGB value) of each pixel that are at coordinates on a scanning image and that are designated by masking information (masking pattern) with black (0,0,0). Specifically, during image processing, a process is performed to convert the color information (RGB value) on a pixel of a read image, located at the position designated by a user on the preview of the displayed read image, into the designated color information (e.g., black).

This process allows masking information to be superimposed and combined with read images.

Communication Sequence

Next, an explanation is given of communication processing between the operation panel 20 and the main body 10. According to the first embodiment, the operation panel 20 communicates with the main body 10 so as to conduct copy output in the main body 10 or perform a masking process on the image intended for copy output with the API (i.e., by using the API) provided by the main body 10. Here, explanation is given of the communication processing between the operation panel 20 and the main body 10 principally with regard to the function related to API processing, and illustration and explanation of other functional units are omitted as appropriate.

Figure 14:
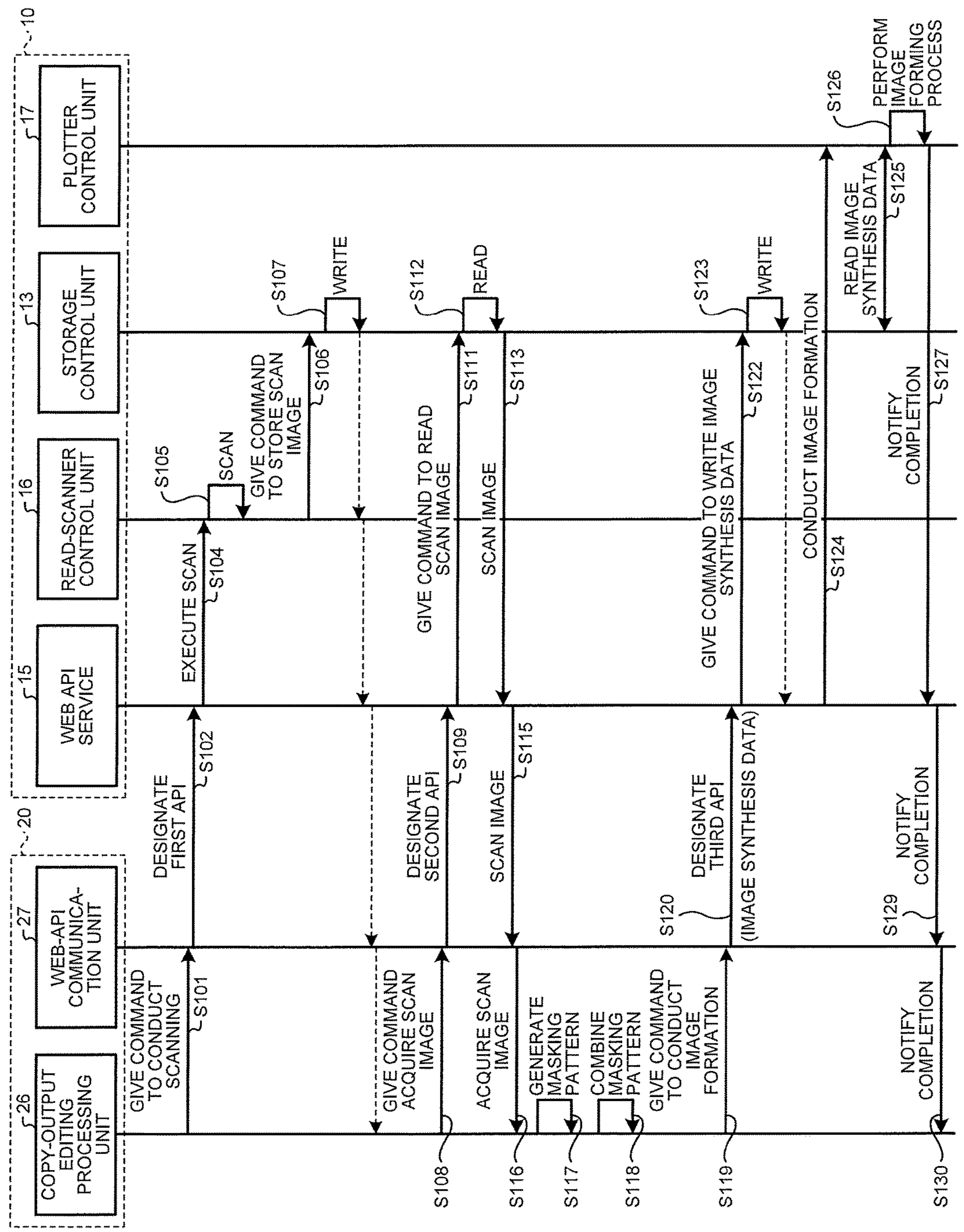
FIG. 14 is a diagram that illustrates an example of the sequence for communication processing between the operation panel and the main body.

FIG. 14 is a diagram that illustrates an example of the sequence for communication processing between the operation panel 20 and the main body 10. First, in the operation panel 20, when a touch operation is performed on the scanning execution button 1111 of the copy-editing operation screen 1100 (see FIG. 11B), the copy-output editing processing unit 26 gives a command to the Web-API communication unit 27 so as to conduct scanning (Step S101) and the Web-API communication unit 27 transmits request data (see FIG. 7A) for requesting execution of the first API 15-1 to the main body 10 (Step S102).

Thus, in the main body 10, the Web API service 15 receives designation of the first API 15-1 and gives a command to the read-scanner control unit 16 so as to execute scanning that is the operation request (Step S104). The read-scanner control unit 16 controls the read scanner of the engine 106, thereby executing scanning (Step S105). After scanning is conducted, the read-scanner control unit 16 gives a command to the storage control unit 13 so as to store the image (scanning image) read by the above-described read scanner (Step S106). The storage control unit 13 manages the scanning image read by the above-described read scanner by using a job ID and writes the scanning image in the first temporary memory area (Step S107). The Web API service 15 receives the job ID as a result of scanning executed from the read-scanner control unit 16 and transmits the job ID as response information to the Web-API communication unit 27.

Then, after the job ID is notified by the Web-API communication unit 27, the copy-output editing processing unit 26 gives a command to the Web-API communication unit 27 so as to acquire the above-described scanning image (Step S108), and the Web-API communication unit 27 transmits request data (see FIG. 7B) for requesting execution of the second API 15-2 to the main body 10 (Step S109). Furthermore, the notified job ID is set in {job ID} of the request data (see FIG. 7B).

Thus, in the main body 10, the Web API service 15 receives designation of the second API 15-2 and gives a command to the storage control unit 13 so as to acquire the scan image that is the operation request (Step S111). Due to this command, the storage control unit 13 reads the scanning image that corresponds to the job ID from the first temporary memory area (Step S112) and transfers the read scanning image to the Web API service 15 (Step S113). The Web API service 15 transmits the scanning image to the Web-API communication unit 27 (Step S115). The Web-API communication unit 27 notifies the copy-output editing processing unit 26 that the scanning image has been acquired (Step S116).

After the scanning image is acquired, the copy-output editing processing unit 26 receives a user's editing operation to conduct masking on the scanning image and, in accordance with the editing operation, generates a masking pattern (Step S117).

Then, after a touch operation is performed on the image-formation execution button 1131 of the copy-editing operation screen 1100 (see FIG. 11K), the copy-output editing processing unit 26 performs a process to combine the masking pattern (Step S118). Then, the copy-output editing processing unit 26 gives a command to the Web-API communication unit 27 so as to conduct image formation (Step S119), and the Web-API communication unit 27 transmits the request data (see FIG. 7C) for requesting execution of the third API 15-3 to the main body 10 (Step S120). During transmission of the request data, the Web-API communication unit 27 transmits synthesis data on the image (also referred to as image synthesis data or output image) to the main body 10.

Thus, in the main body 10, the Web API service 15 receives designation of the third API 15-3 and first gives a command to the storage control unit 13 so as to write the image synthesis data in the first temporary memory area (Step S122), and the storage control unit 13 writes the image synthesis data in the first temporary memory area (Step S123).

Then, the Web API service 15 gives a command to the plotter control unit 17 so as to conduct image formation that is an operation request of the third API 15-3 (Step S124). The plotter control unit 17 reads the image synthesis data from the first temporary memory area by using the storage control unit 13 (Step S125) and performs an image forming process based on the image synthesis data (Step S126). During the image forming process, the plotter control unit 17 converts the image synthesis data from RGB to CMYK data and forms images by transferring image dot patterns onto a recording medium.

After image formation is completed, the plotter control unit 17 notifies the Web API service 15 of completion (Step S127). Then, the Web API service 15 transmits response information that indicates notification of completion to the Web-API communication unit 27 (Step S129), and the Web-API communication unit 27 notifies the copy-output editing processing unit 26 of completion of the image forming process (Step S130).

According to the first embodiment, a scanning image with RGB values is acquired from the main body 10, and any position of the scanning image is designated to conduct masking in the operation panel 20. Thus, on scanning images, masking may be performed at the position intended by an operator. Furthermore, according to the first embodiment, the copy-output editing app of the operation panel 20 implements the functions such as "the generating unit" and "an image combining unit" in the operation panel 20; however, the function implemented in the operation panel 20 may be at least "the generating unit", and other functions may be implemented in the main body 10.

First Modification of the First Embodiment

Next, an example of modification is described where a masking pattern for conducting masking is usable for a subsequent copy output. According to a first modification of the first embodiment, a masking-pattern memory area (an example of "the storage unit") is set as a memory area for masking patterns in an HDD 103 of the main body 10, and the operation panel 20 is designed as described below.

Screen Configuration of the Operation Panel 20

Figure 15:
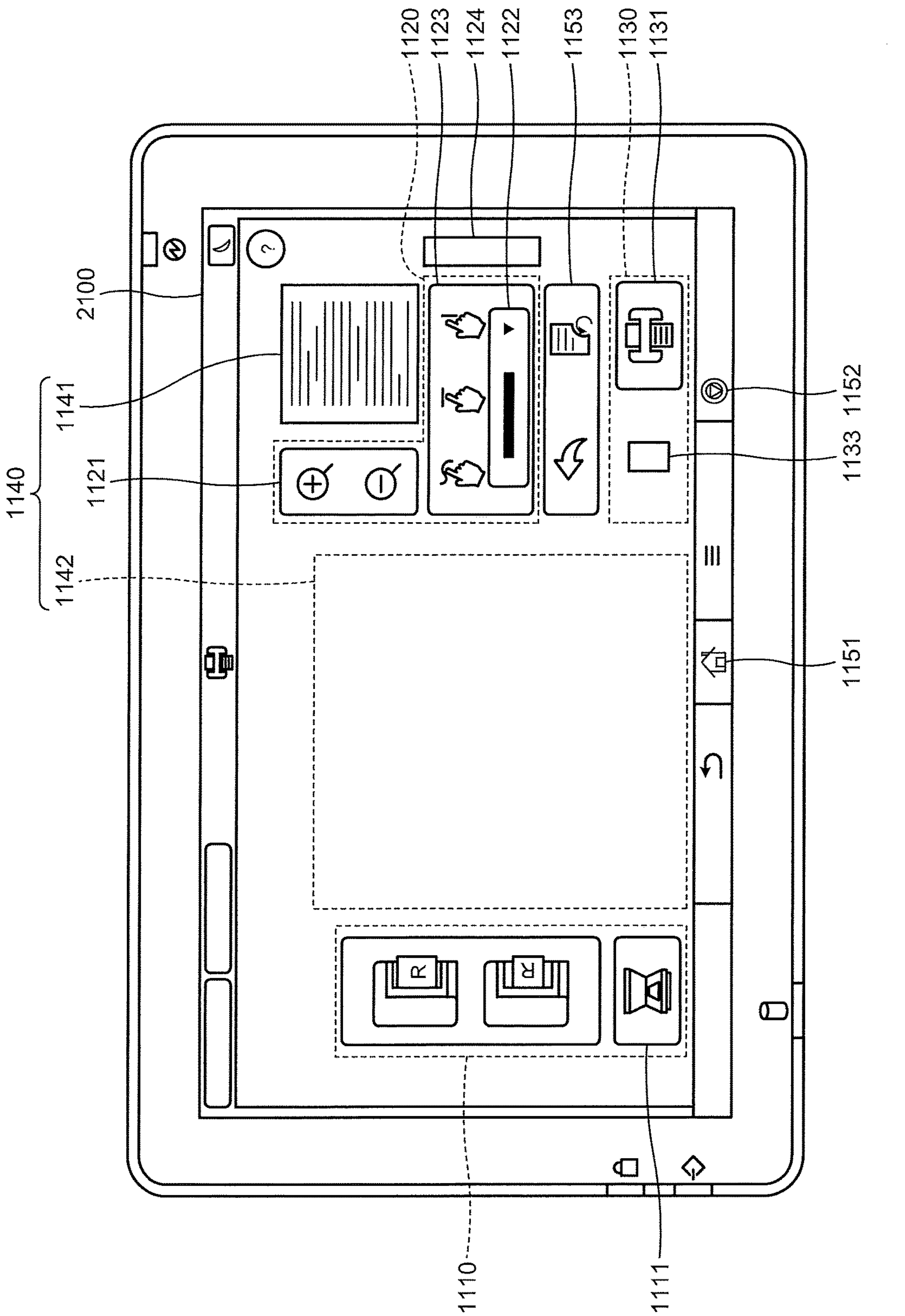
FIG. 15 is a diagram that illustrates an example of a copy-editing operation screen according to a first modification of the first embodiment.

First, an explanation is given of modification of the screen configuration of the operation panel 20. FIG. 15 is a diagram that illustrates an example of the copy-editing operation screen according to the first modification of the first embodiment. A copy-editing operation screen 2100 illustrated in FIG. 15 is provided by adding a template registration button 1133 and a template invoking button 1124 to the copy-editing operation screen 1100 (see FIG. 8).

The template registration button 1133 is a button for registering a masking pattern written in the third temporary memory area as a template in the main body 10. According to this example, a template registration screen (see FIG. 16) is invoked by the template registration button 1133, and a template registration operation is performed through the template registration screen.

The template invoking button 1124 is a button for acquiring a masking pattern, registered as a template, from the masking-pattern memory area in the main body 10. According to this example, a template invoking screen (see FIG. 17) is invoked by the template invoking button 1124, and a template acquisition operation is performed through the template invoking screen.

Figure 16:
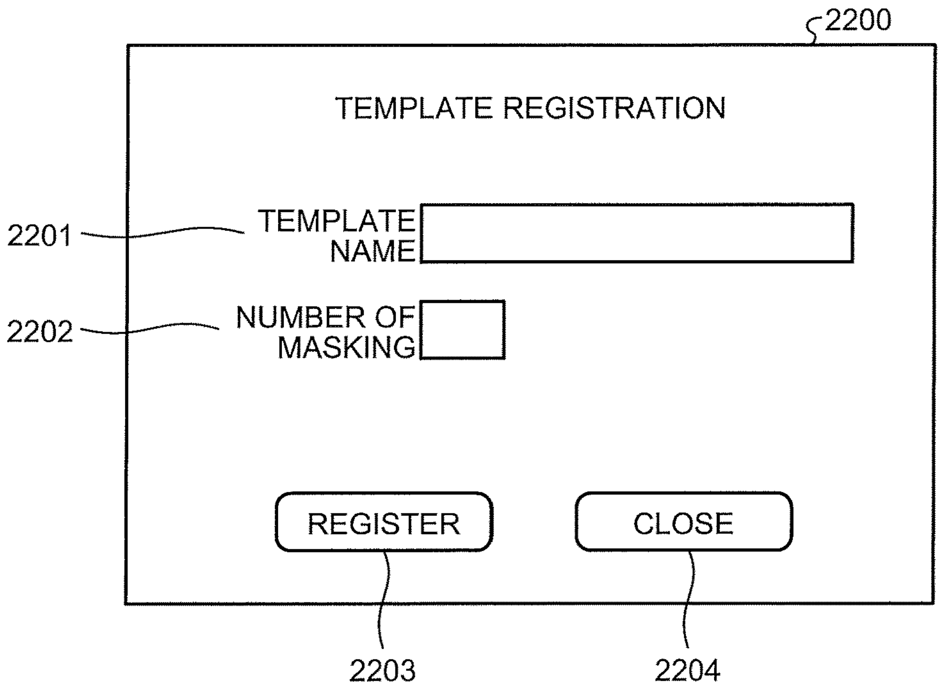
FIG. 16 is a diagram that illustrates an example of the template registration screen.

FIG. 16 is a diagram that illustrates an example of the template registration screen. A template registration screen 2200 illustrated in FIG. 16 includes a template-name entry field 2201, a masking-number entry field 2202, a registration button 2203, a close button 2204, and the like.

The template-name entry field 2201 receives input of the template name for the masking pattern that is in processing. The masking-number entry field 2202 receives input of the number of areas masked ("1 (area)", "2 (areas)", or the like). The registration button 2203 receives registration of the masking pattern that is in processing. The close button 2204 receives termination of the template registration screen 2200.

Figure 17:
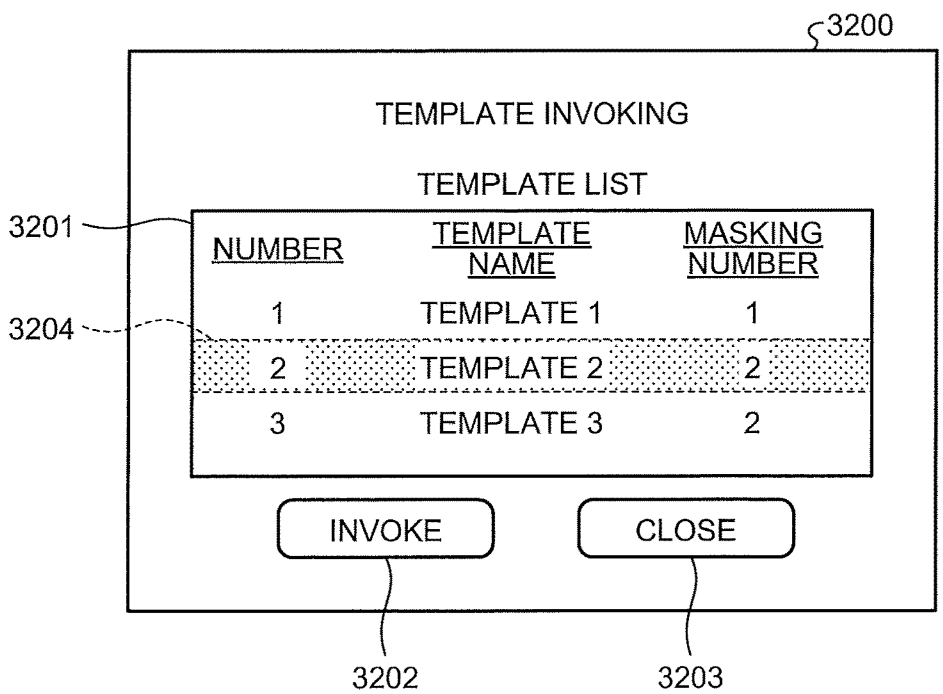
FIG. 17 is a diagram that illustrates an example of the template invoking screen.

FIG. 17 is a diagram that illustrates an example of the template invoking screen. A template invoking screen 3200 illustrated in FIG. 17 includes a template-list selection box 3201, an invoking button 3202, a close button 3203, and the like.

The template-list selection box 3201 indicates the list of templates that are specified in a correspondence table (see FIG. 18), here for example management information (serial number, template name, the number of masking, or the like). If it is difficult to display them in a list because of the number of them registered, a scroll bar, a display switch button, or the like, is used to display the whole by scrolling, switching, or the like. Furthermore, in the template-list selection box 3201, each template is selected from the list. For example, if a user touches one template in the list, the template is in a selected state. As an example of the selected state, FIG. 17 illustrates an inversed state by using a hatching section 3204.

The invoking button 3202 receives invoking of the masking pattern of the template that is in a selected state. The close button 3203 receives termination of the template invoking screen 3200.

Table of the Operation Panel 20

FIG. 18 is a diagram that illustrates an example of the correspondence table included in the flash memory 203 of the operation panel 20. FIG. 18 illustrates a template information table T1 as the correspondence table. The template information table T1 is an information table that relates a masking pattern in the main body 10 with template management information (an example of "the bibliographic information").

Here, for example, the template information table T1 relates the item of "masking-pattern file name" t1 with the item of "management information" t2 ("document ID" t2-1, "template name" t2-2, "masking number" t2-3, and the like). The file name of the masking pattern, which is designated to be registered as a template, is set in the item of the "masking-pattern file name" t1. The ID issued by the main body 10 for registration of a masking pattern is set in the item of the "document ID" t2-1. The template name of a masking pattern is set in the item of the "template name" t2-2. The number of masking areas of a masking pattern is set in the "masking number" t2-3.

Operation of the Operation Panel 20

Next, an explanation is given of operation of the operation panel 20 when a template is registered and invoked. Furthermore, during this operation, the copy-output editing processing unit 26 also serves as "a registering unit", "a selecting unit", "an acquiring unit", or the like. Furthermore, this operation is based on the process flow of FIG. 10, and modified part is explained here. Illustration and explanation for other duplicated parts are omitted as appropriate.

Figure 19:
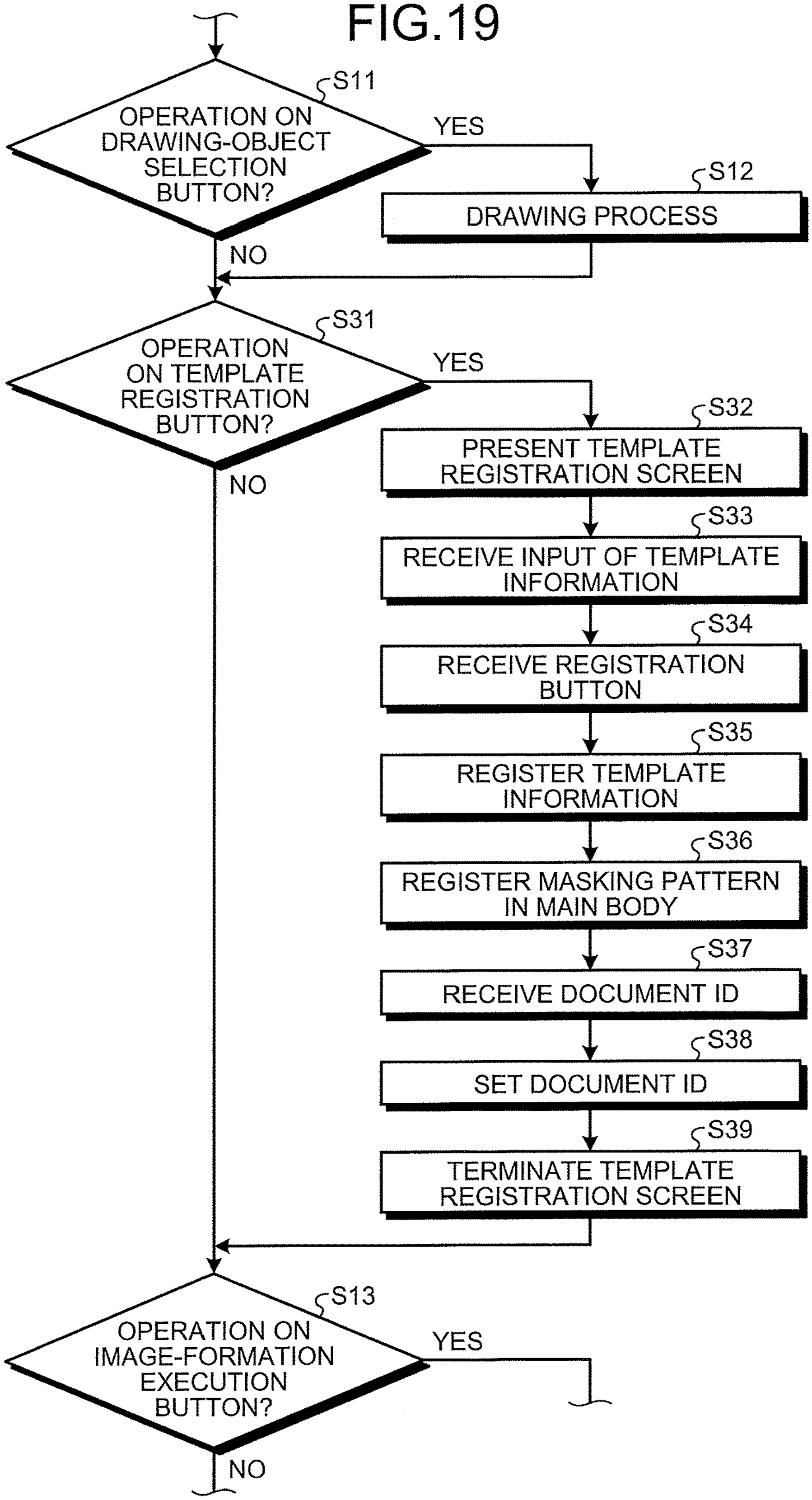
FIG. 19 is a diagram that illustrates an example of the process flow for template registration by the operation panel.

FIG. 19 is a diagram that illustrates an example of the process flow for template registration by the operation panel 20 according to the first modification of the first embodiment. After the drawing process at Step S12, when it is determined that a touch operation has been performed on the template registration button 1133 (Step S31: determined as Yes), the copy-output editing processing unit 26 gives a command to the display control unit 25 so as to present the template registration screen 2200 (see FIG. 16) and stands by while input from the input receiving unit 24 is receivable (Step S32).

Thus, the template registration screen 2200 is displayed in an active state on the copy-editing operation screen 1100 (see FIG. 11J) of the operation panel 20. On the template registration screen 2200, a user inputs template information (the template name, the number of masking, etc.) on the masking pattern that is in processing in each entry field and performs a touch operation on the registration button 2203. Furthermore, template information is input by using a software keyboard or a hardware keyboard provided therein.

After input of the template information is received (Step S33) and a touch operation on the registration button 2203 is received (Step S34), the copy-output editing processing unit 26 registers the template information, input to the template registration screen 2200, and the file name of the masking pattern that is in processing in relation to each other in the template information table T1 (see FIG. 18) through the storage control unit 23 (Step S35).

Then, the copy-output editing processing unit 26 gives a command to the main body 10 so as to register the masking pattern that is in processing (Step S36).

Then, when the main body 10 notifies the "document ID" attached to the masking pattern as a registration result, the copy-output editing processing unit 26 receives it (Step S37).

Then, through the storage control unit 23, the copy-output editing processing unit 26 sets the "document ID" in an area that is in the column of "the document ID" t2-1 of the template information table T1 (see FIG. 18) and that corresponds to the file name of the masking pattern (Step S38) and terminates the template registration screen 2200 (Step S39). Thus, the screen of the operation panel 20 returns to presentation of the copy-editing operation screen 1100 (see FIG. 11J) after the template registration screen 2200 is closed.

After Step S39, the copy-output editing processing unit 26 proceeds to determination at Step S13.

Figure 20:
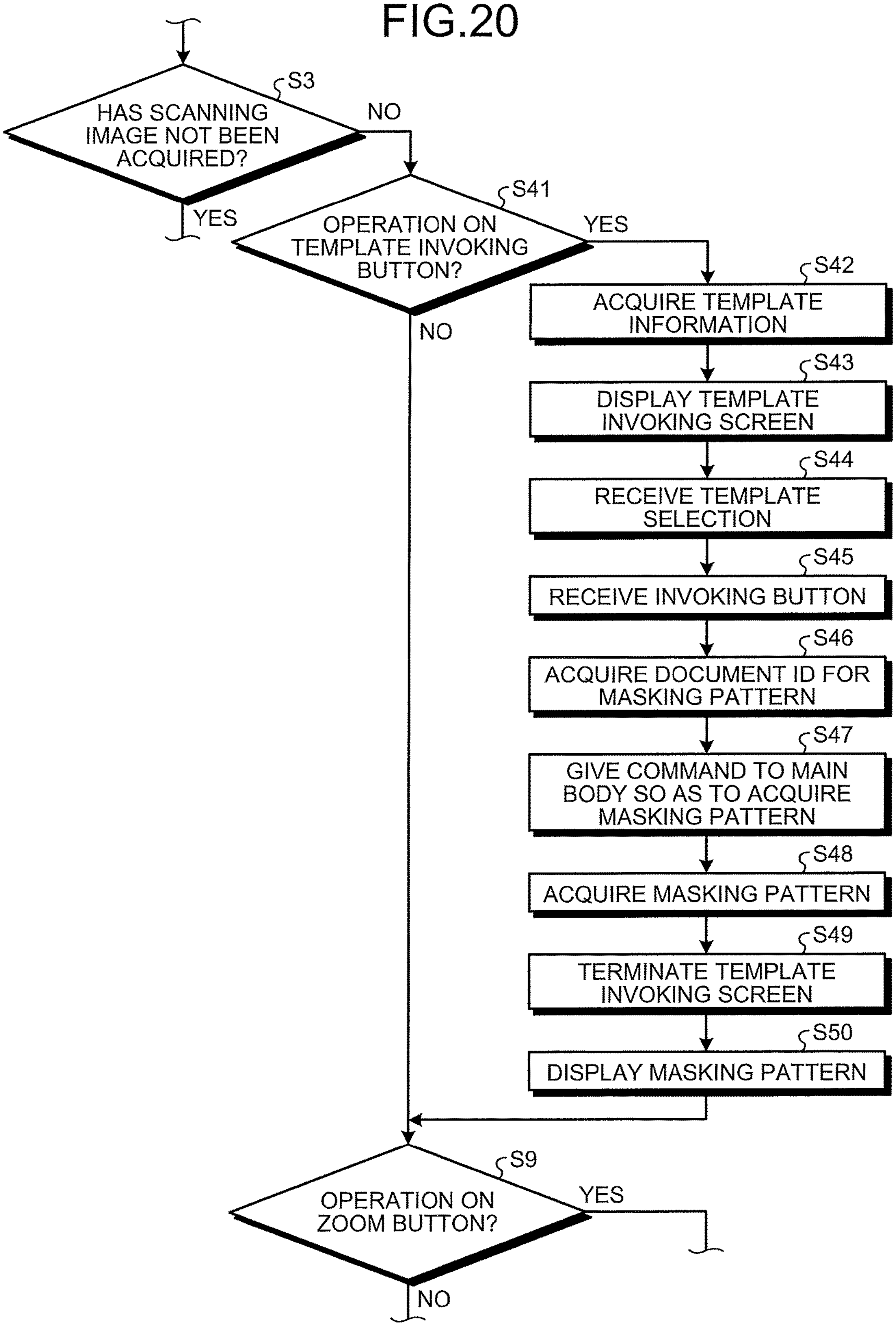
FIG. 20 is a diagram that illustrates an example of the process flow for template invoking by the operation panel.

FIG. 20 is a diagram that illustrates an example of the process flow for template invoking by the operation panel 20 according to the first modification.

After Step S3 (determined as No), when it is determined that a touch operation has been performed on the template invoking button 1124 (Step S41: determined as Yes), the copy-output editing processing unit 26 acquires template information from the template information table T1 (see FIG. 18) through the storage control unit 23 (Step S42). Then, the copy-output editing processing unit 26 gives a command to the display control unit 25 so as to present the template information on the template invoking screen 3200 (see FIG. 17) and stands by while input from the input receiving unit 24 is receivable (Step S43).

Thus, the template invoking screen 3200 is displayed in an active state on the copy-editing operation screen 1100 (see FIG. 11F) of the operation panel 20. On the template invoking screen 3200, a user performs a touch operation to select the template of masking, which is to be conducted on the scanning image that is in processing, from the template-list selection box 3201 and performs a touch operation on the invoking button 3202.

After selection of the template is received (Step S44) and a touch operation on the invoking button 3202 is received (Step S45), the copy-output editing processing unit 26 acquires the document ID that is related to the selected template from the template information table T1 through the storage control unit 23 (Step S46). Then, the copy-output editing processing unit 26 gives a command to the main body 10 so as to acquire the masking pattern with the document ID (Step S47). Specifically, the copy-output editing processing unit 26 designates the document ID to the API and acquires the masking pattern from the main body 10.

After the masking pattern is acquired from the main body 10 (Step S48), the copy-output editing processing unit 26 terminates the template invoking screen 3200 (Step S49). Thus, the screen of the operation panel 20 returns to presentation of the copy-editing operation screen 1100 (see FIG. 11F) after the template invoking screen 3200 is closed. Furthermore, a command may be given to the display control unit 25 so as to display a stand-by screen while a masking pattern is being acquired from the main body 10. In this case, the stand-by screen is displayed as the screen of the operation panel 20 while a masking pattern is being acquired from the main body 10, and display of the copy-editing operation screen 1100 (see FIG. 11F) is reset after the masking pattern is received.

After a masking pattern is acquired from the main body 10, the copy-output editing processing unit 26 gives a command to the display control unit 25 so as to display the scanning image presented on the enlargement/reduction display area 1142 (see FIG. 11F) by replacing an RGB value of each pixel designated by the masking pattern with black (0,0,0) (Step S50). Specifically, on the enlargement/reduction display area 1142 (see FIG. 11F), masking with the arrangement pattern designated by the masking pattern is applied to the scanning image.

After Step S50, the copy-output editing processing unit 26 transitions to determination at Step S9. If the masking area of the selected template matches the scanning image, a user performs a touch operation on the image-formation execution button 1131. A process after a touch operation on the image-formation execution button 1131 is as described in the embodiment. According to the first modification, a masking pattern of a template is used as the masking pattern and is combined with a scanning image, and a composite image is transmitted to the main body 10 for image formation. The main body 10, which is a transmission destination, conducts image formation based on the composite image.

Furthermore, if a user is to change a template to a different one due to a mismatch between a masking area of a selected template and a scanning image, or the like, a deletion button may be provided on the copy-editing operation screen 1100 (see FIG. 11F) to give a command so as to delete an acquired masking pattern and delete a masking drawing on the display. In this case, the process from Step S41 is repeated, and a user selects a different template at Step S44.

Communication Sequence

Next, an explanation is given of a communication process between the operation panel 20 and the main body 10. Furthermore, this communication process is based on the sequence of the communication process in FIG. 14, and modified part is explained here. Illustration and explanation for other duplicated parts are omitted as appropriate.

Figure 21:
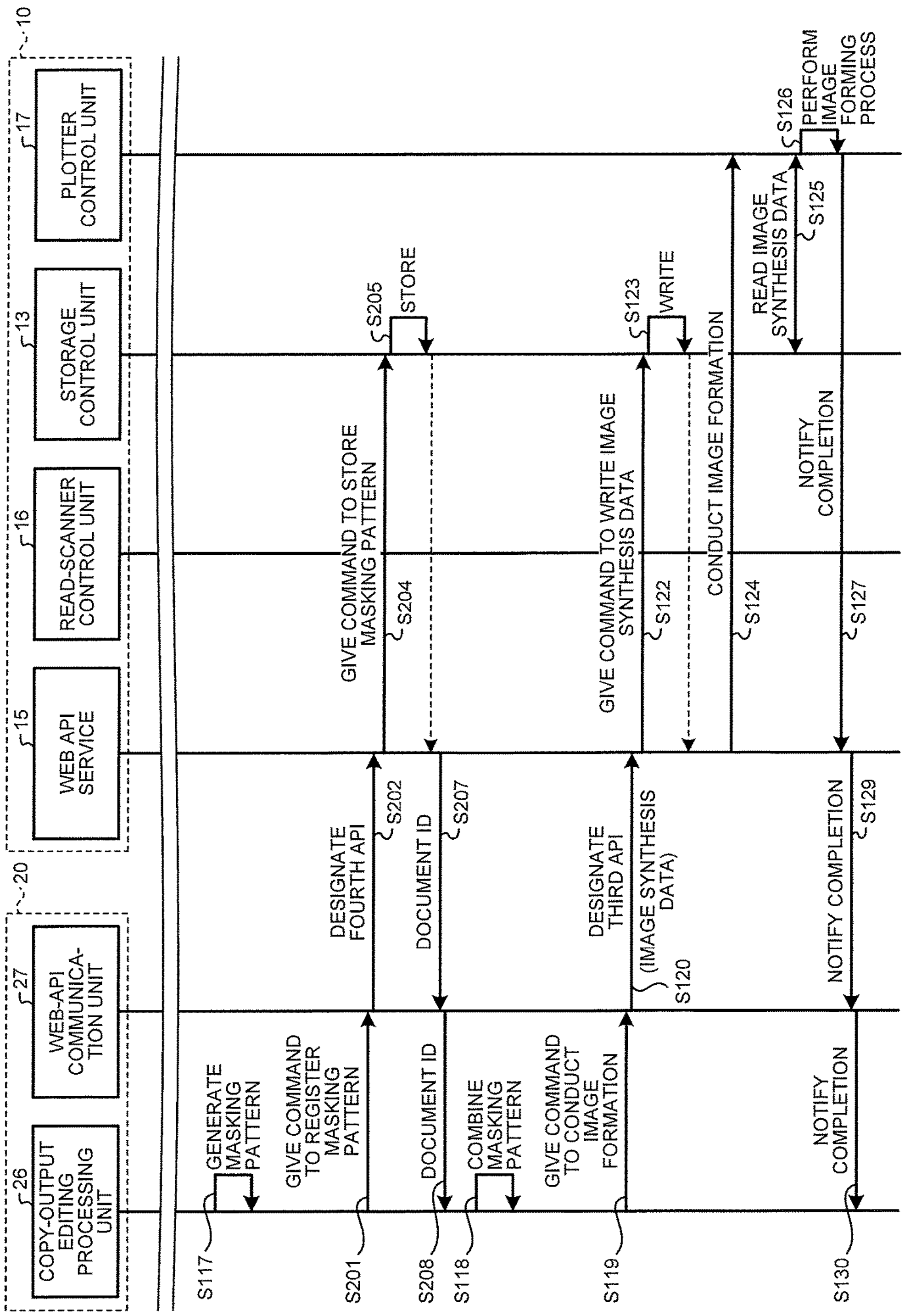
FIG. 21 is a diagram that illustrates an example of the sequence for communication processing between the operation panel and the main body during template registration.

FIG. 21 is a diagram that illustrates an example of the sequence for communication processing between the operation panel 20 and the main body 10 during template registration. After a masking pattern is generated at Step S117, if a command for template registration is given, the copy-output editing processing unit 26 gives a command to the Web-API communication unit 27 so as to register the masking pattern that is in processing (Step S201), and the Web-API communication unit 27 transmits the request data (see FIG. 7D) for requesting execution of the fourth API 15-4 to the main body 10 (Step S202). The Web-API communication unit 27 transmits a masking pattern to the main body 10 during transmission of the request data.

Thus, in the main body 10, the Web API service 15 receives designation of the fourth API 15-4 and gives a command to the storage control unit 13 so as to conduct file registration that is the operation request (Step S204).

The storage control unit 13 manages the masking pattern by using the document ID and stores the masking pattern in the masking-pattern memory area (Step S205). The Web API service 15 transmits a file registration result (document ID) as response information to the Web-API communication unit 27 (Step S207). The transmitted document ID is notified to the copy-output editing processing unit 26 (Step S208) and is registered in the template information table T1 (see FIG. 18).

Then, when a user performs a touch operation on the image-formation execution button 1131, the masking pattern is combined with the scanning image that is in processing at Step S118. As the flow after Step S118 is the same as that illustrated in the embodiment, explanation is omitted.

Figure 22:
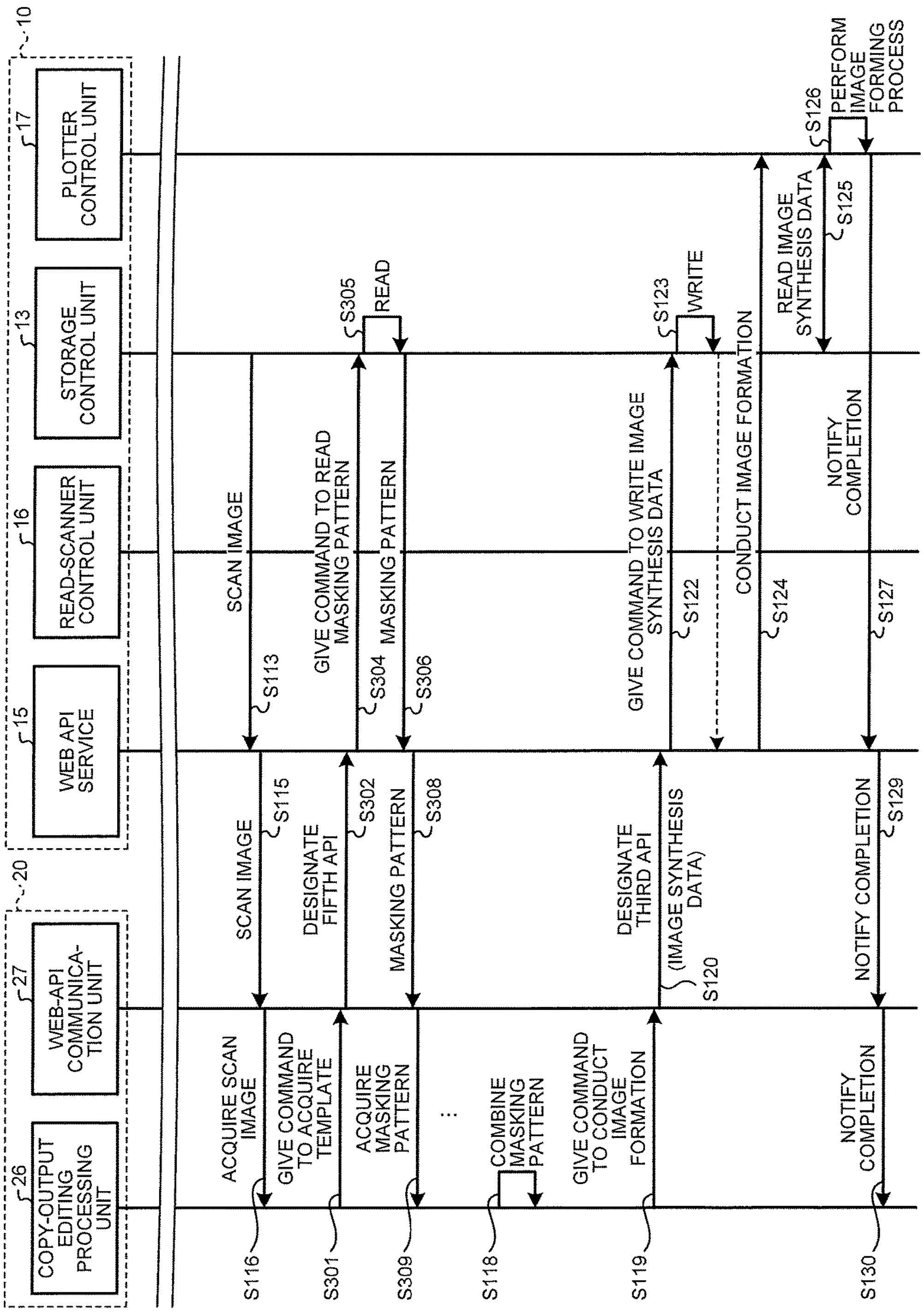
FIG. 22 is a diagram that illustrates an example of the sequence for communication processing between the operation panel and the main body during template acquisition.

FIG. 22 is a diagram that illustrates an example of the sequence for communication processing between the operation panel 20 and the main body 10 during template acquisition. After a scanning image is acquired at Step S116, the copy-output editing processing unit 26 gives a command to the Web-API communication unit 27 so as to acquire the template designated by a user (Step S301), and the Web-API communication unit 27 transmits the request data (see FIG. 7E) for requesting execution of the fifth API 15-5 to the main body 10 (Step S302). Furthermore, the document ID notified during template registration is set in {document ID} (see FIG. 7E) in the request data.

Thus, in the main body 10, the Web API service 15 receives designation of the fifth API 15-5 and gives a command to the storage control unit 13 so as to conduct file invoking that is an operation request (Step S304). Due to this command, the storage control unit 13 reads the masking pattern that is related to the document ID from the masking-pattern memory area (Step S305) and transmits the read masking pattern to the Web API service 15 (Step S306). The Web API service 15 transmits the masking pattern to the Web-API communication unit 27 (Step S308). The Web-API communication unit 27 notifies the copy-output editing processing unit 26 that the masking pattern has been acquired (Step S309).

After the masking pattern is acquired, the copy-output editing processing unit 26 presents the masking pattern on the scanning image and, if a user then changes the template, the process from Step S301 to Step S309 is repeated.

After the template is confirmed and the user performs a touch operation on the image-formation execution button 1131, the masking pattern of the confirmed template is combined with the scanning image that is in processing at Step S118. As the flow after Step S118 is the same as that described in the embodiment, explanation is omitted.

As described above, according to the first modification of the first embodiment, as masking patterns for masking conducted are registered, the registered masking patterns are invoked for a subsequent copy output, and a masking pattern is selected from them and is combined with a scanning image. Therefore, a user selects a corresponding masking pattern from the registered masking patterns in accordance with the type of document on which scanning has been conducted, whereby a masking pattern may be combined with a scanning image. It is possible to omit user's masking operation on scanning images, whereby user's operability is improved.

A Second Modification of the First Embodiment

A modification is described in which when masking is conducted on a scanning image, a masking pattern (preferred pattern) preferred by an operator is preset. In the example of the case described here, an operator holds an IC card over the operation panel 20 to log in the operation panel 20, and a preferred pattern is preset on the basis of authentication information on the operator during login. Here, the operation panel 20 includes an IC card reader. The IC card reader is connected to the system bus 208 and, in accordance with a command from the CPU 200, reads authentication information from the IC card that is being held. Furthermore, the CPU 200 implements an authentication functional unit due to execution of an authentication program. The authentication functional unit compares the authentication information in the IC card read by the IC card reader with an authentication table in the main body 10 and, if it is authenticated, allows the operator to log in the system of the operation panel 20.

Table of the Operation Panel 20

FIG. 23 is a diagram that illustrates an example of a correspondence table included in the flash memory 203 of the operation panel 20. A template information table T2 (an example of the correspondence table) illustrated in FIG. 23 is provided by adding the item of "user ID" t2-4 to the template information table T1 (see FIG. 18). User ID information (an example of "personal ID information") is set in the item of the "user ID" t2-4. The user ID information is the information that is obtained when an operator logs in with an IC card. Here, for ease of explanation, user names are illustrated.

Furthermore, preferred-pattern identification information is set for individual user in the "template name" t2-2. Here, for ease of explanation, the name of a masking pattern is illustrated as the preferred-pattern identification information. As examples, "license blacked-out pattern" and "passport blacked-out pattern" are illustrated; however, these are not limitations, and optional settings may be provided. For example, "insurance-card blacked-out pattern" or "residence-certificate blacked-out pattern" may be set. The preferred pattern mentioned in this example has a predetermined format that is frequently used for copy output.

Operation of the Operation Panel 20

Operation of the operation panel 20 according to the second modification of the first embodiment is different from operation according to the first modification of the first embodiment in that it uses authentication information. According to the second modification of the first embodiment, the copy-output editing processing unit 26 also operates as an "authentication selecting unit". Here, the different point from the first embodiment and the first modification is principally explained, and explanation for other operations that are common are omitted as appropriate with the same reference numerals attached.

First, at Step S35 of the registration process illustrated in FIG. 19, in the template information table T2 (see FIG. 23), the copy-output editing processing unit 26 according to the second modification registers the user ID information used by an operator for login authentication in addition to the template information input to the template registration screen 2200 and the file name of the masking pattern that is in processing in relation to one another.

Figure 24:
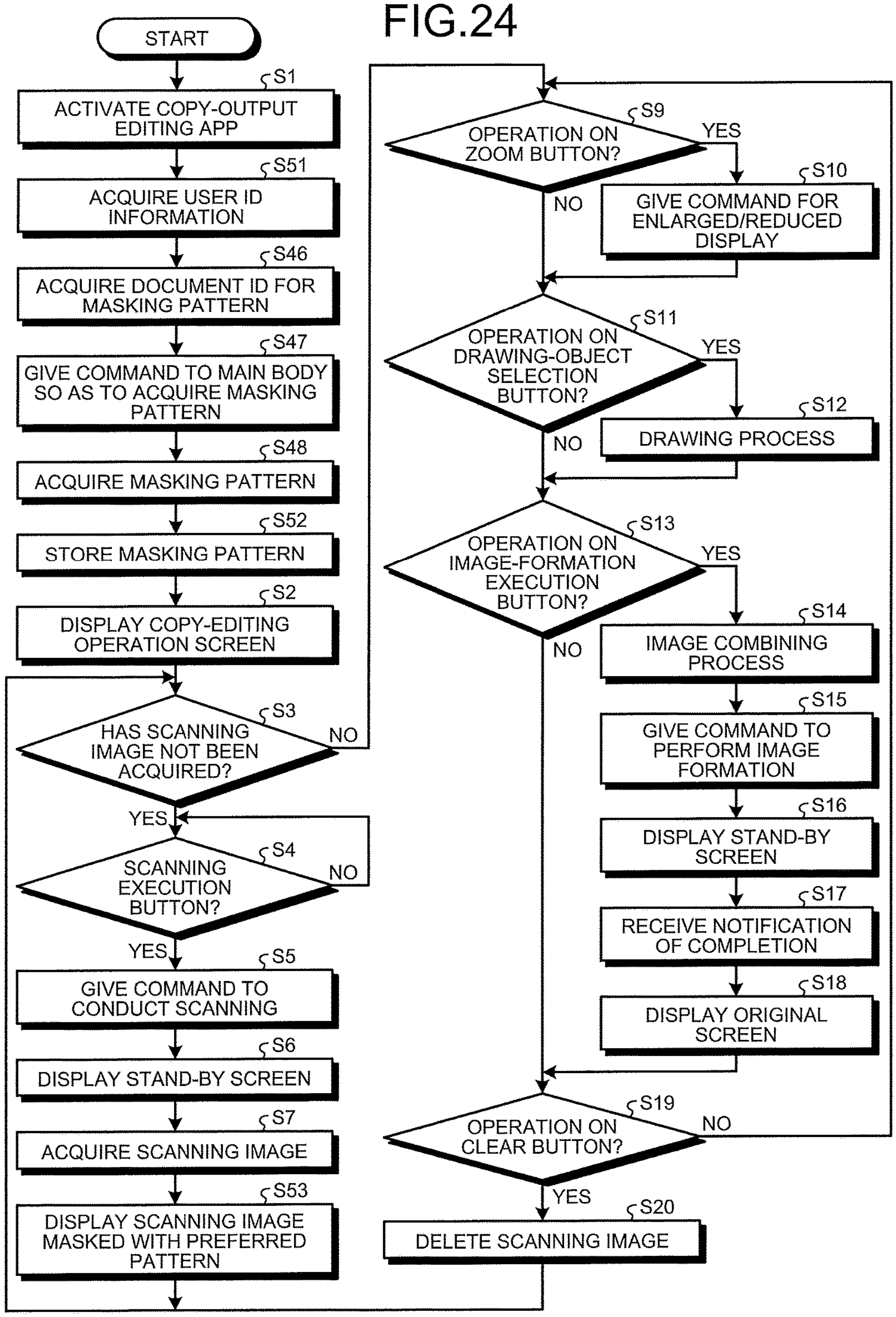
FIG. 24 is a diagram that illustrates an example of the process flow for template invoking in the operation panel.

FIG. 24 is a diagram that illustrates an example of the process flow for template invoking in the operation panel 20 according to the second modification of the first embodiment. After the copy-output editing app is activated at Step S1, the copy-output editing processing unit 26 acquires the user ID information on an operator who has logged in from an authentication functional unit (not illustrated) (Step S51) and acquires the document ID that is related to the user ID information from the template information table T2 through the storage control unit 23 (Step S46). Then, the copy-output editing processing unit 26 gives a command to the main body 10 so as to acquire the masking pattern with the document ID (Step S47).

After the masking pattern is acquired from the main body 10 (Step S48), the copy-output editing processing unit 26 stores the masking pattern in the third temporary memory area (Step S52).

Then, the copy-output editing processing unit 26 performs Steps S2 to S7 (see FIG. 10) of the embodiment in the same manner.

After a scanning image is acquired at Step S7, the copy-output editing processing unit 26 gives a command to the display control unit 25 so as to display the copy-editing operation screen 1100 (see FIG. 8) and stands by while input from the input receiving unit 24 is receivable (Step S53). During the display, the copy-output editing processing unit 26 makes a setting such that display of the scanning image is on and presents the acquired scanning image (preview image) and the masking pattern in the third temporary memory area on the enlargement/reduction display area 1142 (see FIG. 8). Thus, when a scanning image is acquired, the screen of the operation panel 20 displays the scanning image that is masked with the preferred pattern that is preset.

After the operation at Step S53, the operation at Step S3 is returned and after No is determined, a transition is made to the operation at Step S9.

If image formation needs to be conducted with the preferred pattern that is displayed on the copy-editing operation screen 1100, a user performs a touch operation on the image-formation execution button 1131. Then, it is determined that a touch operation has been performed on the image-formation execution button 1131 (Step S13: determined as Yes), the copy-output editing processing unit 26 performs a process to combine the masking pattern with the scanning image (Step S14). Then, the copy-output editing processing unit 26 performs the process from Steps S15 to S18 (see FIG. 10) of the embodiment in the same manner. As the other operations have been explained in the embodiment, explanation is omitted here.

Communication Sequence

Figure 25:
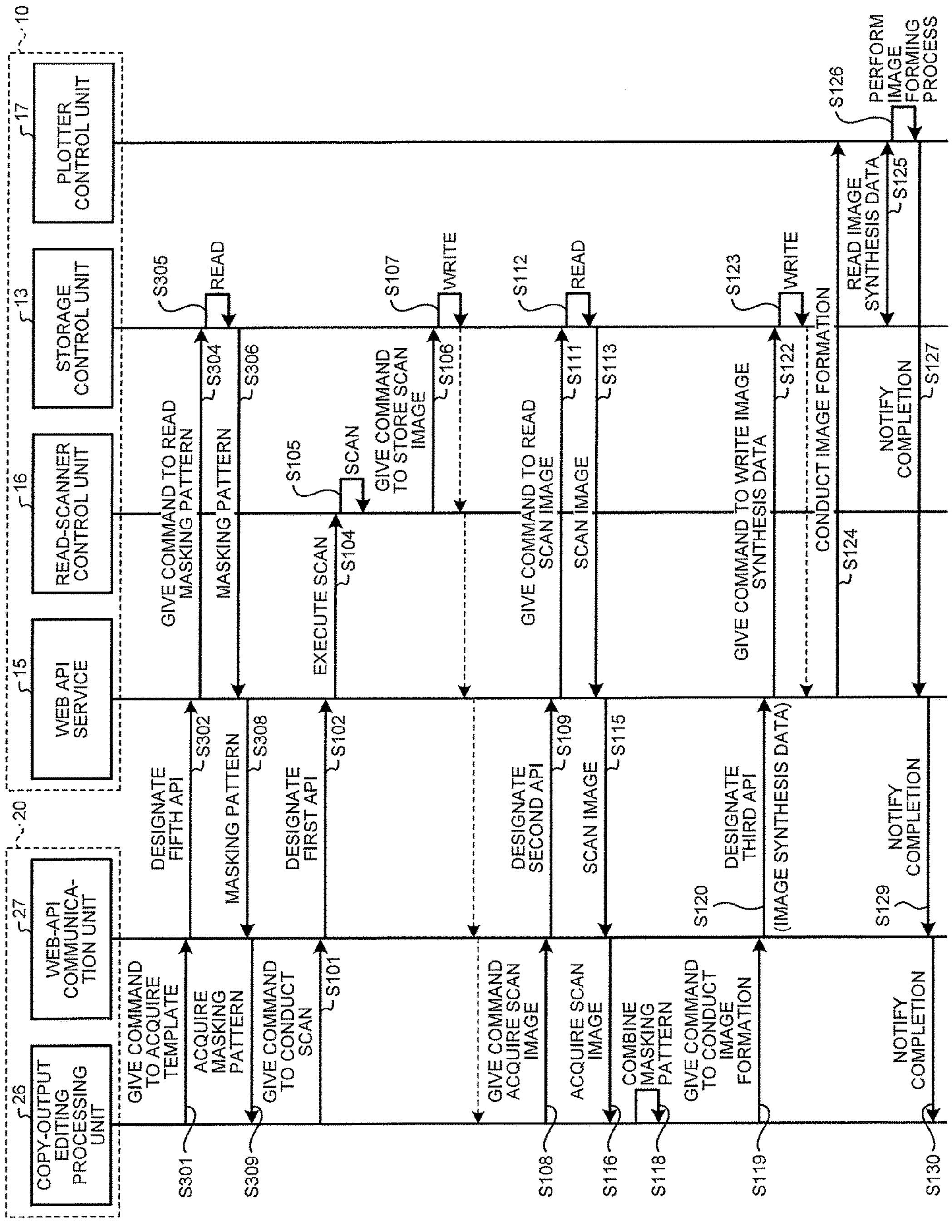
FIG. 25 is a diagram that illustrates an example of the sequence for communication processing between the operation panel and the main body for template invoking.

FIG. 25 is a diagram that illustrates an example of the sequence for communication processing between the operation panel 20 and the main body 10 for template invoking. Furthermore, the sequence that is common to the first embodiment and the first modification is attached with the same reference numeral.

After the copy-output editing app is activated, the copy-output editing processing unit 26 acquires the document ID (the information for specifying the template preferred by the operator) that is related to the user ID information on the operator from the template information table T2 and gives a command to the Web-API communication unit 27 so as to acquire the template (Step S301). The Web-API communication unit 27 transmits the request data (see FIG. 7E) for requesting execution of the fifth API 15-5 to the main body 10 (Step S302). Furthermore, the above-described document ID is set in {document ID} (see FIG. 7E) of the request data.

Thus, in the main body 10, the Web API service 15 receives designation of the fifth API 15-5 and gives a command to the storage control unit 13 so as to conduct file invoking that is an operation request (Step S304). Due to this command, the storage control unit 13 reads the masking pattern related to the document ID from the masking-pattern memory area (Step S305) and transmits the read masking pattern to the Web API service 15 (Step S306). The Web API service 15 transmits the masking pattern to the Web-API communication unit 27 (Step S308). The Web-API communication unit 27 notifies the copy-output editing processing unit 26 that the masking pattern has been acquired (Step S309).

After the masking pattern is acquired, the copy-output editing processing unit 26 stores it in the third temporary memory area.

After the operator performs a touch operation on the scanning execution button 1111, the copy-output editing processing unit 26 gives a command to the main body 10 so as to conduct scanning and acquires a scanning image (Steps S101 to S116). Furthermore, as this process has been explained in the embodiment, explanation is omitted here.

After the scanning image is acquired at Step S116, the copy-output editing processing unit 26 uses the masking pattern in the third temporary memory area and displays the scanning image that is masked with the preferred pattern that is preset.

Then, after an operator performs a touch operation on the image-formation execution button 1131, the copy-output editing processing unit 26 combines the masking pattern with the scanning image that is in processing (Step S118). As the flow after Step S118 is the same as that illustrated in the embodiment, explanation is omitted.

In the example illustrated here, template information and user ID information are managed by using the same table (the template information table T2); however, template information and user ID information may be managed by using different tables and be related to each other.

Furthermore, in the example illustrated here, a process is performed to acquire a preferred pattern from the main body before Step S101; however, the timing for the process is not limited to this example, and it may be any timing. Furthermore, the process may be performed in the background in parallel to the operation at Step S101 or the like.

According to the second modification of the first embodiment, it is possible to previously set and register preferred masking patterns for individual users. As frequently used masking patterns are automatically preset for each user, the number of steps for operation such as masking may be reduced, and user's operability may be further improved.

Third Modification of the First Embodiment

Modification may be made such that the set color of masking (masking color) is changeable in accordance with the remaining amount of toner. Here, an explanation is given of an additional configuration for changing the set color of masking.

Figure 26:
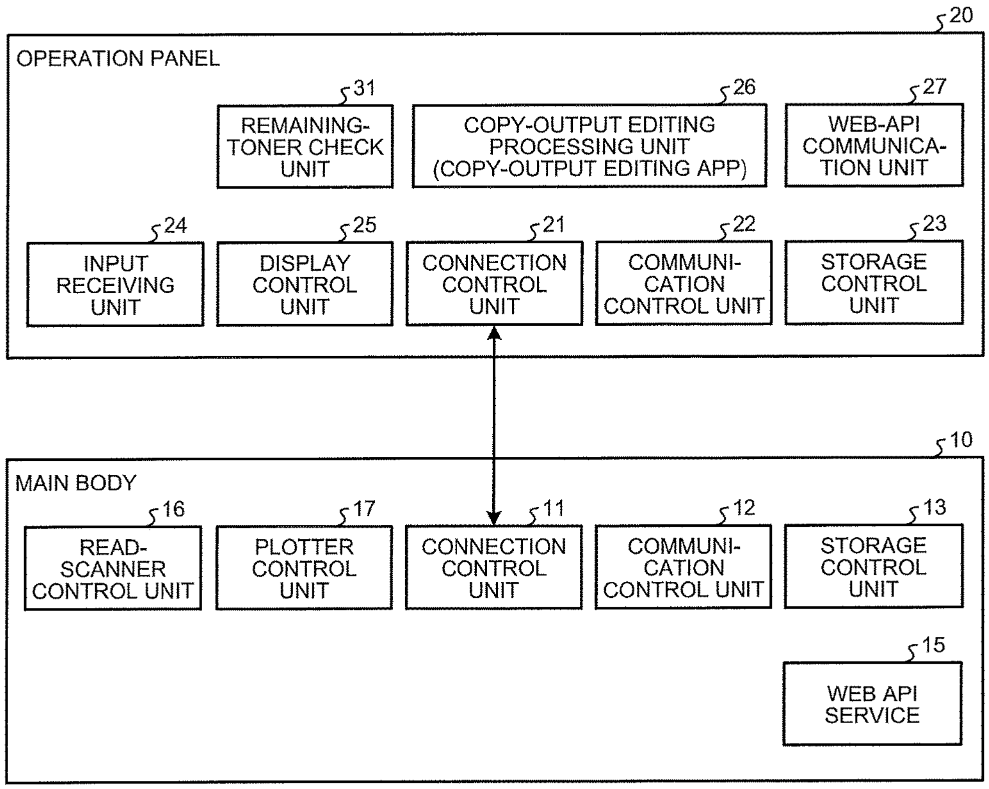
FIG. 26 is a diagram that illustrates an example of the functional configuration of the operation panel according to a third modification of the first embodiment.

FIG. 26 is a diagram that illustrates an example of the functional configuration of the operation panel 20 according to the third modification of the first embodiment. FIG. 26 illustrates that a remaining-toner check unit 31 is further provided in functional configuration (see FIG. 3) of the operation panel 20 according to the first embodiment.

The remaining-toner check unit 31 requests the main body 10 to transmit remaining-toner information and acquires the remaining-toner information from the plotter control unit 17.

Figure 27:
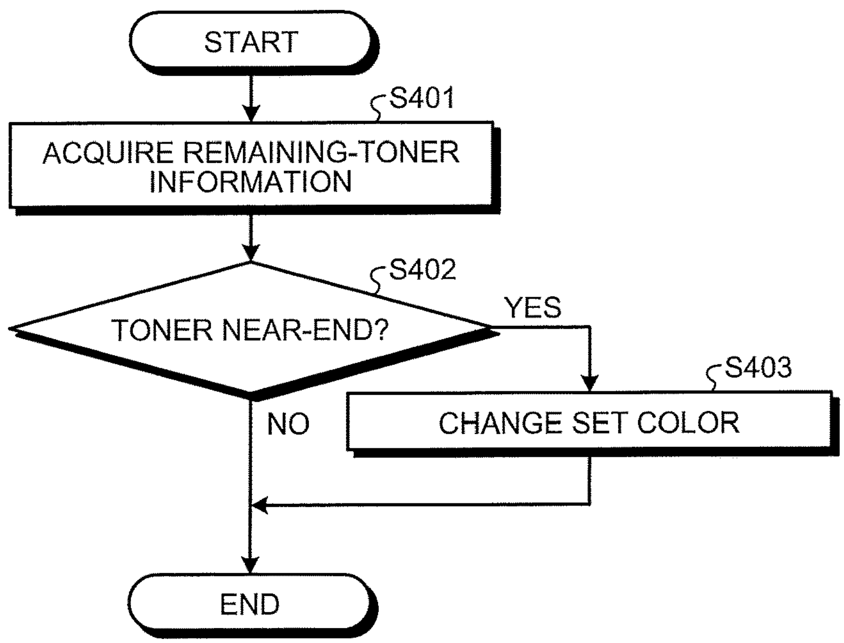
FIG. 27 is a flowchart of an example of the process to change the color of masking, conducted by a copy-output editing processing unit.

FIG. 27 is a flowchart of an example of the process to change the color of masking, conducted by the copy-output editing processing unit 26. First, the copy-output editing processing unit 26 acquires remaining-toner information from the remaining-toner check unit 31 (Step S401). For example, the remaining-toner check unit 31 may request the main body 10 to transmit remaining-toner information on a regular basis so as to always acquire the latest remaining-toner information or may acquire remaining-toner information from the plotter control unit 17 only when a command is received from the copy-output editing processing unit 26.

Then, the copy-output editing processing unit 26 determines whether it is toner near-end for the set color of masking on the basis of the acquired remaining-toner information (Step S402). Although the set color of masking is typically black, it may be red, blue, or the like, instead of black.

If it is not toner near-end (Step S402: determined as No), the copy-output editing processing unit 26 keeps the setting for the color of masking.

If it is toner near-end (Step S402: determined as Yes), the copy-output editing processing unit 26 changes the set color of masking to a different color (Step S403). Here, although it is preferable that the different color is white (RGB value: 255,255,255), it is not limited to white as long as the color is not for toner near-end.

Figure 28:
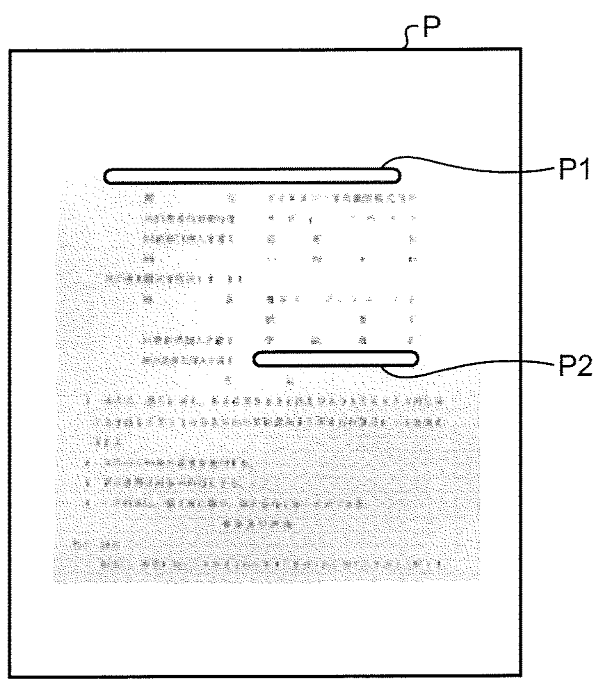
FIG. 28 is a diagram that illustrates an example of the output material if the set color is changed to white.

FIG. 28 is a diagram that illustrates an example of the output material if the set color is changed to white. As illustrated in FIG. 28, the masking P1 and the masking P2 of the output material P are made of a white background of a sheet.

For example, the above-described process to change the color of masking may be performed on a regular basis, or it may be performed only when a command is given to perform image formation.

Furthermore, assume that the set color is temporarily changed into a different color (e.g., white) due to toner near-end and then the remaining amount of toner is restored for the originally set color after toner replacement. For such a case, the flow of the process to change the color may be modified such that the copy-output editing processing unit 26 determines whether the remaining amount of toner for the originally set color has been restored and, if it has been restored, the originally set color is reset.

For masking with the set color (e.g., black), if masking is performed many times while there is a small amount of black toner, a large amount of black toner is consumed, and the toner runs out. If toner runs out, a task is interrupted, which results in downtime. According to the third modification of the first embodiment, the operation panel 20 checks the remaining amount of toner in the main body 10 and automatically changes black-out into for example white-out due to toner near-end and, if toner remains, changes to black-out in the originally set color. For this reason, according to the third modification of the first embodiment, there is an advantage such that the number of times toner runs out for a specific color may be decreased, and downtime may be reduced. Furthermore, if changed into white-out, the amount of toner used is decreased so that downtime may be further reduced.

Second Embodiment

As a second embodiment, another embodiment is described for the process to perform masking on the scanning image that is being displayed on the operation panel. According to an example of another embodiment for the masking process described here, on the operation panel, a pixel that has a pixel value equal to a pixel value of the pixel (referred to as "reference pixel") at the position touched with a finger on the scanning image being displayed or a pixel value within an approximation range is retrieved from the scanning image and the pixel detected during retrieval is replaced with the pixel value of a masking color.

Here, the "approximation range" means for example pixel values that are included within ranges of an upper limit range and a lower limit range with reference to the pixel value at the position touched by a finger. Hereafter, the pixel that has the pixel value (color) at the position touched by a finger and the pixel that has a pixel value within the approximation range are described as "a pixel that belongs to the same color".

One pixel has luminance information separately for each of three primary colors (red, green, and blue) as color information. Furthermore, if one primary color has 8-bit (256 tones) information, 16,777,216 colors (the cube of 256) may be represented with the three primary colors. A pixel value is given to each pixel. With RGB values, 0 to 255 are represented for each primary color, that is, (R,G,B)=(0,0,0) to (255,255,255). Each range, an upper limit range and a lower limit range, may be optionally set in accordance with a color, a density, or the like, of the target to be masked (e.g., handwritten notes described later). For example, for range specification of RGB values that belong to the same color, pixel values that are black or similar to black may be set in a range (R,G,B)=(0,0,0) to (50,50,50) from equal to or more than 0 to a predetermined number, e.g., equal to or less than 50 for all the RGB values. Alternatively, pixel values are similar in a predetermined range from a pixel value (each RGB value) at a designated position, e.g., within 25 tones on the top and bottom, and if (R,G,B)=(0,100,100) is designated, a similar color may be in the range of (R,G,B)=(0,75,75) to (25,125,125).

An explanation is given below of function and operation of the operation panel (principally, the copy-output editing processing unit), which is different from the first embodiment. Furthermore, in the following explanation, illustration and description are appropriately omitted for the part that is common to that in the first embodiment, such as the hardware configuration of the operation panel or the communication sequence of the main body 10.

Furthermore, in the case described below, a piece of test paper that has two values in black and white (printed areas, such as questions or ruled lines, in black and the base in white) is an example of the document and handwritten notes (texts, lines, graphics, and the like) included in the document are deleted by masking. Furthermore, notes are handwritten by using a color pencil in red, a color ballpoint pen, or the like, so as to be discriminated from colors of printed areas. Furthermore, the combination of colors of printed areas, base, and handwritten notes is not limited to it. The example described below is optionally applicable to any combination of colors. Furthermore, the document is not limited to test paper, and it may be appropriately replaced with memorandums, questionnaires, or paper in other formats, which have printed areas and which are writable.

Figure 29:
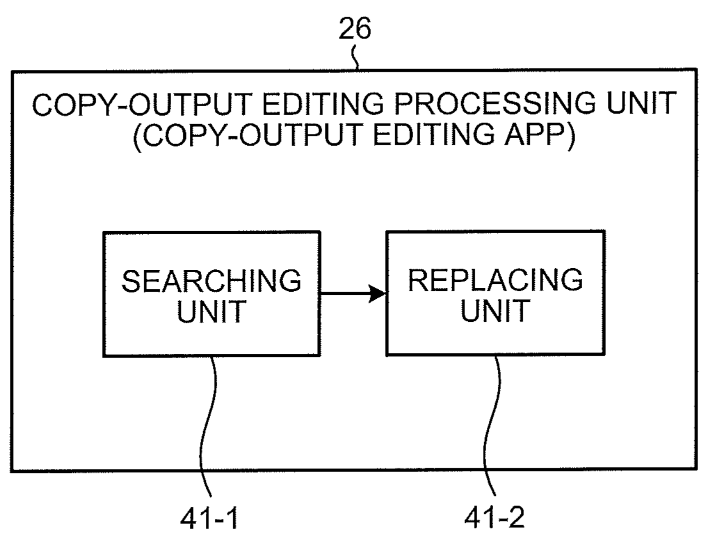
FIG. 29 is a diagram that illustrates an example of the configuration of the copy-output editing processing unit of the operation panel according to a second embodiment.

FIG. 29 is a diagram that illustrates an example of the configuration of the copy-output editing processing unit of the operation panel according to the second embodiment. The copy-output editing processing unit 26 illustrated in FIG. 29 includes a searching unit 41-1 and a replacing unit 41-2 as functions that perform masking.

The searching unit 41-1 conducts searching to detect, from the scanning image that is being displayed, a pixel that belongs to the same color as that of a pixel (i.e., reference pixel) that is within the scanning image and that corresponds to the positional information received by the input receiving unit 24.

Here, a condition for pixels that belong to the same color is set as, for example, an allowable range (an upper-limit range and a lower-limit range) based on the density, the color system, or the like, of the color of a reference pixel (referred to as "reference color"). If the density has an allowable range, for example, the range is set by several percent in a direction in which the density of each of the R value, the G value, and the B value in the pixel value of the reference pixel is increased and in a direction in which it is decreased. Furthermore, the allowable range is set to "0" so that the searching unit 41-1 searches for the one that has the same pixel value as that of the reference pixel.

The replacing unit 41-2 replaces the pixel value of the pixel that belongs to the same color, detected during searching by the searching unit 41-1, with a masking color. A predetermined color is set for the masking color. Here, white is set as an example of the masking color as it is typically used for output paper.

In the functional configuration according to the second embodiment, the read-scanner control unit 16 is equivalent to "the document read unit". The plotter control unit 17 is equivalent to "the image forming unit". The input receiving unit 24 is equivalent to "the input receiving unit". The display control unit 25 is equivalent to "the display unit". The copy-output editing processing unit 26 according to the second embodiment is another example of "the image processing unit", the searching unit 41-1 is equivalent to "a detecting unit", and the replacing unit 41-2 is equivalent to "a replacing unit". The Web API service 15 and the Web-API communication unit 27 are equivalent to various "API communication units".

Screen configuration of the screen displayed in the operation panel

Figure 30:
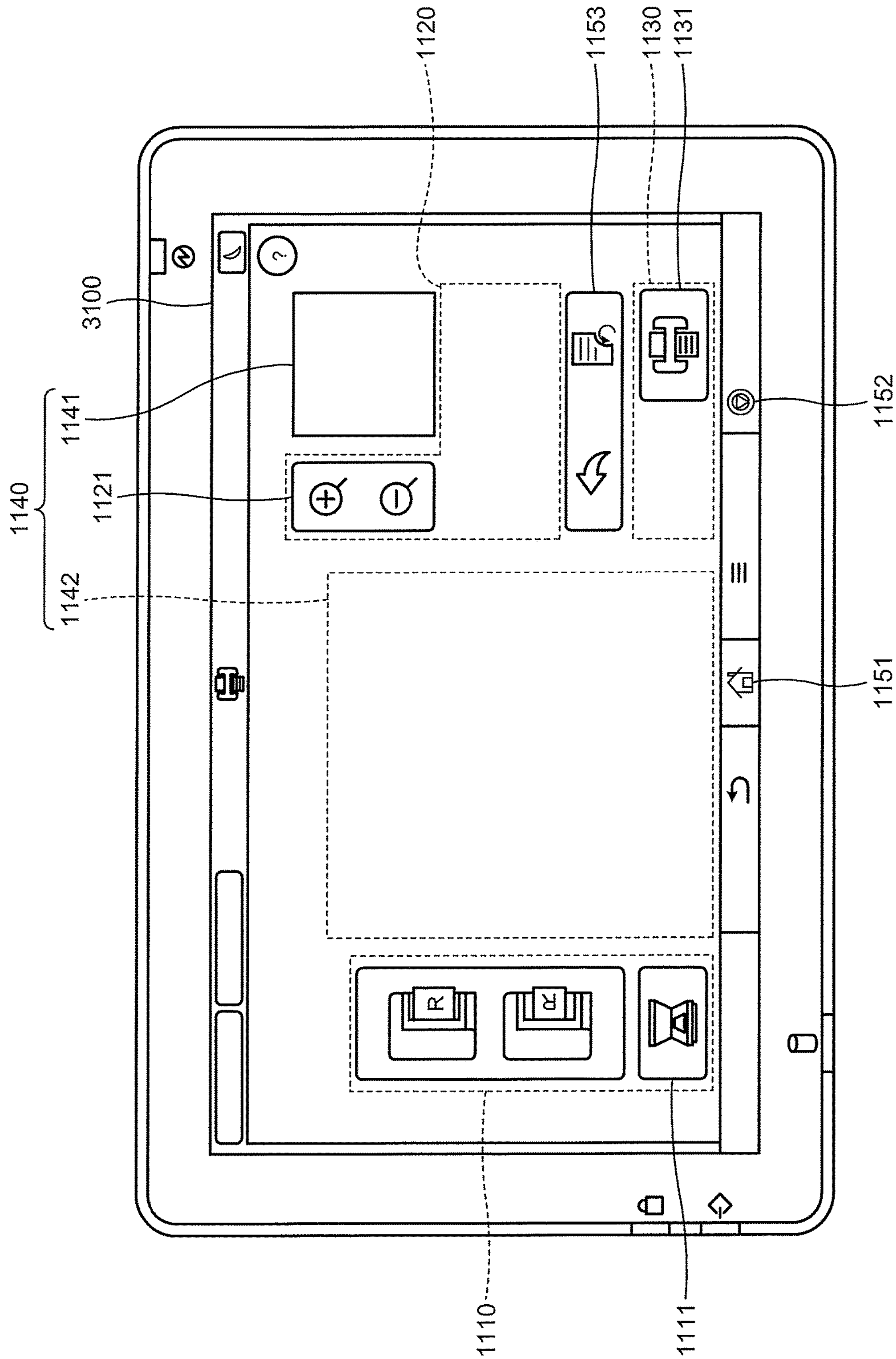
FIG. 30 is a diagram that illustrates an example of the display screen of the operation panel.

FIG. 30 is a diagram that illustrates an example of the display screen of the operation panel according to the second embodiment. FIG. 30 illustrates a copy-editing operation screen 3100 that is an example of the display screen. The copy-editing operation screen 3100 has a configuration such that the drawing-object selection button 1122 and the line correction button 1123 are deleted from the masking-operation button display area 1120 on the copy-editing operation screen 1100 (see FIG. 8) according to the first embodiment.

Furthermore, the masking-operation button display area 1120 may be provided with a setting button for setting a masking color or a setting button (an example of a setting unit) for setting an allowable range. For example, a color selection button is provided to receive the color that is designated as a masking color. Furthermore, a button for gradually changing an allowable range, a button for setting a numerical value, or the like, is provided to receive the allowable range. Here, for ease of explanation, white is set as a masking color on a different screen, and the allowable range is set to a predetermined range.

On the copy-editing operation screen 3100, the enlargement/reduction display area 1142 is a display area that displays a scanning image as an enlarged image or a reduced image and also receives input of a reference pixel of the scanning image that is being displayed.

The flow of signals between the copy-editing operation screen 3100 and the searching unit 41-1 is as follows. An operator touches and designates part of the target to be masked on the scanning image that is being displayed on the enlargement/reduction display area 1142. The input receiving unit 24 acquires the touched and designated positional information, and the searching unit 41-1 receives the positional information as a reference pixel.

Operation of the Operation Panel

Next, an explanation is given of operation of the operation panel according to the second embodiment. Here, operation of the operation panel is explained by using the process flow illustrated in FIG. 31 as an example. Furthermore, for user's operation procedure and screen flows of the operation panel, FIGS. 32A to 32C are referred to as appropriate.

Figure 31:
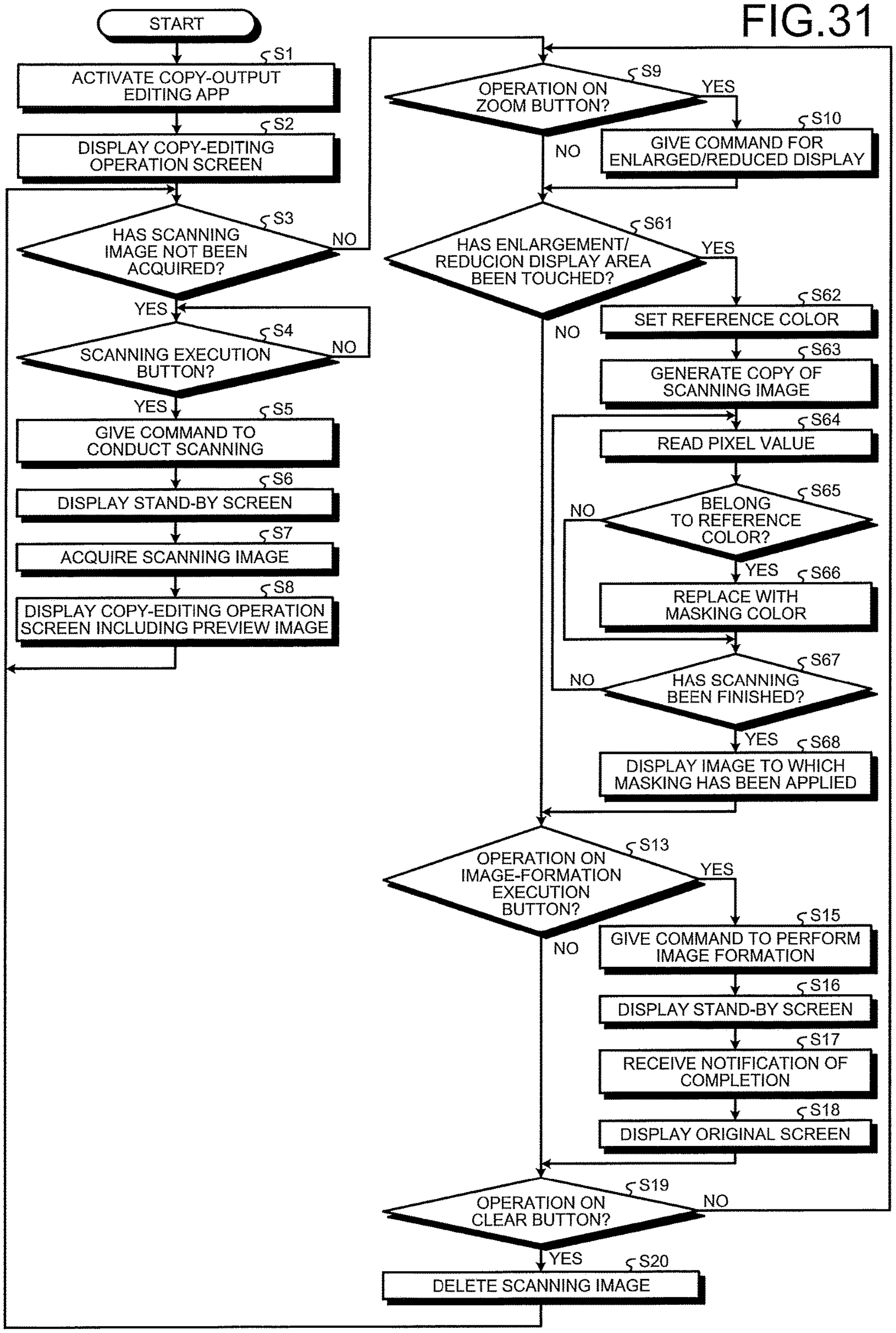
FIG. 31 is a diagram that illustrates an example of the process flow of the operation panel.
Figure 32A:
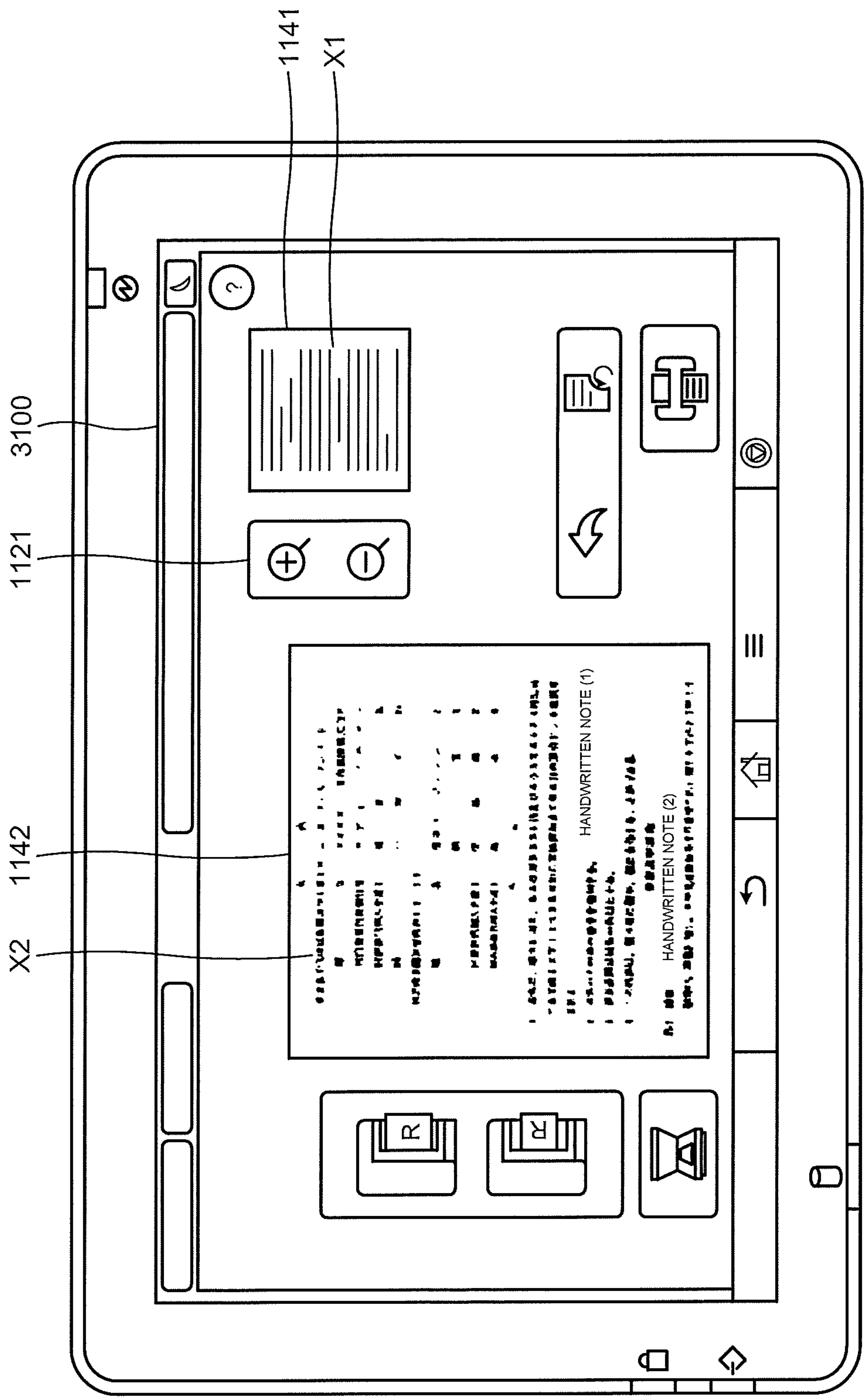
FIG. 32A is a diagram that illustrates a situation according to an example of user's operation.
Figure 32B:
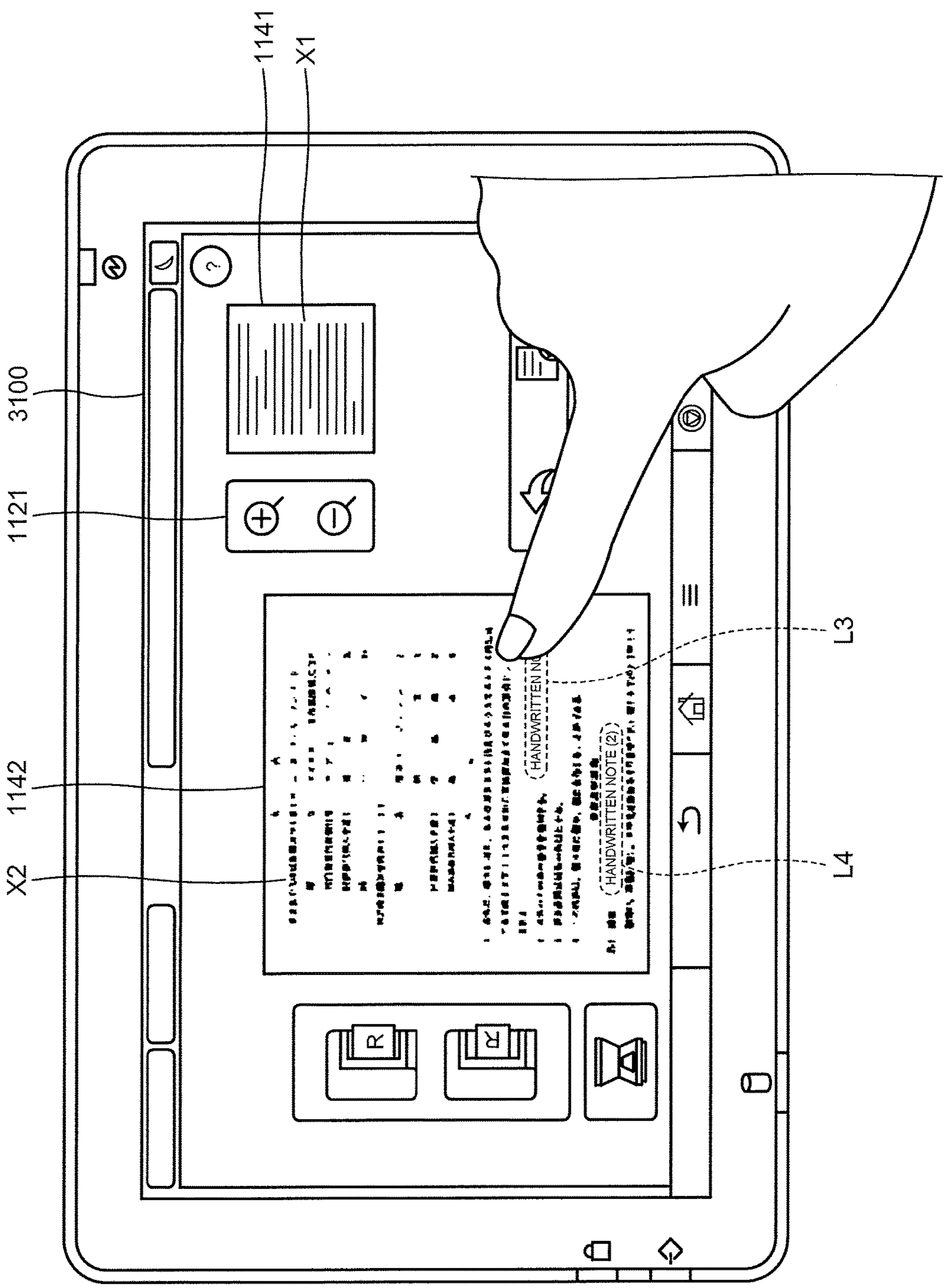
FIG. 32B is a diagram that illustrates a situation according to an example of user's operation.
Figure 32C:
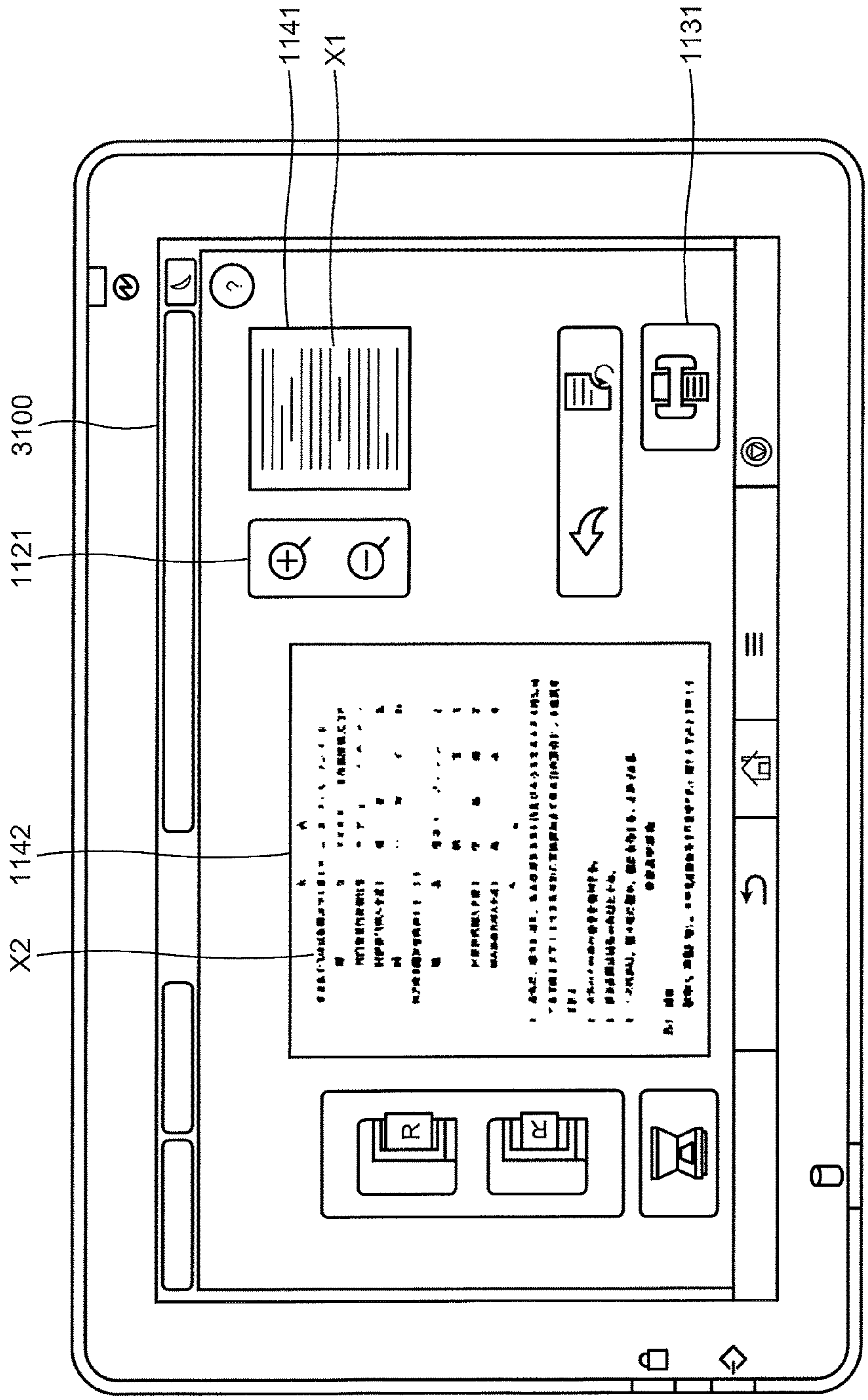
FIG. 32C is a diagram that illustrates a situation according to an example of user's operation.

FIG. 31 is a diagram that illustrates an example of the process flow of the operation panel according to the second embodiment. A masking process in this process flow is modified from the process flow (see FIG. 10) of the operation panel 20 according to the first embodiment. Steps S1 to S10 and Steps S15 to S19 are substantially the same as the process flow of the operation panel 20 according to the first embodiment. An explanation is given below of the other process that is different from the process flow of the operation panel 20 according to the first embodiment.

Subsequent to the operation at Step S9 (determined as No) or Step S10, the copy-output editing processing unit 26 (the searching unit 41-1) first determines whether the enlargement/reduction display area 1142 of the copy-editing operation screen 3100 (see FIG. 32A) has been touched (Step S61). If it has not been touched (Step S61: determined as No), a transition is made to Step S13.

Conversely, if the input receiving unit 24 has received the positional information on the touch position, the copy-output editing processing unit 26 (the searching unit 41-1) determines that a touch has been performed (Step S61: determined as Yes) and sets the pixel value of the pixel (equivalent to the reference pixel) that corresponds to the positional information as a reference color (Step S62). For example, if a user touches a part of handwritten notes (a part of notes within dashed-line frames L3, L4 in FIG. 32B) that are written on a piece of test paper with a red pencil, a red ballpoint pen, or the like, the touched position becomes a reference pixel. Furthermore, to properly designate an intended area, a scanning image may be enlarged while it is touched. Furthermore, an operating section, or the like, may be provided on the screen to move a designated position from the pixel that is designated by touch.

Then, the copy-output editing processing unit 26 (the searching unit 41-1) generates a copy of the scanning image that is being displayed (Step S63) and uses the copy as a target to read the pixel value of each pixel of the scanning image in a predetermined scanning order (Step S64).

Then, the copy-output editing processing unit 26 (the searching unit 41-1) determines whether the read pixel value belongs to the reference color (Step S65). For example, it is determined whether the R value, the G value, and the B value of the read pixel value are included in the respective allowable ranges of the R value, the G value, and the B value of the reference color. Then, if it is determined that the R value, the G value, and the B value of the read pixel value are all included in the respective allowable ranges, it is determined that the read pixel value belongs to the reference color. That is, the pixel is detected as a pixel that belongs to the reference color.

If the read pixel value belongs to the reference color (Step S65: determined as Yes), the copy-output editing processing unit 26 (the replacing unit 41-2) replaces the pixel value of the read pixel with the pixel value of the preset masking color (white in this embodiment) (Step S66). If the read pixel value does not belong to the reference color (Step S65: determined as No), the copy-output editing processing unit 26 (the searching unit 41-1) skips Step S66 and proceeds to Step S67.

Then, the copy-output editing processing unit 26 (the searching unit 41-1) determines whether scanning has been finished for all the pixels (Step S67) and, if scanning has not been finished for all the pixels (Step S67: determined as No), proceeds to Step S64 so as to perform a searching and replacing process on the remaining pixel in the same manner.

If scanning for all the pixels has been finished (Step S67: determined as Yes), the copy-output editing processing unit 26 (the searching unit 41-1) replaces the display on the enlargement/reduction display area 1142 with the scanning image (see FIG. 32C) to which masking has been applied (Step S68) and proceeds to the operation at Step S13.

Furthermore, if a part of handwritten notes remains after one-time touch because of a low set value for the allowable range used for determining a pixel that belongs to the reference color, or the like, the remaining part of the handwritten notes is repeatedly touched so that the remaining handwritten note is deleted. In this case, a copy of the finally generated scanning image is displayed. Furthermore, if the remaining part of handwritten notes is repeatedly touched, copies of the scanning image may be generated as files in accordance with the number of times of touches so that the original state may be restored in the order that notes are deleted.

A user performs a touch operation on the image-formation execution button 1131 (see FIG. 32C), thereby giving a command to print out the scanning image to which masking has been applied. When it is determined that a touch operation has been performed on the image-formation execution button 1131 (Step S13: determined as Yes), the copy-output editing processing unit 26 gives a command to the main body 10 so as to conduct image formation on the image (copy image) being displayed, to which masking has been applied (Step S15). As the subsequence is substantially the same as that in FIG. 10, explanation is omitted.

Furthermore, at Step S20 for deleting the scanning image, the scanning image and all the copies are deleted.

FIGS. 32A to 32C are diagrams that illustrate examples of user's operation on the operation panel according to the second embodiment. FIG. 32A illustrates a displayed state immediately after an enlarging/reducing operation has been performed on the acquired scanning image. The enlargement/reduction display area 1142 of the copy-editing operation screen 3100 displays a scanning image (the enlarged/reduced image X2) after an enlarging/reducing operation. As an example of the scanning image (the enlarged/reduced image X2), the document for print having handwritten notes at two areas is illustrated.

FIG. 32B illustrates a situation where a user touches a handwritten note on the scanning image (the enlarged/reduced image X2) with a finger. The user touches a part of handwritten notes included in the scanning image (the enlarged/reduced image X2) with a finger. A touched position is on a handwritten note and, in FIG. 32B, it is any part of the notes surrounded by the dashed-line frames L3, L4 at two areas for explanation.

FIG. 32C is a diagram that illustrates an example of the displayed state of the enlargement/reduction display area 1142 after masking is conducted. FIG. 32C illustrates a state where handwritten notes at two areas have been replaced with a white color of the base after one-time touch so that they have been deleted. If the allowable range is properly set, the handwritten notes at two areas are substantially detected from the image as the targets for masking, and the handwritten notes are deleted from the document for print as described above. Furthermore, if a part of handwritten notes remains after one-time touch because of a low set value for the allowable range, or the like, the remaining part of the handwritten notes may be repeatedly touched. Thus, the remaining handwritten note is also deleted, and a state may be obtained such that the handwritten notes have been deleted as illustrated in FIG. 32C.

Communication Sequence

The communication processing between the operation panel and the main body 10 according to the second embodiment is substantially the same as the communication processing (see FIG. 14) between the operation panel 20 and the main body 10 according to the first embodiment. However, the operations at Step S117 (see FIG. 14) and Step S118 (see FIG. 14) by the operation panel are replaced with the searching and replacing operations according to the second embodiment. Furthermore, the image transmitted at Step S120 and the image read at Step S125 are replaced with copy images in which replacement is conducted with a masking color. Explanation is here omitted for the others as they are duplicated.

Figure 33A:
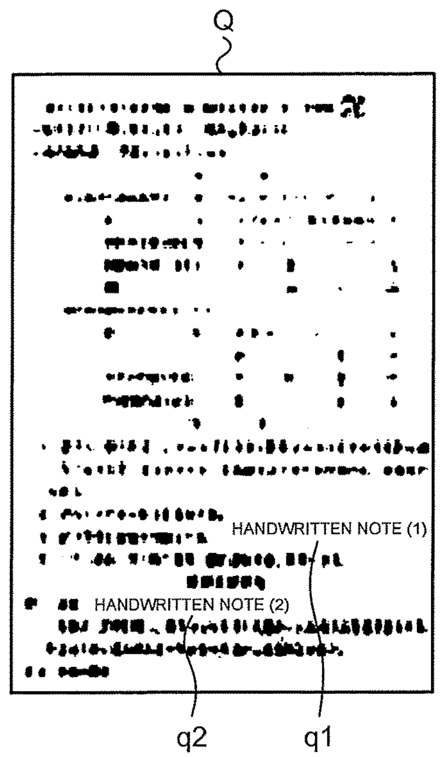
FIGS. 33A and 33B are diagrams that illustrate an example of the output material that is printed out by the main body.
Figure 33B:
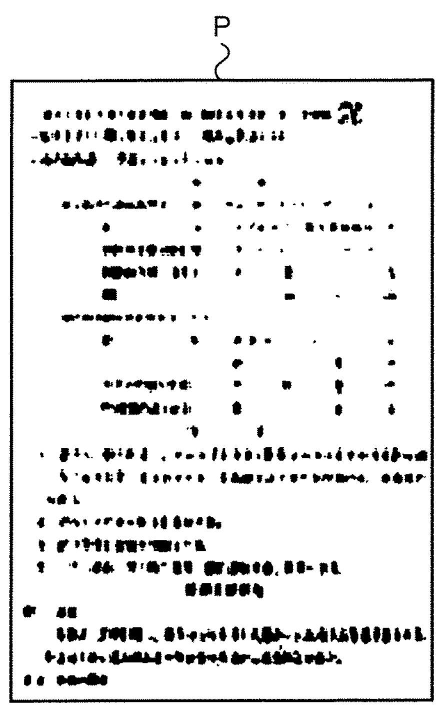

FIGS. 33A and 33B are diagrams that illustrate an example of the output material that is printed out by the main body 10. To compare the states before masking and after masking, FIGS. 33A and 33B illustrate a document Q before masking and the output material P that is printed out after masking is applied to the document Q. FIG. 33A illustrates the test paper where red-colored notes q1, q2 are written as an example of the document Q. FIG. 33B illustrates, as an example of the output material P, the output material after the red-colored notes q1, q2 illustrated in FIG. 33A have been deleted by being masked with the color of the base.

As described above, with the operation panel according to the second embodiment, a pixel that belongs to the same color as the pixel value (color) at the position touched with a finger on the scanning image being displayed is searched for as the target for masking, and the color of the pixel that belongs to the same color, detected during searching, is replaced with a masking color. Thus, original information (texts, ruled lines, graphics, or the like) printed on documents may be left unchanged, and information such as notes that are added later may be deleted.

First Modification of the Second Embodiment

A modification for setting a masking color is described. A masking color may be preset for use, or it may be set by a user when masking is applied. If it is set by a user, a configuration may be such that for example a color selection button is provided on a setting screen for setting a set value for masking and the color to be used for masking is selected through the setting screen. In another example described here, a user designates a color of masking from a scanning image.

Screen Configuration of the Screen Displayed on the Operation Panel

Figure 34:
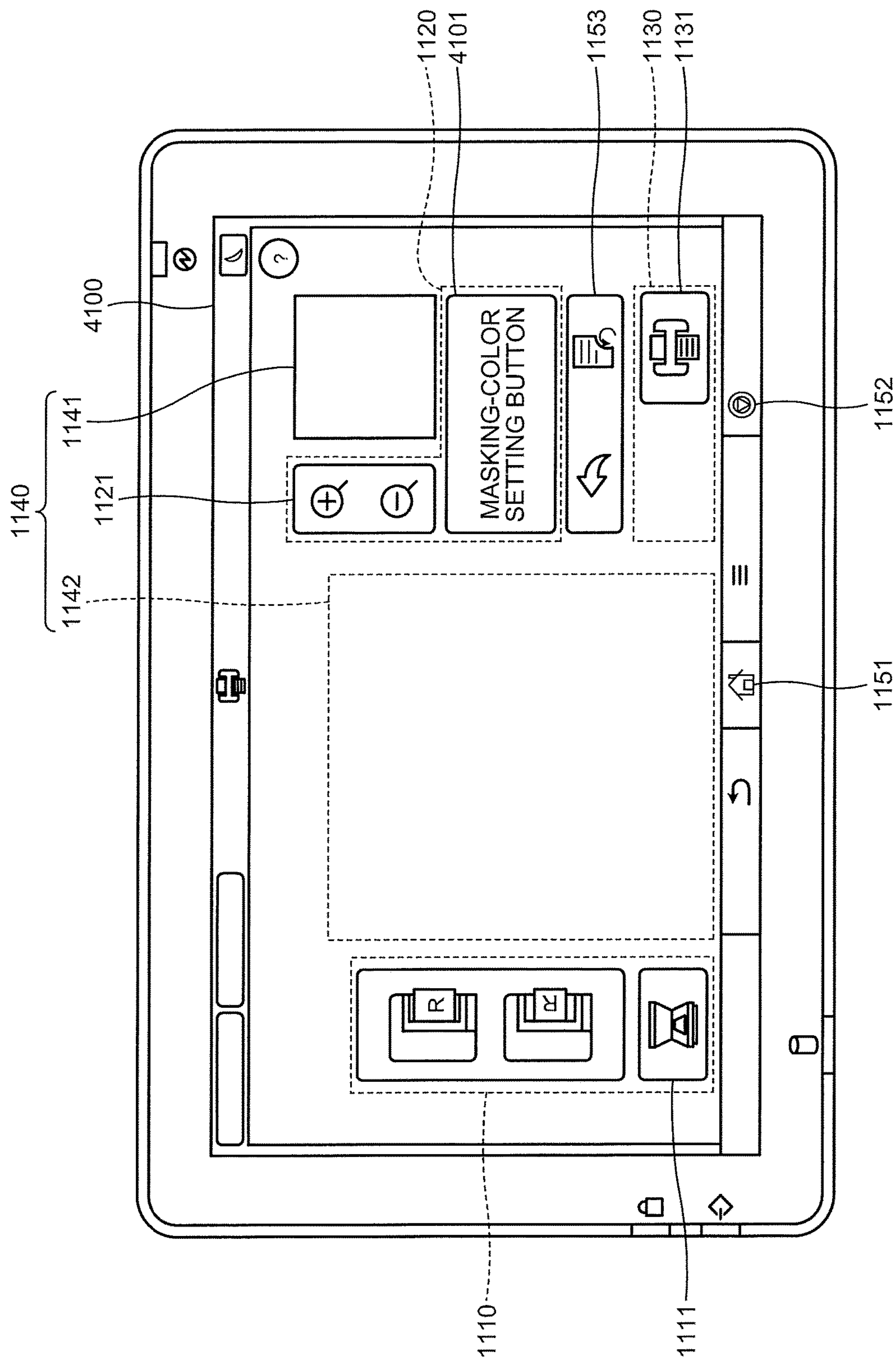
FIG. 34 is a diagram that illustrates an example of the display screen of the operation panel according to a first modification of the second embodiment.

FIG. 34 is a diagram that illustrates an example of the display screen of the operation panel according to the first modification of the second embodiment. A copy-editing operation screen 4100 illustrated in FIG. 34 is obtained by adding a masking-color setting button 4101 to the masking-operation button display area 1120 of the copy-editing operation screen 3100 (see FIG. 30) according to the second embodiment.

The masking-color setting button 4101 is a command button for prompting an operator to designate the color used in the scanning image displayed on the enlargement/reduction display area 1142 as a masking color. While the masking-color setting button 4101 is set on, the enlargement/reduction display area 1142 of the copy-editing operation screen 4100 receives input of a reference pixel that is the target for masking and also receives input of the pixel that is designated as a masking color.

The copy-output editing processing unit 26 changes the setting as described below. For example, an operator touches the masking-color setting button 4101 to set it on and further touches the pixel area (e.g., background) for designating a masking color for the scanning image that is being displayed on the enlargement/reduction display area 1142. In this case, the copy-output editing processing unit 26 makes it possible to receive input of a designated pixel that is set as a masking color due to a touch on the masking-color setting button 4101, and after the input receiving unit 24 acquires the positional information that is touched on the enlargement/reduction display area 1142, the replacing unit 41-2 sets the color (pixel value) in the positional information as a masking color.

Furthermore, it is possible to optionally set the order in which a touch to the reference pixel, which is the target for masking, and a touch to a pixel for a masking color are received. For example, a touch to the reference pixel, which is the target for masking, and a touch to a pixel for a masking color may be alternately received in this order.

Operation of the Operation Panel

Next, an explanation is given of operation when the operation panel according to the first modification of the second embodiment conducts masking. Here, operation of the operation panel is explained by using the process flow illustrated in FIG. 35 as an example. Furthermore, FIGS. 36A to 36D are referred to as appropriate for user's operation steps and screen flows of the operation panel.

Figure 35:
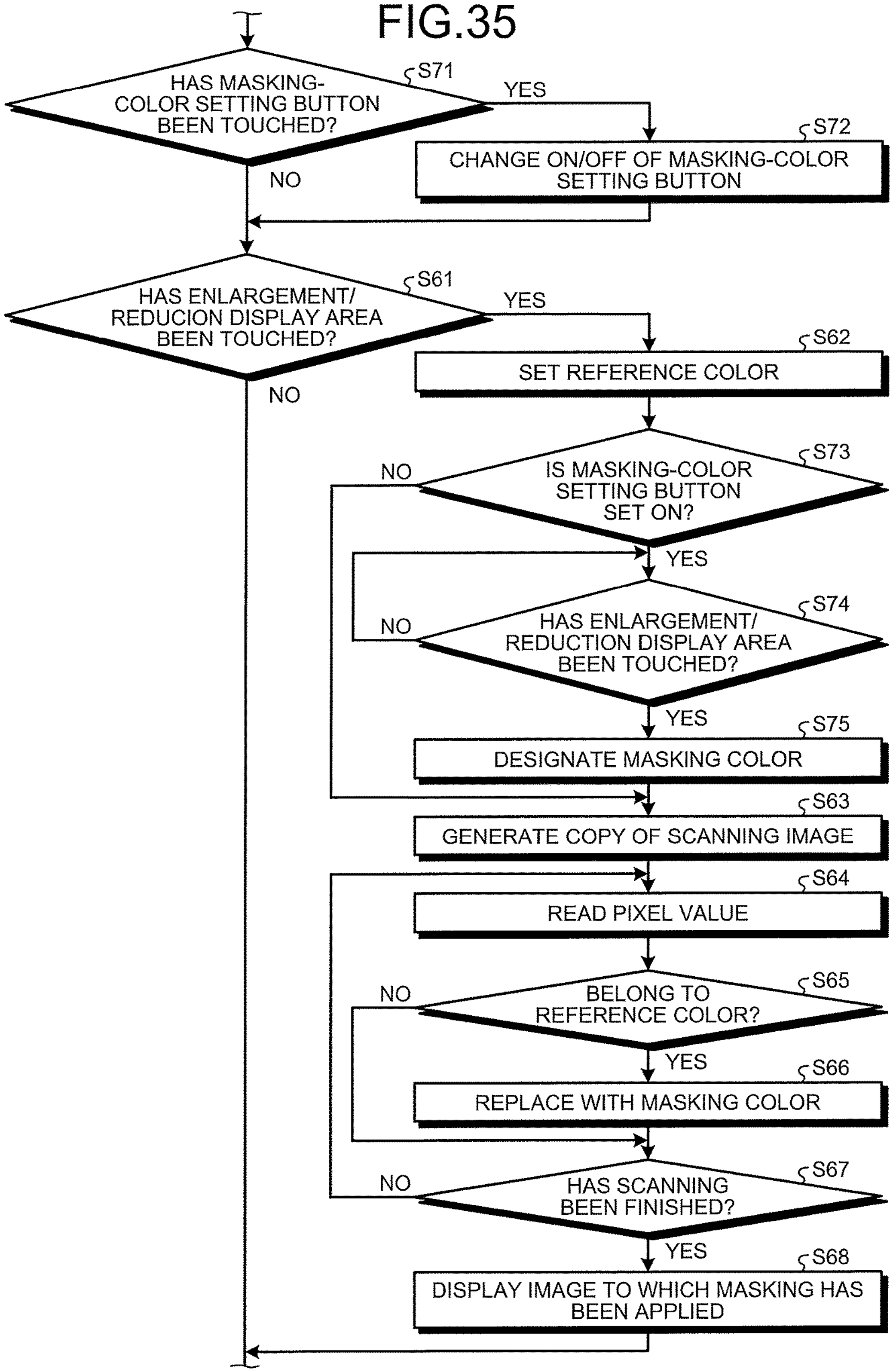
FIG. 35 is a diagram that illustrates an example of the process flow of the operation panel.

FIG. 35 is a diagram that illustrates an example of the process flow of the operation panel according to the first modification of the second embodiment. FIG. 35 illustrates a modification of the process after Step S9 (determined as No) and Step S10 to immediately before Step S13 in the process flow (see FIG. 31) of the operation panel according to the second embodiment. Furthermore, in the process according to the modification illustrated in FIG. 35, the same operation as that in the process flow (see FIG. 31) of the operation panel according to the second embodiment is attached with the same number.

First, the copy-output editing processing unit 26 determines whether the masking-color setting button 4101 on the copy-editing operation screen 4100 (see FIG. 36A) has been touched (Step S71).

If the input receiving unit 24 receives the positional information on the masking-color setting button 4101, the copy-output editing processing unit 26 determines that there has been a touch (Step S71: determined as Yes) and changes the on/off setting of the masking-color setting button 4101 (Step S72). If the input receiving unit 24 does not receive the positional information on the masking-color setting button 4101, the copy-output editing processing unit 26 determines that there has been no touch (Step S71: determined as No) and skips Step S72 so as to keep the on/off setting of the masking-color setting button 4101.

Then, the copy-output editing processing unit 26 (the searching unit 41-1) determines whether the enlargement/reduction display area 1142 of the copy-editing operation screen 4100 (see FIG. 36B) has been touched (Step S61).

After the input receiving unit 24 receives the positional information on a touch, the copy-output editing processing unit 26 (the searching unit 41-1) determines that a touch has been performed (Step S61: determined as Yes) and sets the pixel value of the reference pixel that corresponds to the positional information as a reference color (Step S62).

Then, the copy-output editing processing unit 26 (the replacing unit 41-2) determines whether the masking-color setting button 4101 is set on (Step S73). If the masking-color setting button 4101 is set on (Step S73: determined as Yes), the copy-output editing processing unit 26 (the replacing unit 41-2) then further receives input of a touch to the enlargement/reduction display area 1142 of the copy-editing operation screen 4100 (see FIG. 36C) and determines whether a touch has been performed (Step S74).

After the input receiving unit 24 receives the positional information on a touch, the copy-output editing processing unit 26 (the replacing unit 41-2) determines that there has been a touch (Step S74: determined as Yes) and designates the pixel value of the pixel that corresponds to the positional information as a masking color (Step S75). For example, if the background of a document is colored, such as light blue or yellow, when the background of the scanning image is touched by a user, the pixel value at the touched position with the color is designated as a masking color. Furthermore, if there has been no touch (Step S74: determined as No), the copy-output editing processing unit 26 (the replacing unit 41-2) stands by until a touch is input. Here, examples of the document that has a colored background include notebooks for children. Other examples include coarse paper (light brown) or old paper.

If the masking-color setting button 4101 is set off (Step S73: determined as No), Step S75 is skipped. That is, the masking color is kept by default (white, or the like).

Then, the copy-output editing processing unit 26 (the searching unit 41-1) generates a copy of the scanning image that is being displayed (Step S63) and uses the copy as a target to read a pixel value in a predetermined scanning order (Step S64).

Then, the copy-output editing processing unit 26 (the searching unit 41-1) determines whether the read pixel value belongs to the reference color (Step S65).

If the read pixel value belongs to the reference color (Step S65: determined as Yes), the copy-output editing processing unit 26 (the replacing unit 41-2) replaces the pixel value with the pixel value of the masking color (Step S66). If the read pixel value does not belong to the reference color (Step S65: determined as No), the copy-output editing processing unit 26 (the searching unit 41-1) skips Step S66 and proceeds to Step S67.

Then, the copy-output editing processing unit 26 (the searching unit 41-1) determines whether scanning has been finished for all the pixels (Step S67) and, if scanning has not been finished for all the pixels (Step S67: determined as No), proceeds to Step S64 so as to perform a searching and replacing process on the remaining pixel in the same manner.

If scanning for all the pixels has been finished (Step S67: determined as Yes), the copy-output editing processing unit 26 (the searching unit 41-1) replaces the display on the enlargement/reduction display area 1142 with the scanning image (see FIG. 36D) to which masking has been applied (Step S68) and proceeds to the operation at Step S13.

Furthermore, in the process according to this modification, at Step S20 (see FIG. 31) for deleting the scanning image, the scanning image and all the copies are deleted.

Figure 36A:
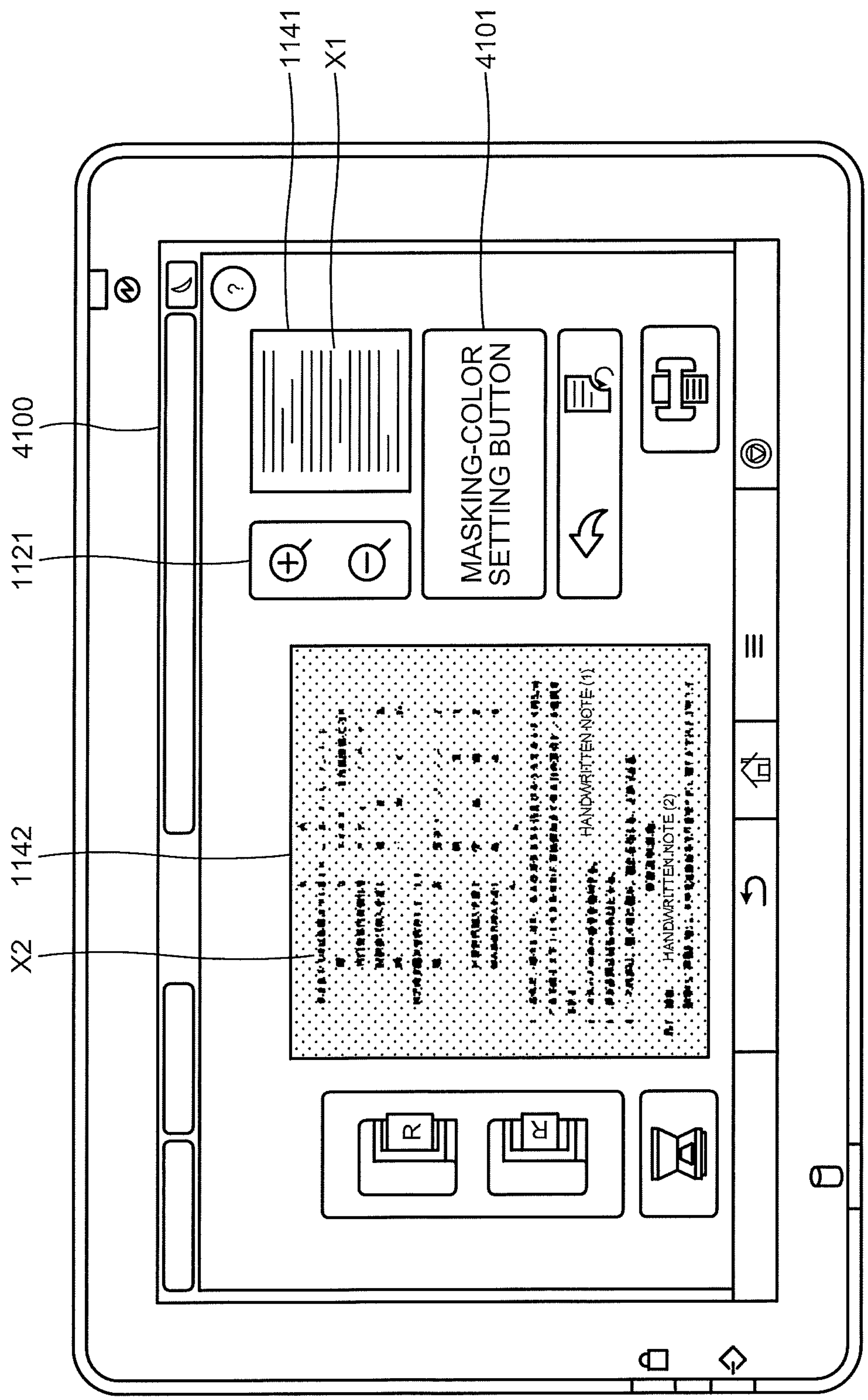
FIG. 36A is a diagram that illustrates a situation according to an example of user's operation.

FIGS. 36A to 36D are diagrams that illustrate examples of user's operation on the operation panel according to the first modification of the second embodiment. FIG. 36A illustrates a displayed state immediately after an enlarging/reducing operation performed on an acquired scanning image. The enlargement/reduction display area 1142 of the copy-editing operation screen 4100 displays the scanning image (the enlarged/reduced image X2) after the enlarging/reducing operation. For example, as the scanning image (the enlarged/reduced image X2), the document for print having handwritten notes at two areas is illustrated.

Figure 36B:
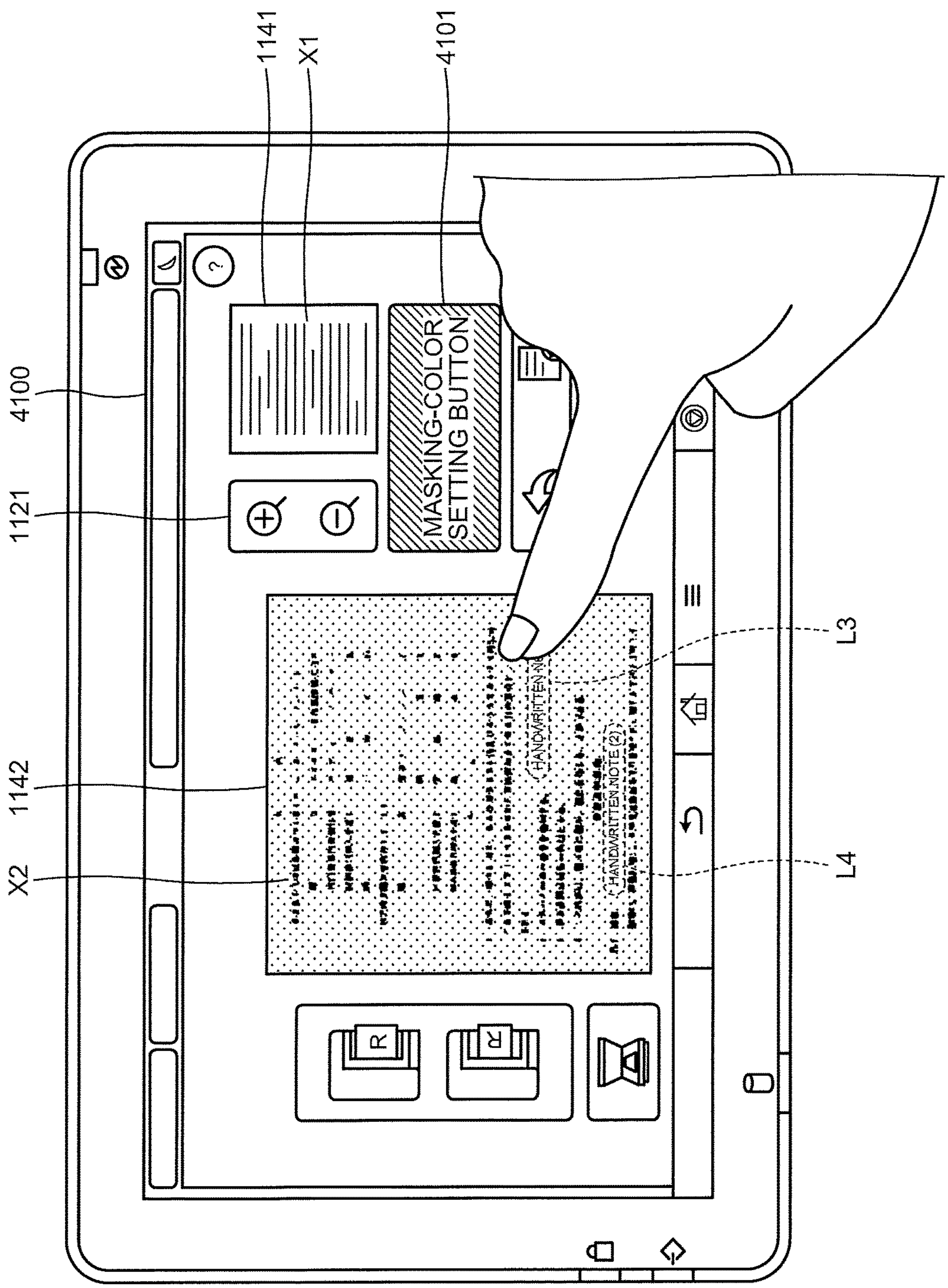
FIG. 36B is a diagram that illustrates a situation according to an example of user's operation.

FIG. 36B illustrates a situation where a user touches a handwritten note on the scanning image (the enlarged/reduced image X2) with a finger. The user touches a part of handwritten notes included in the scanning image (the enlarged/reduced image X2) with a finger. A touched position is on a handwritten note and, in FIG. 36B, it is any part of the notes surrounded by the dashed-line frames L3, L4 at two areas for explanation.

Figure 36C:
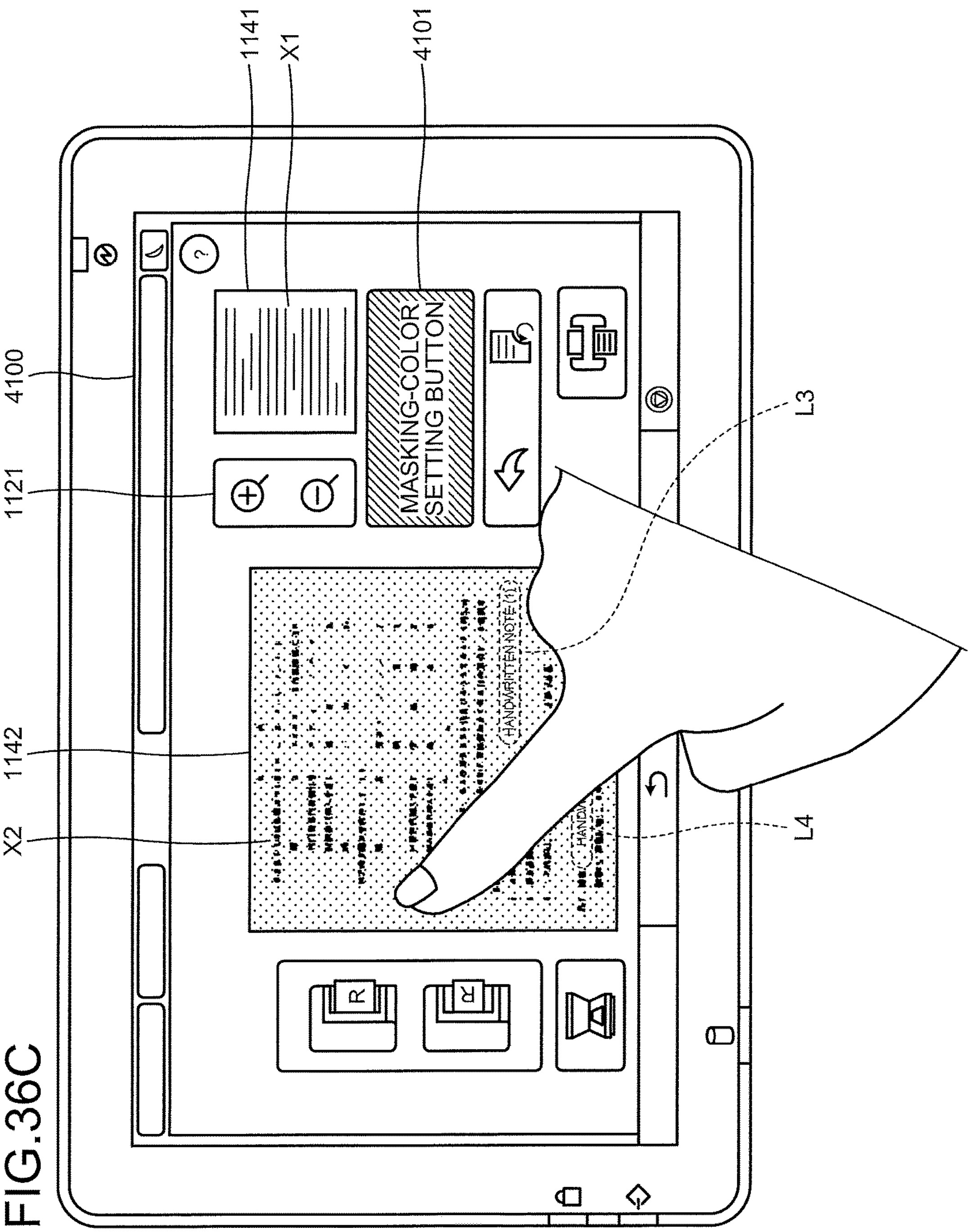
FIG. 36C is a diagram that illustrates a situation according to an example of user's operation.

FIG. 36C illustrates a situation where a user touches the color that is designated as a masking color in the scanning image (the enlarged/reduced image X2) with a finger. In the situation illustrated here, for example, the base of the document included in the scanning image (the enlarged/reduced image X2) is touched with a finger. A touched position is any part of the base of the document.

Figure 36D:
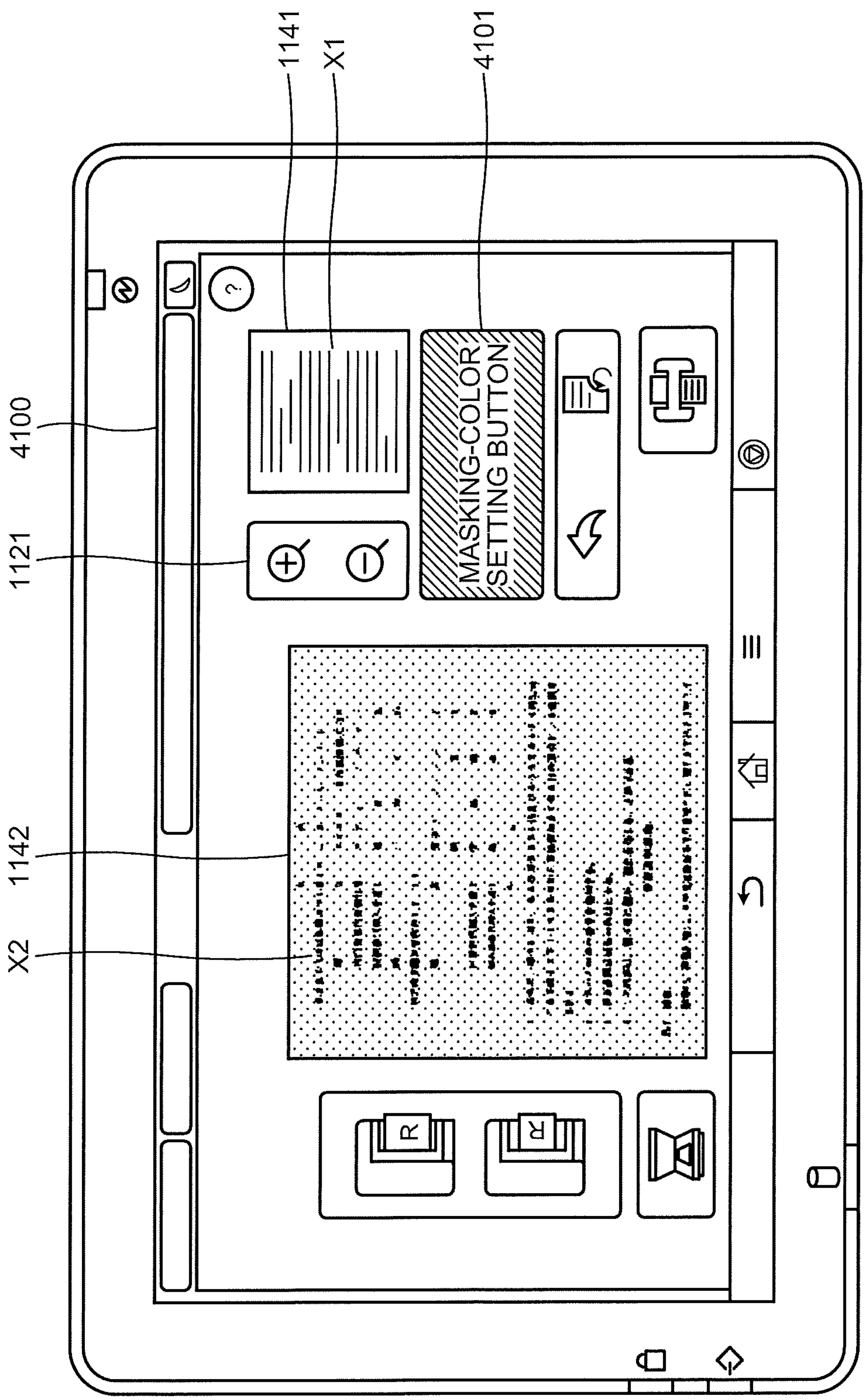
FIG. 36D is a diagram that illustrates a situation according to an example of user's operation.

FIG. 36D is a diagram that illustrates an example of the displayed state of the enlargement/reduction display area 1142 after masking is conducted. FIG. 36D illustrates a state where handwritten notes have been replaced with the color designated as a masking color due to a touch so that they have been deleted. Furthermore, although not illustrated, the output material that is printed out from the main body 10 has the image in the displayed state illustrated on the enlargement/reduction display area 1142.

Communication Sequence

As the communication processing between the operation panel and the main body 10 according to the first modification of the second embodiment is substantially the same as the communication processing between the operation panel and the main body 10 according to the second embodiment, explanation is omitted here.

As described above, according to the first modification of the second embodiment, for example, a user designates a reference pixel and then designates a pixel that indicates a masking color so that the target for masking including the reference pixel is masked with the designated color in the image.

Furthermore, if a part of handwritten notes remains after one-time touch, the remaining part of the handwritten notes is repeatedly touched so that the remaining handwritten note may be deleted in the same masking color.

Furthermore, although in the example described here the reference pixel, which is the target for masking, and the pixel for a masking color are alternately touched, the order of touches is not limited thereto. For example, if the targets for masking are dispersed, touches may be received multiple times for the respective targets for masking and then a touch may be received once to set a common masking color for the targets for masking. In this case, multiple areas that are touched as the targets for masking are masked with the same masking color at one-time touch.

Furthermore, after the reference pixel, which is the target for masking, is touched, the target for replacement is replaced with a predetermined color in a user-friendly manner, and then a masking color is received from a user so that the predetermined color, which is temporary, may be replaced with the masking color that is received from the user.

In this way, according to the first modification of the second embodiment, users may designate a masking color from a scanning image. Therefore, for example, even if the base of a document has a color other than white, handwritten notes, or the like, may be deleted in accordance with the color of the base of the document.

Second Modification of the Second Embodiment

Another modification for setting a masking color is described. In the example described here, the target for masking at a touched position is excluded, and the other targets for masking are masked. For example, it is applicable to a case where changes in color, such as yellowing, included in documents are removed.

Screen configuration of the screen displayed on the operation panel

Figure 37:
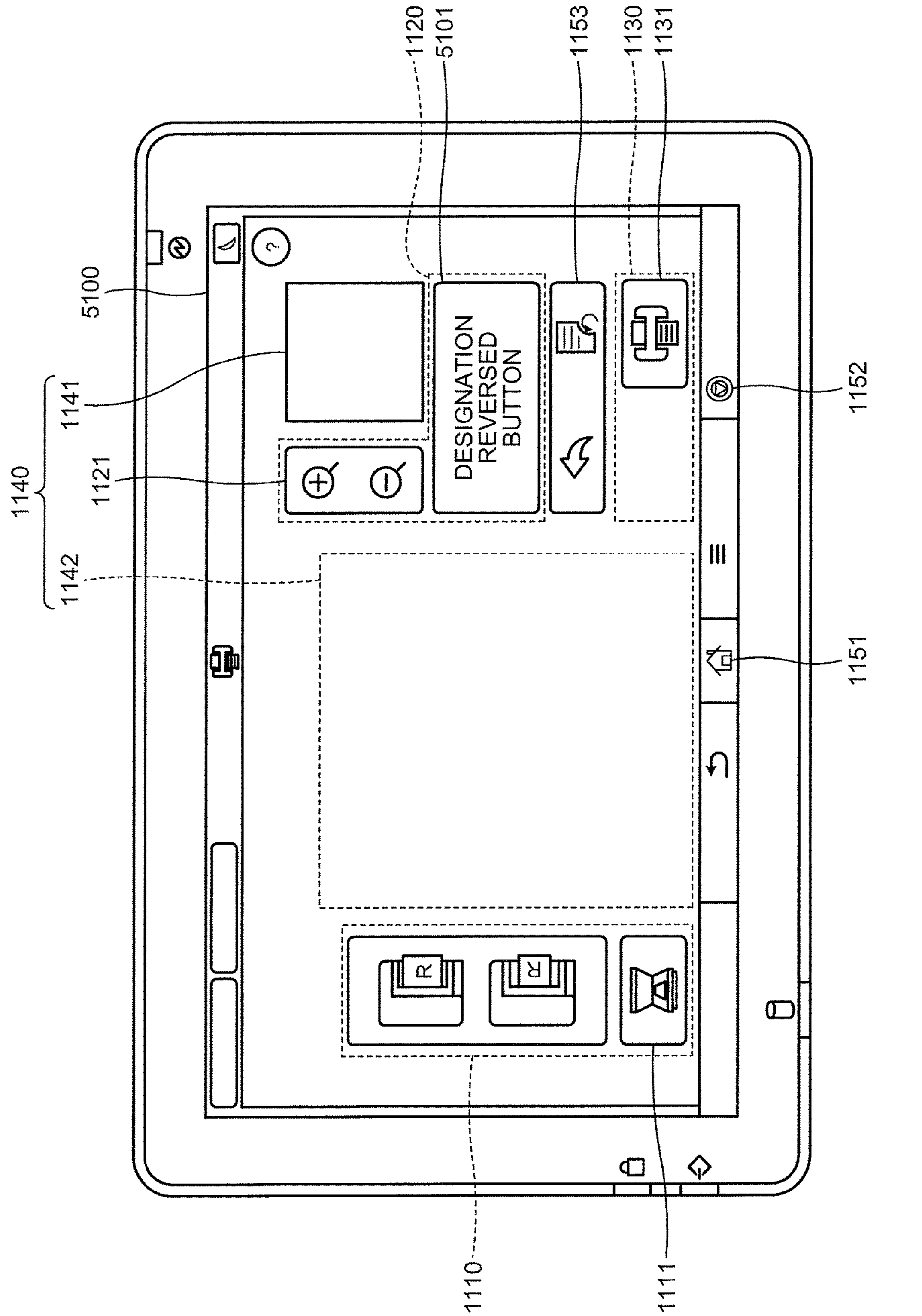
FIG. 37 is a diagram that illustrates an example of the display screen of the operation panel according to a second modification of the second embodiment.

FIG. 37 is a diagram that illustrates an example of the display screen of the operation panel according to a second modification of the second embodiment. A copy-editing operation screen 5100 illustrated in FIG. 37 is obtained by adding a designation reversed button 5101 to the masking-operation button display area 1120 of the copy-editing operation screen 3100 (see FIG. 30) according to the second embodiment.

The designation reversed button 5101 is a command button for designating, as pixels that are targeted for masking in the scanning image displayed on the enlargement/reduction display area 1142, the rest of pixels (referred to as "removal pixels") other than the reference pixel designated by a user and pixels included in a range of the color of the reference pixel.

The copy-output editing processing unit 26 changes the settings as described below. For example, an operator touches the designation reversed button 5101 to set it on and then touches an area that is not targeted for masking, e.g., original information (printed ruled lines, or the like) in documents, in the scanning image that is being displayed on the enlargement/reduction display area 1142. In this case, due to a touch on the designation reversed button 5101, the copy-output editing processing unit 26 receives the pixel designated on the enlargement/reduction display area 1142 as the masking-not-targeted reference pixel that is not targeted for masking and sets pixels (pixels of the background, or the like) that fall outside the range of the color of the reference pixel as the target for masking. In the copy-output editing processing unit 26, after the input receiving unit 24 acquires the positional information that is touched on the enlargement/reduction display area 1142, the searching unit 41-1 sets the color (pixel value) of the reference pixel that corresponds to the positional information to be exempt from masking.

Operation of the Operation Panel

Next, an explanation is given of operation when the operation panel conducts masking according to the second modification of the second embodiment. Here, an explanation is given of operation of the operation panel by using the process flow illustrated in FIG. 38 as an example. Furthermore, FIGS. 39A to 39C are referred to as appropriate for user's operation steps and screen flows of the operation panel.

Figure 38:
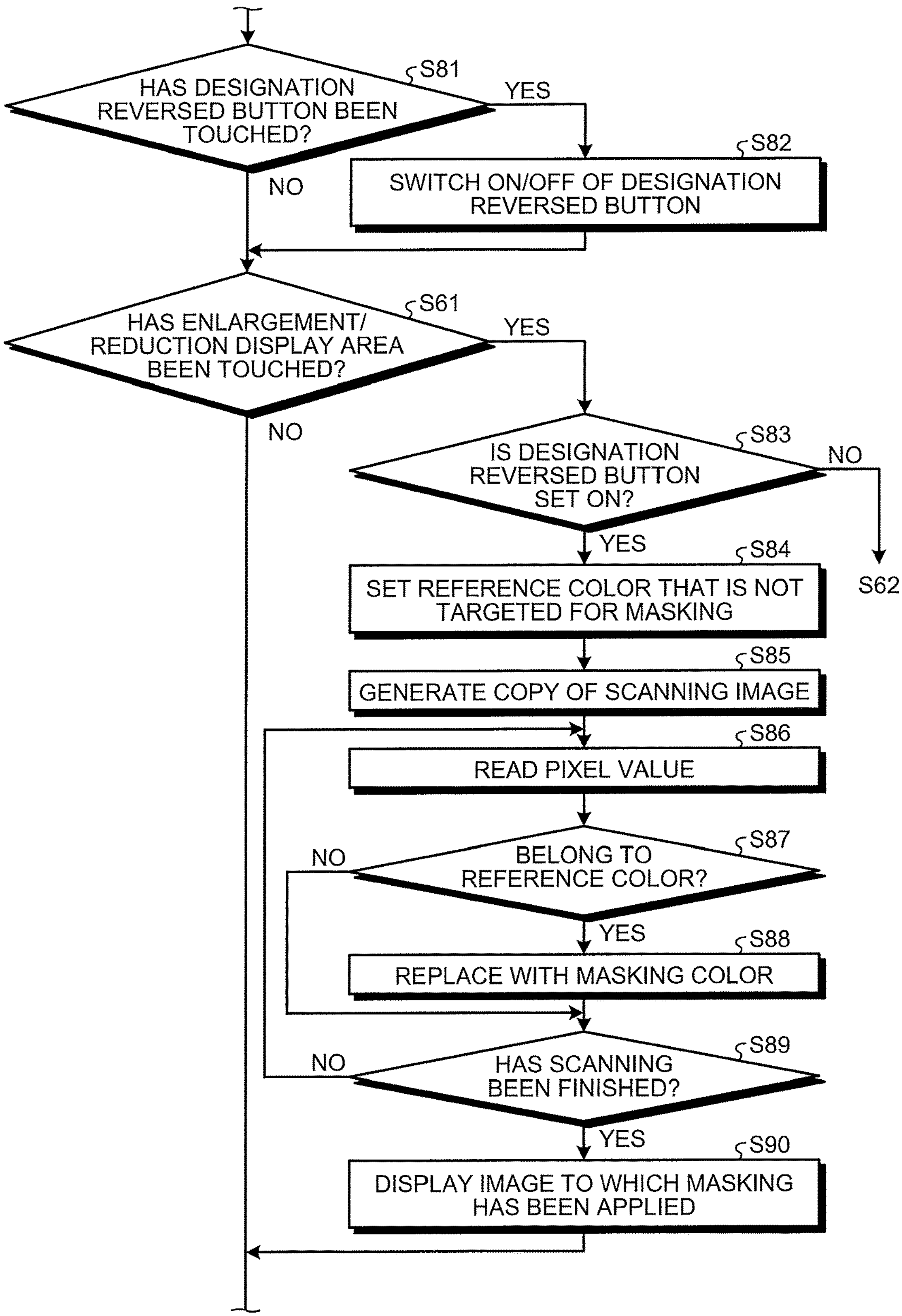
FIG. 38 is a diagram that illustrates an example of the process flow of the operation panel.
Figure 39A:
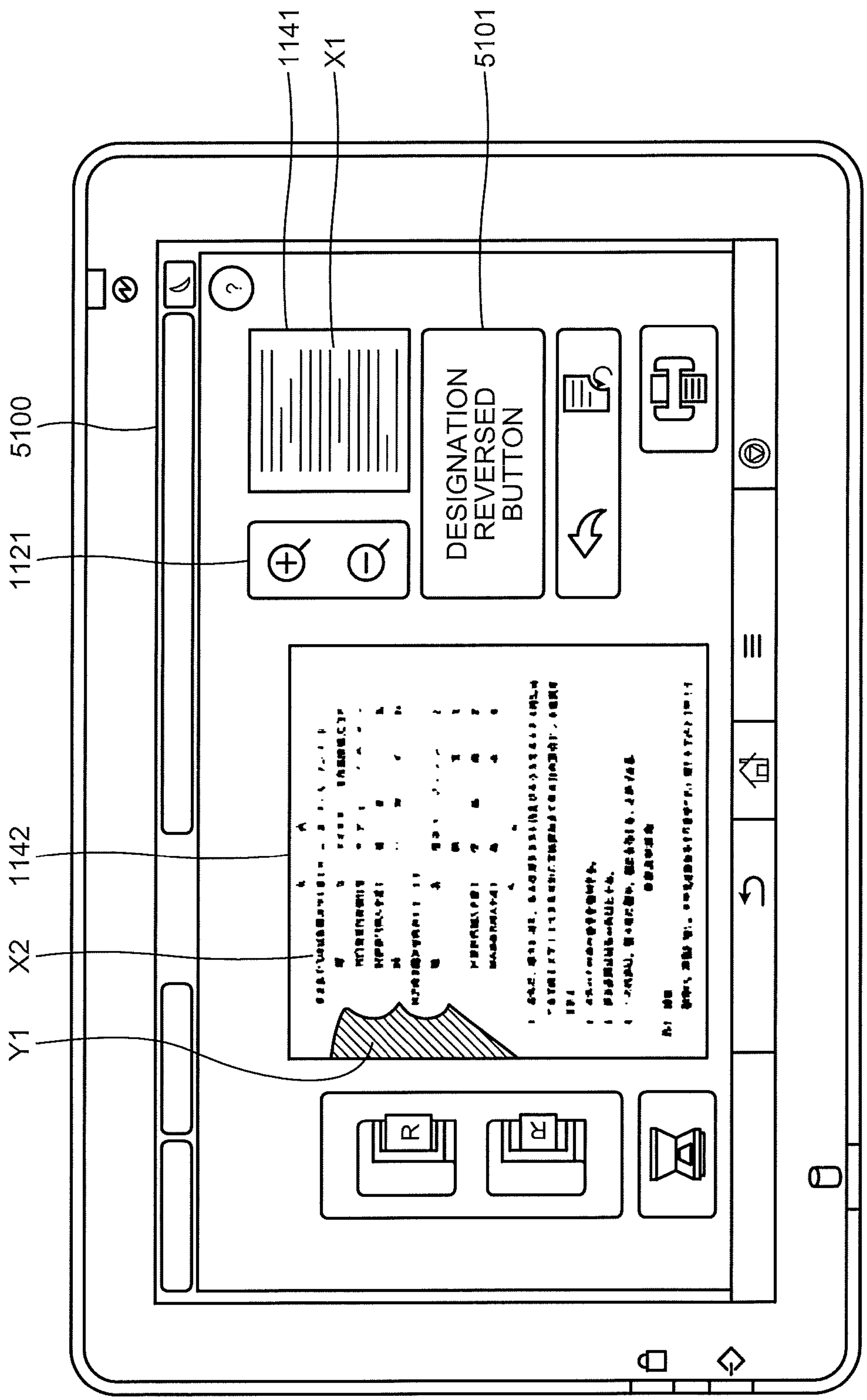
FIG. 39A is a diagram that illustrates a situation according to an example of user's operation.
Figure 39B:
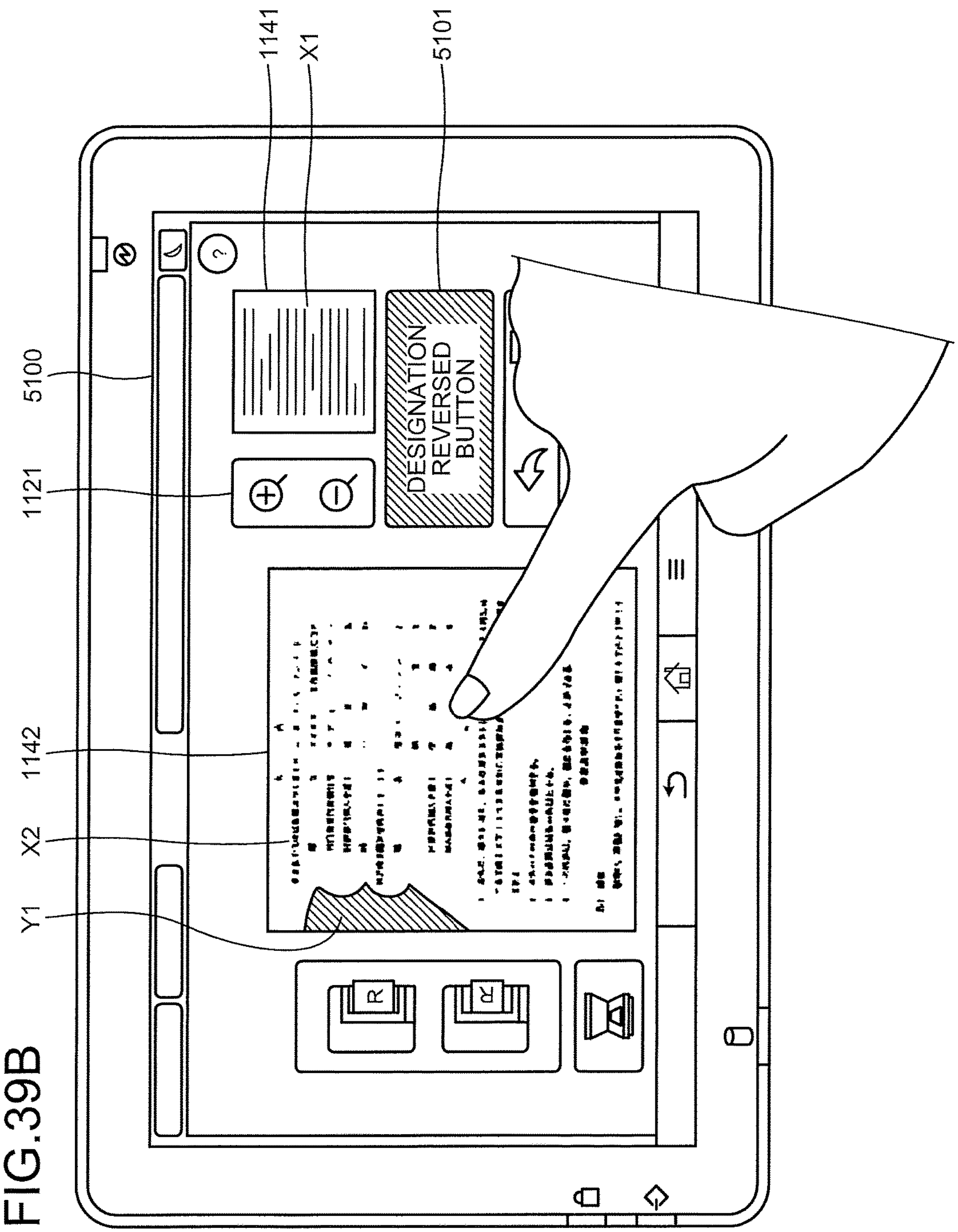
FIG. 39B is a diagram that illustrates a situation according to an example of user's operation.
Figure 39C:
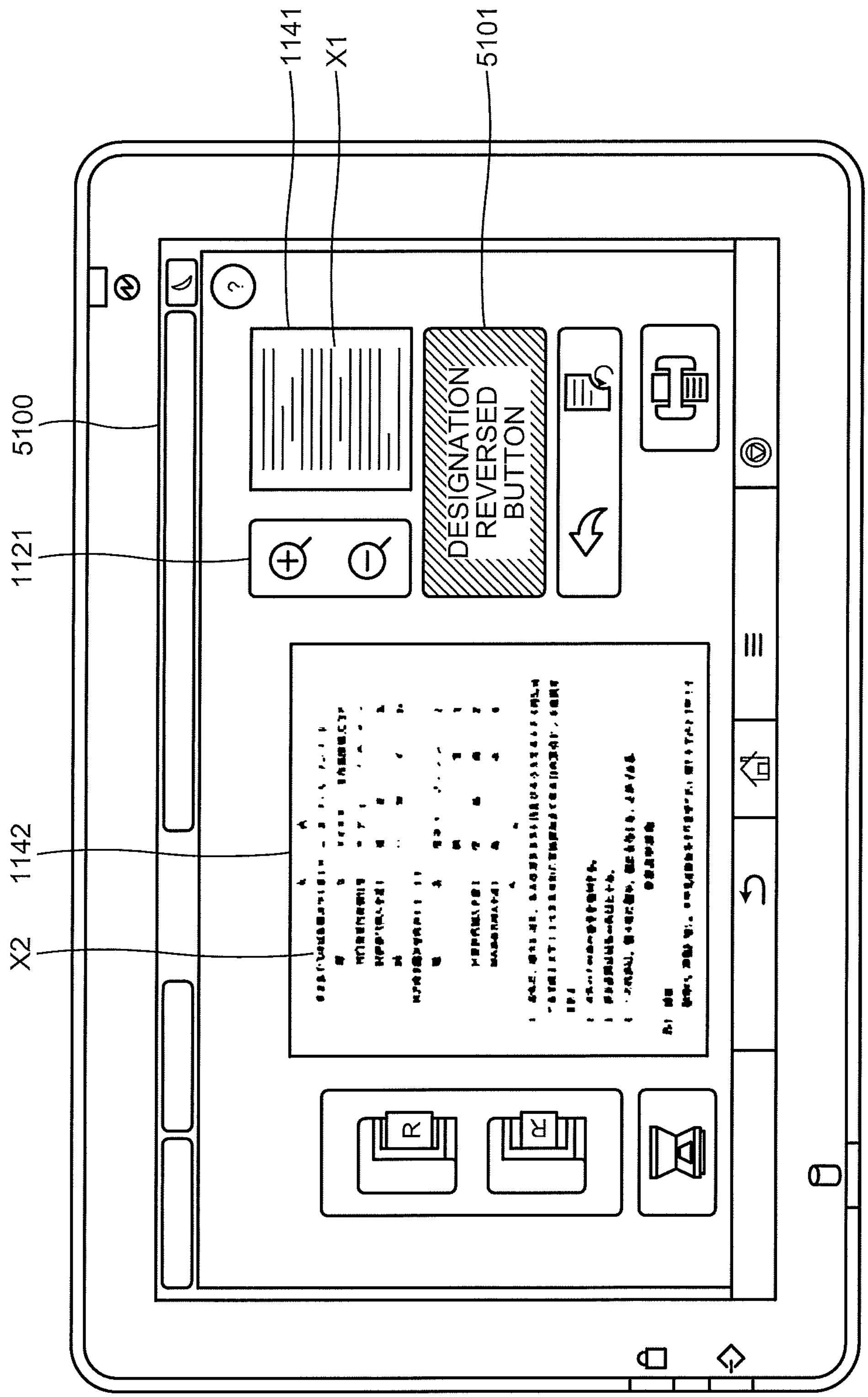
FIG. 39C is a diagram that illustrates a situation according to an example of user's operation.

FIG. 38 is a diagram that illustrates an example of the process flow of the operation panel according to the second modification of the second embodiment. FIG. 38 illustrates a modification of the process after Step S9 (determined as No) and Step S10 to immediately before Step S13 in the process flow (see FIG. 31) of the operation panel according to the second embodiment. Furthermore, in the process according to the modification illustrated in FIG. 38, the same operation as that in the process flow (see FIG. 31) of the operation panel according to the second embodiment is attached with the same number.

First, the copy-output editing processing unit 26 determines whether the designation reversed button 5101 of the copy-editing operation screen 5100 (see FIG. 39A) has been touched (Step S81).

If the input receiving unit 24 has received the positional information on the designation reversed button 5101, the copy-output editing processing unit 26 determines that there has been a touch (Step S81: determined as Yes) and switches the on/off setting of the designation reversed button 5101 (Step S82). If the input receiving unit 24 has not received the positional information on the designation reversed button 5101, the copy-output editing processing unit 26 determines that there has been no touch (Step S81: determined as No) and skips Step S82 so as to keep the on/off setting of the designation reversed button 5101.

Then, the copy-output editing processing unit 26 (the searching unit 41-1) determines whether there has been a touch on the enlargement/reduction display area 1142 of the copy-editing operation screen 5100 (see FIG. 39B) (Step S61).

If the input receiving unit 24 has received the positional information on a touch, the copy-output editing processing unit 26 (the searching unit 41-1) determines that there has been a touch (Step S61: determined as Yes) and then determines whether the designation reversed button 5101 is set on (Step S83).

If the designation reversed button 5101 is set on (Step S83: determined as Yes), the copy-output editing processing unit 26 (the searching unit 41-1) sets the pixel value of the reference pixel, received by the input receiving unit 24, as a reference color that is not targeted for masking (Step S84). For example, if a user designates original information (printed ruled lines, or the like) in a document, the pixel value of the reference pixel that indicates the designated information is set as a reference color that is not targeted for masking. Furthermore, if the designation reversed button 5101 is set off (Step S83: determined as No), the copy-output editing processing unit 26 (the searching unit 41-1) performs the process (see FIG. 31) from Step S62. As this process has been already explained, explanation and illustration are omitted here.

Subsequent to Step S84, the copy-output editing processing unit 26 (the searching unit 41-1) generates a copy of the scanning image that is being displayed (Step S85) and uses the copy as a target to read the pixel value of each pixel of the scanning image in a predetermined scanning order (Step S86).

Then, the copy-output editing processing unit 26 (the searching unit 41-1) determines whether the read pixel value does not belong to the reference color (Step S87).

If the read pixel value does not belong to the reference color (Step S87: determined as Yes), the copy-output editing processing unit 26 (the replacing unit 41-2) replaces the pixel value of the read pixel with the pixel value of the set masking color (white of the base in this example) (Step S88). Specifically, in this example, pixels other than original information in the document designated, e.g., yellowing, contamination, or the like, on the background, is replaced with white of the base. If the read pixel value belongs to the reference color (Step S87: determined as No), the copy-output editing processing unit (the searching unit 41-1) skips Step S88 to transition to Step S89.

Then, the copy-output editing processing unit 26 (the searching unit 41-1) determines whether scanning has been finished for all the pixels (Step S89) and, if scanning has not been finished for all the pixels (Step S89: determined as No), proceeds to Step S86 so as to perform a searching and replacing process on the remaining pixel in the same manner.

If scanning for all the pixels has been finished (Step S89: determined as Yes), the copy-output editing processing unit 26 (the searching unit 41-1) replaces the display on the enlargement/reduction display area 1142 with the scanning image (see FIG. 39C) to which masking has been applied (Step S90) and proceeds to the operation at Step S13.

Furthermore, if original information (printed ruled lines, or the like) in a document is not completely selected with one-time touch so that they remain, the remaining part may be repeatedly touched so that the remaining original information is selected.

A user performs a touch operation on the image-formation execution button 1131, thereby giving a command to print out the scanning image to which masking has been applied. When it is determined that a touch operation has been performed on the image-formation execution button 1131 (Step S13: determined as Yes), the copy-output editing processing unit 26 gives a command to the main body 10 so as to conduct image formation on the image (copy image) being displayed, to which masking has been applied (Step S15). As the subsequence is substantially the same as that in FIG. 10, explanation is omitted.

FIGS. 39A to 39C are diagrams that illustrate examples of user's operation on the operation panel according to the second modification of the second embodiment. FIG. 39A illustrates a displayed state immediately after an enlarging/reducing operation has been performed on the acquired scanning image. The enlargement/reduction display area 1142 of the copy-editing operation screen 5100 displays a scanning image (the enlarged/reduced image X2) after an enlarging/reducing operation. As an example of the scanning image (the enlarged/reduced image X2), the scanning image of an old document for print having yellow Y1 is illustrated.

FIG. 39B illustrates a situation where a user touches original printed sections (ruled lines, texts, drawings, or the like) on the scanning image (the enlarged/reduced image X2) with a finger. A user touches a part of the printed sections included in the scanning image (the enlarged/reduced image X2) with a finger. A touched position is a part of the printed sections.

FIG. 39C is a diagram that illustrates an example of the displayed state of the enlargement/reduction display area 1142 after masking is conducted. FIG. 39C illustrates a state where the printed sections remain and others such as the yellow Y1 has been replaced with white of the base. As described above, the yellow Y1 of old documents or other types of contamination may be deleted. Furthermore, although not illustrated, the output material that is printed out from the main body 10 has the image in the displayed state illustrated on the enlargement/reduction display area 1142.

Communication Sequence

As the communication processing between the operation panel and the main body 10 according to the second modification of the second embodiment is substantially the same as the communication processing between the operation panel and the main body 10 according to the second embodiment, explanation is omitted here.

As described above, according to the second modification of the second embodiment, original information (printed ruled lines, or the like) on a document remains, and others are masked with white of the base, or the like, whereby yellow of the background, or the like, may be removed.

Third Modification of the Second Embodiment

According to the second embodiment and its modifications, designated lines (writing by pencils or the like) are deleted by being masked with a masking color that is a color of the background; however, a modification may be made such that the background may be masked with the color of a designated line or a similar color so that the designated line is relatively deleted.

Fourth Modification of the Second Embodiment

Masked Scanning images that have been edited on the operation panel according to the second embodiment and its modifications may be output to recording media or external devices. In this case, for example, the copy-editing operation screen (the copy-editing operation screens 3100, 4100, 5100) of the operation panel is provided with an output button and, after masking is applied to a scanning image, user's touch operation on the output button is received. After the input receiving unit 24 receives the touch operation, the copy-output editing processing unit 26 outputs masked scanning images to recording media or external devices via the storage control unit 23 or the communication control unit 22. For example, the storage control unit 23 or the communication control unit 22 uses the communication I/F 204 (see FIG. 2) mounted in the operation panel as a wireless communication interface such as a USB interface or BLE to externally output masked scanning images to user terminals or USB flash memories and store them. Alternatively, masked scanning images may be externally output to designated external server devices via the communication I/F 104 (see FIG. 2) of the main body 10 from the operation panel.

According to a fourth modification of the second embodiment, the above-described output button, the copy-output editing processing unit 26, and the like serve as an "externally output unit" so that it is possible that physically deteriorated paper, or the like, is desirably reproduced as data and it is output again as a desirable document or handwritten format paper are reused after handwritten areas are deleted so as to be concealed.

A program to be executed by an image processing device according to each embodiment and each modification is provided by being stored, in the form of a file that is installable and executable, in a recording medium readable by a computer, such as a CD-ROM, a flexible disk (FD), a CD-R, or a DVD (digital versatile disk).

Furthermore, a configuration may be such that the program to be executed by the information processing device according to each embodiment or each modification is stored in a computer connected via a network such as the Internet and provided by being downloaded via the network. Moreover, a configuration may be such that the program to be executed by the image processing device according to each embodiment or each modification is provided or distributed via a network such as the Internet.

Furthermore, a configuration may be such that the program according to each embodiment or each modification is provided by being previously installed in a ROM, or the like.

An explanation is given of an example of the usage situation of an application (including the copy-output editing app) described in each embodiment and each modification. Furthermore, this application is usable for other usage situations or industry operations.

(1) Users use this application in a case where copying or scanning is conducted while the information that needs to be protected for security, such as personal information, is concealed. For example, for opening of an account in financial industry, one of tasks for bank tellers, or the like, is to copy forms of identification of customers, such as licenses or insurance certificates, by using image processing devices such as copiers. In recent years, it has been more difficult to handle personal information. Therefore, although it is necessary to report the fact of copy conducted, personal information that is not needed for identification of persons, e.g., personal information such as "glasses required" printed on driver's licenses, or individual number information that extremely needs protection, such as individual numbers of individual number cards, need to be prevented from being printed during copying, printing, or scanning. Therefore, for a task to copy documents such as identification cards including personal information, a preview image of the document is displayed on the operation panel, operation is received from a person in charge, or the like, to designate an area to be masked, and when necessary information is output by copying or scanning, personal information at the designated area is masked with a dark color such as black, white, or the same color as the background color so as to be concealed. Thus, personal information may be protected.

(2) This application is usable for a case where, in order to reuse a written form, a written area is deleted so that the form is restored to the unwritten one. For example, in educational facilities such as schools, preschools, or private preparatory schools, homework print paper for learning, term examination paper, or the like, which may be handwritten, are used for students' learning or academic measurement, and students write their names or answers in paper. There are cases where as print paper or test paper are study materials in the past and they do not have electronic data, teachers in preparatory schools reuse written prints (prints that are allowed to be duplicated) owned by students, or teachers in educational facilities do not have original electronic data (for example, prints used as study materials are provided by educational publishers as printed paper and are allowed to be duplicated). In such a case, paper is reused for example after only written part is deleted from paper that is handwritten by a student and a copy is produced or a scan image is stored. In addition to the field of education, it is also usable in a case where when a company worker brings back documents distributed or conference documents that are provided at attended conferences or seminars and that are allowed to be duplicated and then scan or copy them to share them in an office, only the notes written by himself is deleted and scanned or copied. Actual tasks for deleting writing, e.g., deleting with a rubber eraser, scanning and printing a produced copy with correction fluid applied thereto, scanning after concealing a written part with a strip of paper or folding a written part to conceal it, are extremely inconvenient. Therefore, by using this application, simple operation on the operation panel makes it possible to reuse format paper such that written parts are concealed by being masked with a white color or the same color as the background color and copying or scanning is conducted so that the written parts are deleted.

(3) This application is used in a case where yellowing is removed from old and yellowed documents (e.g., drawings or books) so that it is restored as new documents. For example, to restore documents so as to make them more visible by removing yellowing or contamination from documents that are discolored by being stored in manufacturing industries or document reservation facilities such as libraries for a long time or that are damaged by being exposed to ultraviolet, discolored parts of documents are converted into white or vanishing texts are converted into black so as to be clearly read, whereby documents may be reused.

According to the embodiments, there is an advantage such that areas intended by operators may be masked with more accuracy.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing device, comprising:

processing circuitry configured to read a document;

control a display to display a read image based on the document;

receive a user input of information at any position on the read image displayed on the display;

detect, from the read image, a first pixel with a first pixel value that is equal to a second pixel value of the read image at a position indicated by the information in the user input or that falls within an approximation range;

replace the first pixel with a masking color; and mask at least part of the read image based on the information in the user input and when the first pixel is replaced with the masking color; and conduct image formation of the read image that is masked.

2. The image processing device according to claim 1, wherein the processing circuitry is further configured to generate masking information including at least color information and positional information for the read image in accordance with the information in the user input, and the processing circuitry masks the read image by changing a color based on the masking information.

3. The image processing device according to claim 2, wherein the processing circuitry is further configured to register bibliographic information with regard to the masking information;

store the masking information for which bibliographic information is registered in a storage;

receive a selection of the masking information based on bibliographic information; and acquire the masking information, indicated in the selection, from the storage, wherein when the processing circuitry acquires the masking information, the processing circuitry combines the read image with the masking information.

4. The image processing device according to claim 3, wherein the processing circuitry is further configured to control the storage to store the masking information; and acquire the masking information from the storage.

5. The image processing device according to claim 3, wherein the processing circuitry is configured to register the registered bibliographic information in relation to personal ID information, and select masking information that corresponds to the personal ID information during authentication, and when the processing circuitry selects masking information, the processing circuitry acquires the masking information from the storage.

6. The image processing device according to claim 2, wherein the processing circuitry is configured to check a remaining amount of toner for a masking color; and when the processing circuitry detects that a small amount of toner remains for a masking color, the processing circuitry sets white or a toner in a color different from the masking color as the masking color.

7. The image processing device according to claim 1, wherein the processing circuitry is configured to detect, from the read image, the first pixel at the position indicated that falls outside an approximation range.

8. The image processing device according to claim 1, wherein processing circuitry is configured to receive, as the information, information that indicates a different position from the position, and use a pixel value of the read image at the different position in the user input as the pixel value of the masking color.

9. The image processing device according to claim 1, wherein the processing circuitry is configured to set a pixel value within an approximation range of second pixel value in the read image at the position indicated by the information in the user input.

10. The image processing device according to claim 1, wherein the processing circuitry is configured to output the masked read image to an external device.

11. The image processing device according to claim 1, wherein the read image is an image that has an RGB value.

12. The image processing device according to claim 1, wherein the read image is a TIFF or JPEG image.

13. The image processing device according to claim 1, wherein the processing circuitry is configured to give a command to acquire a read image of the document; and give a command to conduct image formation for the masked read image.

14. The image processing device according to claim 13, wherein the processing circuitry is configured to give a command to read the document; and give a command to acquire the read image.

15. The image processing device according to claim 1, wherein the processing circuitry is configured to operate a Web application program interface (API) service that provides multiple APIs for operating a scanner control circuit and the plotter control circuit, control an operation panel configured to include an operating system (OS) that receives input of an operation command, read an image of a document by using a first API of the Web API service, acquire the read scan image by using a second API of the Web API service, combine the scan image acquired with masking information that is input by a user through the operation panel, and print an output image as a result of combining by using a third API of the Web API service.

16. A method for an image processing device to perform image processing, the method comprising:

reading a document;

displaying a read image based on the document;

receiving a user input of information at any position on the read image displayed;

detecting, from the read image, a first pixel with a first pixel value that is equal to a second pixel value of the read image at a position indicated by the information in the user input or that falls within an approximation range;

replacing the first pixel with a masking color;

masking at least part of the read image based on the information in the user input and when the first pixel is replaced with the masking color; and conducting image formation of the read image masked.

17. The method according to claim 16, wherein the masking the at least part of the read image includes generating masking information that corresponds to a position indicated by the information, and combining the read image with the masking information.

18. A non-transitory computer-readable recording medium storing computer executable instructions which, when executed by a computer, cause the computer to:

read a document;

control a display to display a read image based on the document;

receive a user input of information at any position on the read image displayed on the display;

detect, from the read image, a first pixel with a first pixel value that is equal to a second pixel value of the read image at a position indicated by the information in the user input or that falls within an approximation range;

replace the first pixel with a masking color;

mask at least part of the read image based on the information in the user input and when the first pixel is replaced with the masking color; and conduct image formation of the read image that is masked.

19. The non-transitory computer-readable recording medium according to claim 18, wherein the computer is further caused to generate masking information including at least color information and positional information for the read image in accordance with the information.

* * * * *